US010077920B2

(12) United States Patent
Xiang et al.

(10) Patent No.: US 10,077,920 B2
(45) Date of Patent: Sep. 18, 2018

(54) APPARATUS AND METHOD FOR HIGH EFFICIENCY FIXED TARGET SOLAR THERMAL CONCENTRATOR POWER PLANTS

(71) Applicant: e-Cube Energy Technologies, Ltd., Saratoga, CA (US)

(72) Inventors: Xiao Dong Xiang, Danville, CA (US); Lu Wu, Guang An (CN)

(73) Assignee: E-Cube Energy Technologies, Ltd., Saratoga, CA (US)

( * ) Notice: Subject to any disclaimer, the term of this patent is extended or adjusted under 35 U.S.C. 154(b) by 317 days.

(21) Appl. No.: 14/785,299

(22) PCT Filed: Apr. 22, 2014

(86) PCT No.: PCT/CN2014/075929
§ 371 (c)(1),
(2) Date: Oct. 16, 2015

(87) PCT Pub. No.: WO2014/173287
PCT Pub. Date: Oct. 30, 2014

(65) Prior Publication Data
US 2016/0084529 A1    Mar. 24, 2016

Related U.S. Application Data

(60) Provisional application No. 61/892,660, filed on Oct. 18, 2013, provisional application No. 61/814,765, filed on Apr. 22, 2013.

(51) Int. Cl.
F24J 2/07    (2006.01)
F24J 2/54    (2006.01)
(Continued)

(52) U.S. Cl.
CPC . *F24J 2/07* (2013.01); *F24J 2/38* (2013.01); *F24J 2/542* (2013.01);
(Continued)

(58) Field of Classification Search
CPC .................. F24J 2002/0046; Y02E 10/41
(Continued)

(56) References Cited

U.S. PATENT DOCUMENTS 4,172,443 A * 10/1979 Sommer .................... F24J 2/10
126/578
RE30,960 E * 6/1982 Sommer .................... F24J 2/10
126/578
(Continued)

FOREIGN PATENT DOCUMENTS

CN    102216697    10/2011
CN    202734290    2/2013
(Continued)

OTHER PUBLICATIONS

"Compact linear Fresnel reflector," Wikipedia, 4 pgs. Downloaded Sep. 9, 2013.
(Continued)

*Primary Examiner* — Avinash Savani
(74) *Attorney, Agent, or Firm* — Weaver Austin Villeneuve & Sampson LLP

(57) ABSTRACT

A fixed target solar thermal tower design is provided that utilizes a low number of collector modules (32, 172, 191), e.g. 5 to 30, mounted on solar-tracking mechanisms. The collector modules may be rotatable so as to reflect incident sunlight onto a target receiver (1200, 192) mounted on a tower (31, 171), and substantially all of the collector modules for a given tower may be located in a rectangular area that extends polewards from the tower by a distance of approximately three times the height h of the target receiver
(Continued)

and that is approximately h wide. Each collector module may have a plurality of reflectors (42, 43, 194, 201, 202, 203) that are angled so as to reflect incident light generally towards a common point on the target receiver. Multiple such solar thermal tower plants may be collocated and ganged together to provide higher overall power output.

26 Claims, 47 Drawing Sheets

(51) Int. Cl.
*F24J 2/38* (2014.01)
*F24J 2/10* (2006.01)
*F24J 2/00* (2014.01)

(52) U.S. Cl.
CPC .............. *F24J 2002/0046* (2013.01); *F24J 2002/1085* (2013.01); *Y02E 10/47* (2013.01)

(58) Field of Classification Search
USPC ......... 126/685, 601, 621, 600, 683; 136/246
See application file for complete search history.

(56) References Cited

U.S. PATENT DOCUMENTS

| | | | | |
|---|---|---|---|---|
| 5,578,140 | A * | 11/1996 | Yogev | G02B 26/08 126/572 |
| 8,063,349 | B2 * | 11/2011 | Huss | F24J 2/07 126/680 |
| 2004/0004175 | A1 * | 1/2004 | Nakamura | F24J 2/07 250/203.4 |
| 2005/0034751 | A1 * | 2/2005 | Gross | F24J 2/07 136/246 |
| 2009/0133685 | A1 | 5/2009 | Pham et al. | |
| 2011/0088684 | A1 | 4/2011 | Tuli | |
| 2011/0259320 | A1 * | 10/2011 | Yuasa | F24J 2/07 126/601 |
| 2012/0011850 | A1 * | 1/2012 | Hebrink | F24J 2/07 60/641.15 |
| 2012/0285507 | A1 * | 11/2012 | Rettger | H01L 31/0547 136/246 |
| 2012/0325313 | A1 | 12/2012 | Cheung et al. | |
| 2013/0152916 | A1 * | 6/2013 | Tamaura | F24J 2/07 126/600 |
| 2013/0284162 | A1 * | 10/2013 | Burton | F24J 2/38 126/601 |

FOREIGN PATENT DOCUMENTS

| | | |
|---|---|---|
| EP | 2406836 | 1/2012 |
| WO | 2014/075929 | 10/2014 |

OTHER PUBLICATIONS

"Fresnel lens," Wikipedia, 9 pgs. Downloaded Sep. 9, 2013.
Mills et al., "Multi Tower Solar Array Project," 6 pgs.
"The Solastor System," Solastor, 2 pgs. Downloaded Feb. 26, 2014.
International Search Report and Written Opinion dated Jul. 16, 2014 in PCT Application No. PCT/CN2014/075929.
International Preliminary Report on Patentability dated Nov. 5, 2015 in PCT Application No. PCT/CN2014/075929.
Chinese First Office Action dated Dec. 26, 2016, in Application No. 201480035732.2.
Chinese Second Office Action dated Sep. 20, 2017, in Application No. 201480035732.2.
Solar Tower images. Data collected on or around Jun. 2016. 20 pgs.
Chinese Third Office Action dated May 22, 2018, in Application No. 201480035732.2.

* cited by examiner

APPARATUS AND METHOD FOR HIGH EFFICIENCY FIXED TARGET SOLAR THERMAL CONCENTRATOR POWER PLANTS

CROSS-REFERENCE TO RELATED APPLICATIONS

This application claims benefit of priority to U.S. provisional patent application 61/814,765, filed Apr. 22, 2013, and U.S. Provisional Patent Application No. 61/892,660, filed Oct. 18, 2013, both of which are hereby incorporated by reference in their entireties.

TECHNICAL FIELD

The present disclosure relates to concentrated solar thermal plants. In particular, in certain embodiments, this disclosure presents novel variable-concentration ratio solar collectors with tracking mechanisms and 1-D or 2-D modular fixed thermal receivers and their geometric configurations. These configurations provide for high thermal conversion efficiency.

BACKGROUND

Solar thermal conversion involves redirecting solar radiation that strikes a large area such that the redirected solar radiation strikes a smaller thermal receiver. The redirection of solar light is typically accomplished with large numbers of reflectors. The thermal receiver has a target area that is considerably smaller than the overall solar collection area of the reflectors. This results in the area of the thermal target (thermal receiver and heat exchanger) and, therefore, the black body radiation thermal loss, being reduced (thus increasing efficiency).

Since the sun is in constant movement throughout the day with respect to any one point on the Earth's surface, a tracking mechanism may be provided to maintain the concentration effect during daylight hours. There are two basic schemes of tracking mechanism: movable target schemes and fixed target schemes. Parabolic dish and parabolic trough are 2-dimensional and 1-dimensional examples, respectively, of the first type, and tower and linear Fresnel are 2-dimensional and 1-dimensional examples, respectively, of the second type.

Fixed target scheme solar plants typically utilize multiple reflectors, each supported by an individual tracking mechanism (also referred to as a heliostat—the term "heliostat" may also be used, in some contexts, to refer to any concentrator-type solar power system in which the target remains stationary and the sunbeams are steered onto the target by movable reflectors), while keeping the receiver (target) fixed atop a tower. For the last four decades, fixed-target solar thermal plants have largely focused on systems that utilize a single, large target tower and a large field of sun-tracking reflectors distributed across an annular segment of 90° or more of arc. For example, the Solar One pilot plant built in the 1970s featured 1818 identical reflectors distributed across an annular area measuring nearly 0.5 mi across and included a single 90 meter tower. Subsequent tower solar concentrators include Solar Two (adding 108 additional, larger reflectors to the outer perimeter of the annular area closest to the equator of Solar One), SPP-5 (Ukraine, 1600 reflectors distributed across an annular area), Planta Solar 10 and Planta Solar 20 (624 reflectors and 1255 reflectors, respectively, distributed across approximately 90° to 180° angular segment on the opposite side of the respective towers from the equator). The Ivanpah cluster of solar thermal plants, which started generating power in 2013 and 2014, features three towers each 485 ft high with over 173,500 heliostats divided amongst them (Unit 1 of Ivanpah has 53,527 of the heliostats, while Units 2 and 3 of Ivanpah have 60,000 heliostats each).

Since the optical focal length of each reflector in a conventional tower scheme changes with rotation angle of the reflector when the incoming light is not normal to the focal plane of the reflector, the concentration ratio of each individual reflector relative to the target is kept relatively low for conventional solar thermal tower systems, i.e., between 1 and 3. The concentration ratio is the ratio of the total reflector area for a reflector divided by the target face area of the receiver. A 1:1 ratio, for example, results from a planar mirror having the same reflective surface area and shape as the target face area (in practice, such a reflector may still require a slight degree of curvature to compensate for the angular dispersion of a sunbeam over distance—the amount of curvature is dependent on the distance between the target face and the reflector). A higher concentration ratio may be achieved by utilizing concave reflectors; however, concave reflector units suffer large drop-offs in efficiency when reflecting light along directions other than their focal direction. In order to compensate for the natural dispersion angle of sunlight, conventional tower systems typically utilize large, substantially planar reflectors (with mild degrees of curvature) that have individual solar concentration ratios of approximately 3:1 or less (to avoid overspill of reflected light past the target and to reduce manufacturing costs); current conventional tower systems do not exceed solar concentration ratios greater than 3:1 for each tracking reflector due to the efficiency drop-offs associated with such concentration ratios when reflecting light along directions other than their focal direction.

To achieve the large concentration ratio needed to compensate for black body radiation loss, conventional tower systems often require hundreds (sometimes more than 1000) of tracking reflectors. Since each tracking reflector needs a tracking mechanism, large reflectors, e.g., 40 m² up to 120 m², are typically used to keep the cost down.

In movable target systems, each reflector has its own receiver unit that is fixed in space relative to the reflector. A tracker causes the reflector to track the sun such that the reflector unit always directs sunlight onto the corresponding receiver (which moves with the reflector).

In both the fixed and movable target schemes, a heat transfer liquid may be pumped through the receiver, heated up, e.g., to generate steam, and then routed to a turbine or other power-generation mechanism.

There are great benefits of conventional fixed target systems over conventional movable target systems: 1) trackers for reflectors alone are much cheaper than trackers for reflectors with movable receivers due to reduced acceleration torque (even if such systems are balanced to eliminate torque, the tracker drive motors still have to overcome the inertial effects of the reflector and the cantilevered receiver); 2) fixed target systems do not need to route the heat transfer liquid through the multi-axis rotational joints of the heliostats (which typically requires expensive feed-through devices for the heat transfer fluid) and typically have greatly reduced lengths of thermal fluid piping in the 2-D case; and 3) a much higher overall optical concentration ratio can be achieved on the target face. There are some drawbacks to conventional tower systems as compared with conventional movable target systems, however: 1) average optical cosine loss is large since reflectors and receivers are rarely in-line with the sun; this loss can be as large as 23% in tower solar thermal plants and even larger in linear Fresnel power plants; 2) in the tower solar thermal plant case, in order to keep the solar concentration ratio large and the overall cost low enough, a large reflector field is needed, e.g., often hundreds or thousands of reflectors, which in turn causes the optical attenuation in air to be significant—this is especially detrimental in places where atmospheric turbidity (or particulate concentration in the atmosphere) is large; 3) in the 1-D case, the practical optical concentration ratio is much reduced compared to the case of 1-D trough collectors (with moving targets).

In this disclosure, we propose novel design principles, apparatus and methods to dramatically overcome the drawbacks of tower systems while maintaining the benefits of tower systems.

SUMMARY

In various embodiments general methods and apparatus to solve these problems are provided herein.

In some embodiments, collector modules for a tower solar thermal system are confined within a small rectangular region abutting the tower to reduce the optical cosine loss. In some embodiments, a solar thermal power plant may include a large number of towers, each with a peak power in the range of about 20 kW-1 MW; each tower may, in turn, have a relatively low number of collector modules that are confined to the corresponding small rectangular region mentioned above. In some embodiments, each collector module may have an individual concentration ratio much larger than 3. Furthermore, in order to maximize the total concentration ratio of the tower solar thermal system, each collector module may have an individual concentration ratio that varies from collector module to collector module depending on each collector module's location relative to the tower and receiver. In some embodiments, each collector module may include a number of smaller reflectors, with or without curvature, with certain installed initial angles relative to the collector module's rotation framework in order to reduce the wind load and cost. In some other embodiments, the collector module may be a simple, one-piece parabolic reflector. In some embodiments, the tower receiver may utilize vacuum insulation to permit a "selective absorption coating" to be used in the tower receiver. In addition to the embodiments or implementations discussed herein, the following embodiments are also discussed herein.

Embodiment 1: A solar power system that has a solar power plant including: a receiver module, the receiver module having a target face configured to collect solar energy that is incident on the target face, the target face having a target face center; a group of collector modules, each collector module in the group of collector modules configured to redirect sunlight onto the target face of the receiver module, where at least 90% of the collector modules are located in a rectangular region that is no more than 10h long in a direction generally aligned with the Earth's longitudinal direction and no more than h wide in a direction generally aligned with the Earth's latitudinal direction, and an average midplane is substantially defined by rotational axes of all of the collector modules in the group of collector modules; and a tower, the tower supporting the receiver module a distance h above the average midplane. In alternative versions of Embodiment 1, 90% of the collector modules may be located in a rectangular region that is no more than 5h or 3h long in a direction generally aligned with the Earth's longitudinal direction and no more than h wide in a direction generally aligned with the Earth's latitudinal direction.

Embodiment 2: The solar power system of embodiment 1, where the rectangular region starts at the tower and extends away from the Earth's equator in a generally longitudinal direction.

Embodiment 3: The solar power system of either embodiment 1 or embodiment 2, where each collector module comprises: a sun-tracking mechanism, a frame supported by the sun-tracking mechanism, and a plurality of reflectors, where: the plurality of reflectors includes a center reflector, each reflector is supported by the frame, and each reflector is configured to reflect light incident on the reflector such that light reflected off of the reflector is centered on the target face center when the light strikes the reflector from a direction parallel to a vector passing through the target face center and the center reflector and the center reflector is perpendicular to the vector.

Embodiment 4: The solar power system of any one of embodiments 1 through 3, where the collector module includes an array of reflectors including X rows by Y columns, where X is selected from the group consisting of 5, 6, 7, 8, 9, and 10, and Y is selected from the group consisting of 5, 6, 7, 8, 9, and 10.

Embodiment 5: The solar power system of any one of embodiments 1 through 4, where the average cosine efficiency across all of the collector modules that are configured to redirect sunlight onto the target face of the receiver module is 0.85 or higher.

Embodiment 6: The solar power system of any one of embodiments 1 through 4, where at least one sun-tracking mechanism has two intersecting axes of rotation.

Embodiment 7: The solar power system of any one of embodiments 1 through 6, where at least one of the reflectors in at least one of the collector modules is a planar mirror.

Embodiment 8: The solar power system of any one of embodiments 1 through 7, where at least one of the reflectors in at least one of the collector modules is a concave mirror.

Embodiment 9: The solar power system of any one of embodiments 1 through 8, where h is between 5 and 10 meters.

Embodiment 10: The solar power system of any one of embodiments 1 through 8, where h is between 5 and 15 meters.

Embodiment 11: The solar power system of any one of embodiments 1 through 8, where h is between 5 and 25 meters.

Embodiment 12: The solar power system of any one of embodiments 1 through 9, where the group of collector modules includes between 3 and 30 collector modules.

Embodiment 13: The solar power system of any one of embodiments 1 through 12, where the collector modules are arranged in between 1 to 3 substantially longitudinally-oriented columns within the rectangular region.

Embodiment 14: The solar power system of embodiment 13, where the collector modules are further arranged in between 3 to 10 substantially latitudinally-oriented rows of collector modules within each column.

Embodiment 15: The solar power system of any one of embodiments 1 through 14, where the solar power system has one column of collector modules and five rows of collector modules.

Embodiment 16: The solar power system of any one of embodiments 1 through 15, where at least one of the collector modules includes at least one collector module having a substantially rectangular array of reflectors distributed across the frame.

Embodiment 17: The solar power system of embodiment 16, where the at least one collector module having a substantially rectangular array of reflectors distributed across the frame does not have reflectors at the four outermost corners of the substantially rectangular array.

Embodiment 18: The solar power system of either embodiment 16 or embodiment 17, where the at least one collector module having a substantially rectangular array of reflectors distributed across the frame does not have reflectors in the three array locations closest to each of the four outermost corners of the substantially rectangular array.

Embodiment 19: The solar power system of any one of embodiments 16 through 18, where the at least one collector module having a substantially rectangular array of reflectors distributed across the frame has at least an additional horizontal row of reflectors on a first portion of the collector module closest to the Earth's equator and on one side of a pitch axis of rotation of the collector module as compared with the number of rows of reflectors on a second portion of the collector module furthest from the Earth's equator and on the other side of the pitch axis of rotation of the collector module.

Embodiment 20: The solar power system of any one of embodiments 16 through 19, where the center reflector of the at least one collector module is a flat mirror and the other reflectors of the at least one collector module are concave reflectors.

Embodiment 21: The solar power system of any one of embodiments 1 through 20, where at least 90% of the reflectors for at least one of the collector modules have focus errors with respect to the target face center at 8:00 AM and 4:00 PM on the vernal or autumnal equinox of between 0 and 0.4 meters in the horizontal direction and between 0 and 0.4 meters in the vertical direction.

Embodiment 22: The solar power system of any one of embodiments 1 through 21, where each reflector of at least one of the collector modules is approximately 50% of the orthogonal dimensions of the target face and has a reflective area of approximately 25% of the target face surface area.

Embodiment 23: The solar power system of any one of embodiments 1 through 22, further including: one or more additional solar power plants, each having a receiver module, a tower, and a group of collector modules as set forth in embodiment 1, where the one or more additional solar power plants are arranged such that substantially longitudinal edges of the rectangular regions of each additional solar power plant are substantially adjacent to substantially longitudinal edges of the rectangular regions of any neighboring solar power plant.

Embodiment 24: The solar power system of any one of embodiments 1 through 23, where the receiver module includes: a first vacuum chamber with at least a first transparent portion, a first inlet to the first vacuum chamber, a first outlet from the first vacuum chamber, and a first plurality of first tube segments arranged in a linear array within the first vacuum chamber across a diameter of the first vacuum chamber, where the first tube segments are arrayed in a plane parallel to the target face, the first tube segments are illuminable through the first transparent portion of the first vacuum chamber, the first vacuum chamber is configured to provide a vacuum environment around the first plurality of tube segments, and the first plurality of tube segments is fluidicly connected with the first inlet and with the first outlet.

Embodiment 25: The solar power system of embodiment 24, further including: a second vacuum chamber with at least a second transparent portion, a second inlet to the second vacuum chamber, a second outlet from the second vacuum chamber, and a second plurality of second tube segments arranged in a linear array within the second vacuum chamber across a diameter of the second vacuum chamber, where the second tube segments are arrayed in a plane parallel to the target face, the target face is a plane located between the first plurality of first tube segments and the second plurality of second tube segments, the second tube segments are illuminable through the second transparent portion of the second vacuum chamber, the second vacuum chamber is configured to provide a vacuum environment around the second plurality of tube segments, and the second plurality of tube segments is fluidicly connected with the second inlet and with the second outlet.

Embodiment 26: The solar power system of either embodiment 24 or 25, where portions of the tube segments are coated with a selective absorption coating.

BRIEF DESCRIPTION OF THE DRAWINGS

In FIG. 15A, the assembly has been partially sectioned along the long axes of the vacuum chambers to allow internal components to be seen. In FIG. 15B, the vacuum chambers and associated external tubing have been omitted to allow the routing of internal tubing to be seen.

FIGS. 11B, 11D, 11F, 11H, 11J, 12-16, 17B-17N, 25, 26, and 27 are scale drawings or diagrams, although not necessarily to the same scale from Figure to Figure.

DETAILED DESCRIPTION

Reference may be made throughout this disclosure to 1-D and 2-D solar thermal plants (or 1-D and 2-D fixed-target thermal solar plants). It is to be understood that the 1-D case refers to fixed-target solar thermal power plants where sunlight is focused on a long, narrow receiver, i.e., a receiver that has the appearance of a line when viewed from a distance. In the 1-D case, sunlight is typically focused on a theoretical line by the reflectors of the collector modules used (or by individual reflectors if no collector module is used). The theoretical line may generally correspond with the centerline of the receiver that is used.

It is to be further understood that the 2-D case refers to fixed-target solar thermal plants where sunlight is focused on a two-dimensional target area or face, e.g., an area that is typically not considerably larger in one direction than another, orthogonal direction.

Figure 1A:
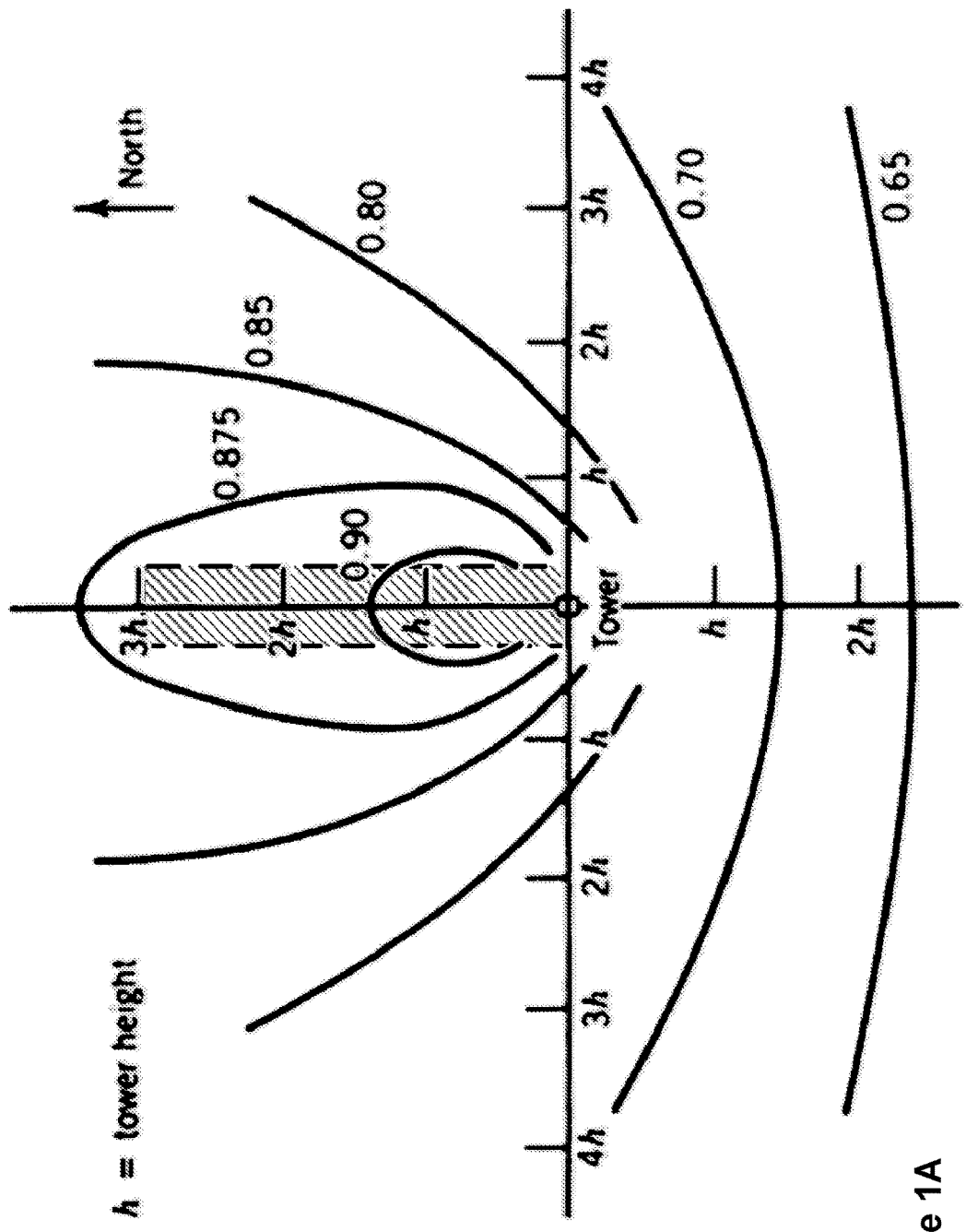
FIG. 1A illustrates the optical cosine effect (1 minus the percentage energy loss due to cosine angle) as a function of relative distance between the reflector and the tower expressed in terms of tower height for one example location.

First, we describe various example embodiments for 2-D fixed target power plants. FIG. 1A plots the optical cosine effect, i.e., 1 minus the cosine of the angular misalignment between a reflector normal and the direction from which sunlight strikes the reflector when the reflector is oriented towards the receiver of a solar tower, as a function of the relative distance between the rotational center of the collector and the tower as projected on the earth plane in terms of tower height h. For example, a reflector that is located at a distance 2h to the north and h to the east of a solar thermal tower may have an optical cosine effect of between 0.87 and 0.90, i.e., the reflector may only reflect between 87% and 90% of the incident solar energy towards the receiver in the tower. The optical cosine effect may also be referred to as cosine efficiency or cosine loss (which is simply the cosine of the angular misalignment); cosine efficiency or loss may be expressed in decimal form or as a percentage.

In FIG. 1A, the receiver target face center is projected onto the earth plane and defines the earth plane coordinate system origin and the horizontal and vertical axes point to the east and north, respectively. Solid lines are used to represent contours of constant cosine effect, e.g., 0.90, 0.875, 0.85, 0.80, 0.70, and 0.65 as shown in FIG. 1A. In some embodiments described herein, the collector modules are confined within a small rectangular region near the tower, e.g., such as the crosshatched region indicated by the dashed line in FIG. 1A. By confining the majority of the collector modules for a solar thermal tower to such a region, the average optical cosine loss for that solar thermal tower may be limited to a very low value, e.g., less than about 12%, which is at least half of that of typical current solar tower plants. While the cross-hatched region shown is approximately three tower-heights in length (tower height measured with respect to collector module center height) and slightly less than 1 tower height in width, further implementations may place collector modules within a longer and slightly wider region, e.g., ~10 tower heights in length and perhaps 1 to 1.5 tower heights in width. In such implementations, however, the collector modules are still constrained such that a large proportion, e.g., ~90% or more, of the collector modules are within such regions. In yet further implementations, the length of such a region may be relatively unbounded, although ~90% or more of the collector modules may be placed within a region approximately 1 to 2 tower heights in width. It is to be understood that reference to placing a collector module within a region refers to placing a collector module such that the center of the collector module is within the region; individual reflectors, e.g., such as those along the edge of the collector module, may protrude beyond the edge of the region.

Since the total collector modules are concentrated in a relatively small, narrow area, in some embodiments, multiple such solar thermal tower power plants may be provided in a relatively closely-packed array to form a solar thermal tower plant system, each having their own field of collector modules located within a region such as that described in FIG. 1A. In some such embodiments, each solar thermal tower may have a target peak power to be in the range of about 20 kW to 1 MW. In some embodiments, the thermal working fluid circulated through the receiver of each thermal solar tower may be routed to a common electrical generator plant (by contrast, existing systems often use only one solar thermal tower to provide thermal working fluid to an electrical generator plant). The piping thermal insulation loss due to the need to connect the solar thermal tower receivers in such a solar thermal tower plant system may be within 1-2% of the total power capacity of the solar thermal tower plant, thereby maintaining the benefit of a multiple solar thermal tower plants. Moreover, reducing the target tower height (which also reduces the overall footprint of the rectangular region where the collector modules of each solar thermal tower reside) dramatically reduces the construction cost of the total solar thermal towers for a solar thermal tower plant as compared with conventional, large-height solar thermal tower plants. Furthermore, the number of collector modules per tower may also be limited to a small value to further reduce costs. In some embodiments, each collector module may have an individual concentration ratio that, in contrast to conventional sun-tracking reflectors typically used in 2-D solar thermal tower plants, is larger than 3. Furthermore, in order to maximize the total concentration ratio of the solar thermal tower plant, each collector module associated with the solar thermal tower plant may have a variable individual concentration ratio that depends on the location of the collector module relative to the position of the target face of the receiver of that solar thermal tower plant. In some embodiments, each collector module may include a number of smaller reflectors, with or without curvature, with certain installed initial angles relative to a common support framework that supports the reflectors such that the reflectors for a collector module may be rotated in unison by a sun tracking device. Such collector modules may be used to reduce wind loading effects on the collector module, as well to reduce cost. Alternatively, the collector module may include a non-Fresnel parabolic reflector (which may be monolithic or multi-segment) in order to increase the collector module's concentration ratio beyond 3. In this way, a large total concentration ratio may be achieved for a solar thermal tower plant while keeping the black body radiation loss small (due to the small size of the receiver that may be used in the embodiments described herein, the black body radiation loss may be considerably smaller as compared with larger receivers used in conventional solar thermal tower systems). For example, due to the small size that the receiver may be in the embodiments described herein, insulating the receiver using a vacuum may be possible (since the receiver in such a vacuum environment must be able to receive sunlight, the vacuum environment must be provided by a structure that is transparent to light along the directions that the reflected light that is incident on the receiver travels; such a structure is simply not possible for the large receivers used on conventional solar thermal plant receivers). Vacuum insulation may greatly reduce or practically eliminate convective heat loss from the receiver, leaving only conductive heat loss (which may be managed using, for example, insulating materials, long thermally conductive path lengths, and small thermal cross sections of parts in thermally-conductive contact with one another) and radiative heat loss, e.g., black body radiation, as the main sources of heat loss. Such vacuum insulation measures may also allow the use of a "selective absorption coating" that may be applied to the receiver and used to increase the efficiency of the receiver (such selective absorption coatings may be of little practical use in non-vacuum-insulation environments since the convective heat loss may dominate with respect to the radiative heat loss). Such selective absorption coatings may prevent or discourage blackbody radiation loss from the receiver, thus effectively increasing the amount of incident solar energy that is retained by the components with the selective absorption coating as compared with components that do not benefit from such coatings. This has the same effect as "concentrating" the solar energy on the receiver to a greater extent (since more solar energy is retained by the receiver and can be used to heat thermal working fluids piped through the receiver). Selective absorption coatings may have an "effective concentration ratio," for example, of 10 (10 times as much heat may be retained by a surface coated with a selective absorption coating as compared to the same surface without such a coating and under the same sunlight exposure). The optical concentration ratio of the embodiments discussed herein may generally be in the range of 10 to 40 due to the design of the reflectors, the arrangement of the sun trackers, and the size of the towers. When a selective absorption coating with, for example, an effective concentration ratio of 10 is used on the receiver of such solar thermal tower plants in conjunction with vacuum isolation, the combined concentration ratio may be (10 to 40)×10=100-400. The selective absorption coating for such an example may be tuned to have peak absorption in the black body radiation wavelength associated with the normal operating temperature of the thermal receiver, e.g., for a thermal receiver that reaches 400C, the selective absorption coating may be tuned for a peak absorption for radiation with a wavelength of approximately 224 microns.

The following examples describe various techniques and design choices that may be made in order to increase or maximize the concentration ratio of collector modules in a solar thermal tower plant system well beyond the limits of conventional solar thermal tower plant designs. Also described are techniques and examples of calculating other detailed parameters of a solar thermal tower plant according to the concepts outlined herein.

Figure 2:
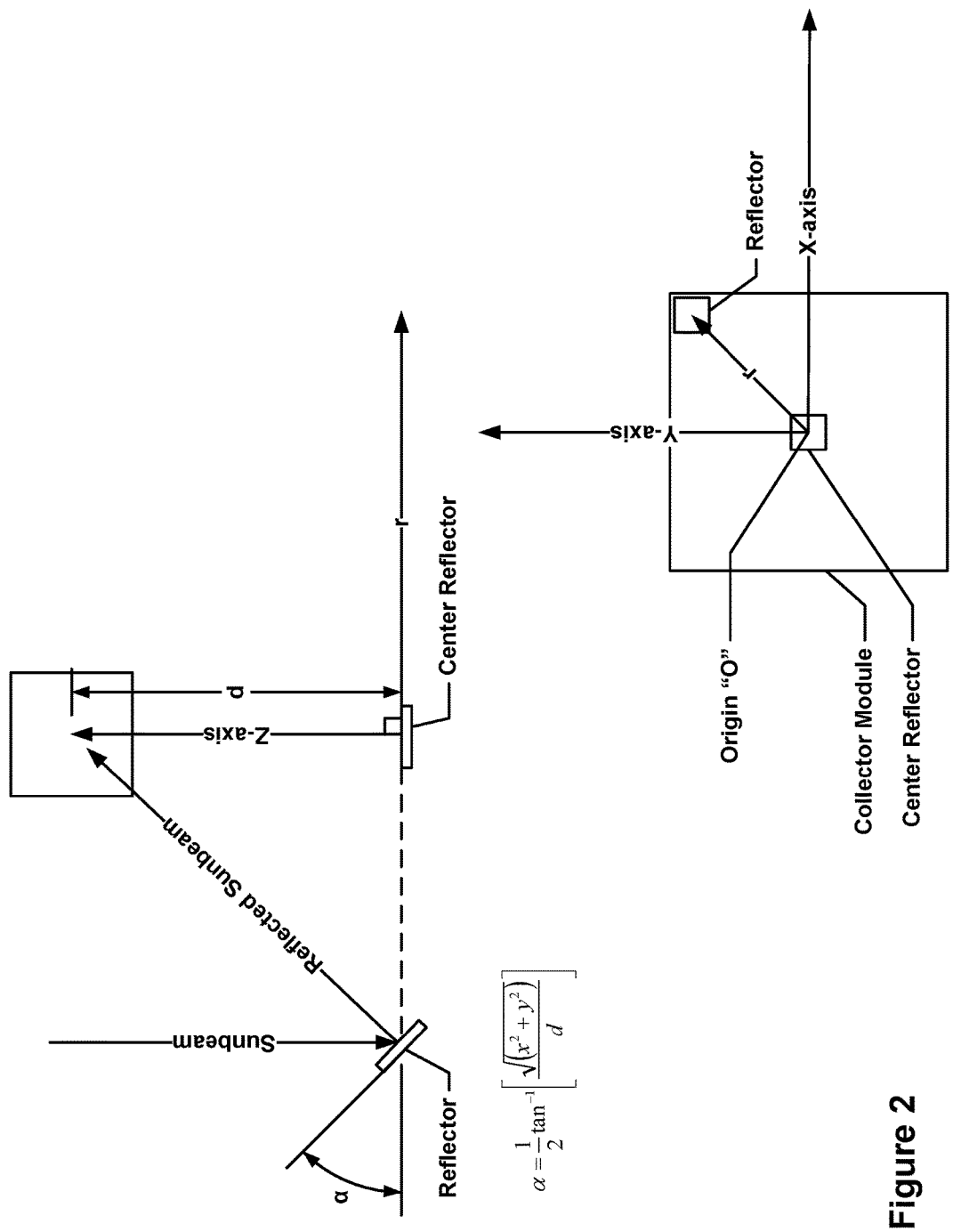
FIG. 2 is a diagram illustrating the initial angle of a reflector on an example collector module for an example tower solar power plant, consistent with aspects related to the innovations herein.

In one example implementation, a number of collector modules may be used in conjunction with a single tower in a single solar thermal tower plant. Each individual collector module may include a number of small reflectors that may form, in effect, a two-dimensional Fresnel reflector. This arrangement may help reduce wind loading over alternative, single-reflector collector modules, e.g., those with a single parabolic reflector that may have a greater depth than a collector module with a two-dimensional Fresnel-type reflector. In such a multi-reflector collector module implementation, optical elements, i.e., reflectors, may be selected from variety of reflective optical elements, including flat mirrors, concave mirrors, reflectors, and other devices capable of reflecting sunlight that is incident on the collector module onto a target face that is roughly the same size as one of the reflectors or focusing the incident sunlight onto an area that is smaller than the size of one of the reflectors (assuming that each reflector is substantially the same size). A supporting base with a designed initial angle may support each optical element for a collector module. A 2-dimensional array of modular optical elements may be assembled into a collector module to form a modular system defined by a collector module frame; the modular optical elements may generally define an optical element plane. FIG. 2 illustrates the initial angle $\alpha$ of an individual example reflector for an example collector module with respect to the plane of the collector module. The Cartesian coordinate system depicted in FIG. 2 shows x and y axes aligned, in this example, with the collector module frame and having an origin at the collector module rotational center (as defined by the sun tracking mechanism that supports the collector module), and a z axis that is substantially normal to the plane, points towards the face center of a receiver target, and may be located in the middle of a center reflector of the collector module. The coordinate system of FIG. 2 may be referred to herein as the collector coordinate system (there may be multiple collector coordinate systems for a given solar thermal tower plant, each corresponding with a different collector module of the solar thermal tower plant). The collector module rotational center may be a distance d from the face center of the target. The initial angle $\alpha$ may be defined such that a sunbeam that falls on each reflector of the collector module is reflected onto the face center of the target when the z axis is coaxial with the sun-beam and passes through the target face center. At each reflector center position of (x, y, 0), the initial angle between the reflector/mirror and the plane of the collector module along a radial direction from the origin may be calculated by:

$$\alpha=(\tfrac{1}{2})\tan^{-1}[(x^2+y^2)^{1/2}/d] \qquad (1)$$

Initial angles $\alpha$ for individual reflectors at each location for a given collector module may be different, and between different collector modules common to a solar thermal tower plant but located at different distances d from the receiver, the initial angles $\alpha$ may be different for reflectors on the different collector modules that share the same x and y positioning with respect to the origins of their respective collector modules.

Figure 1B:
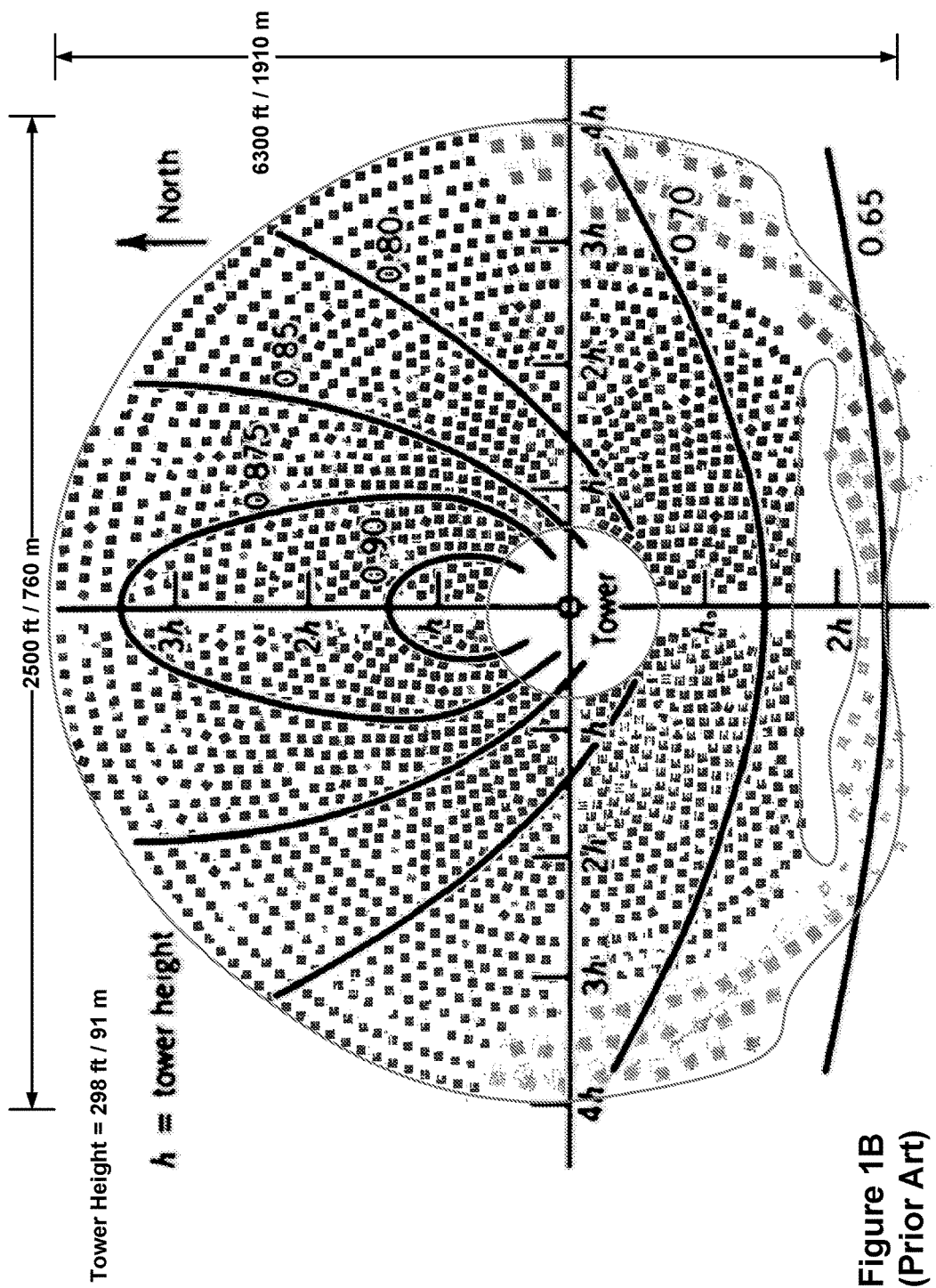
FIG. 1B applies the optical cosine effect plot shown in FIG. 1A to the Solar One/Solar Two solar thermal power plant.
Figure 1C:
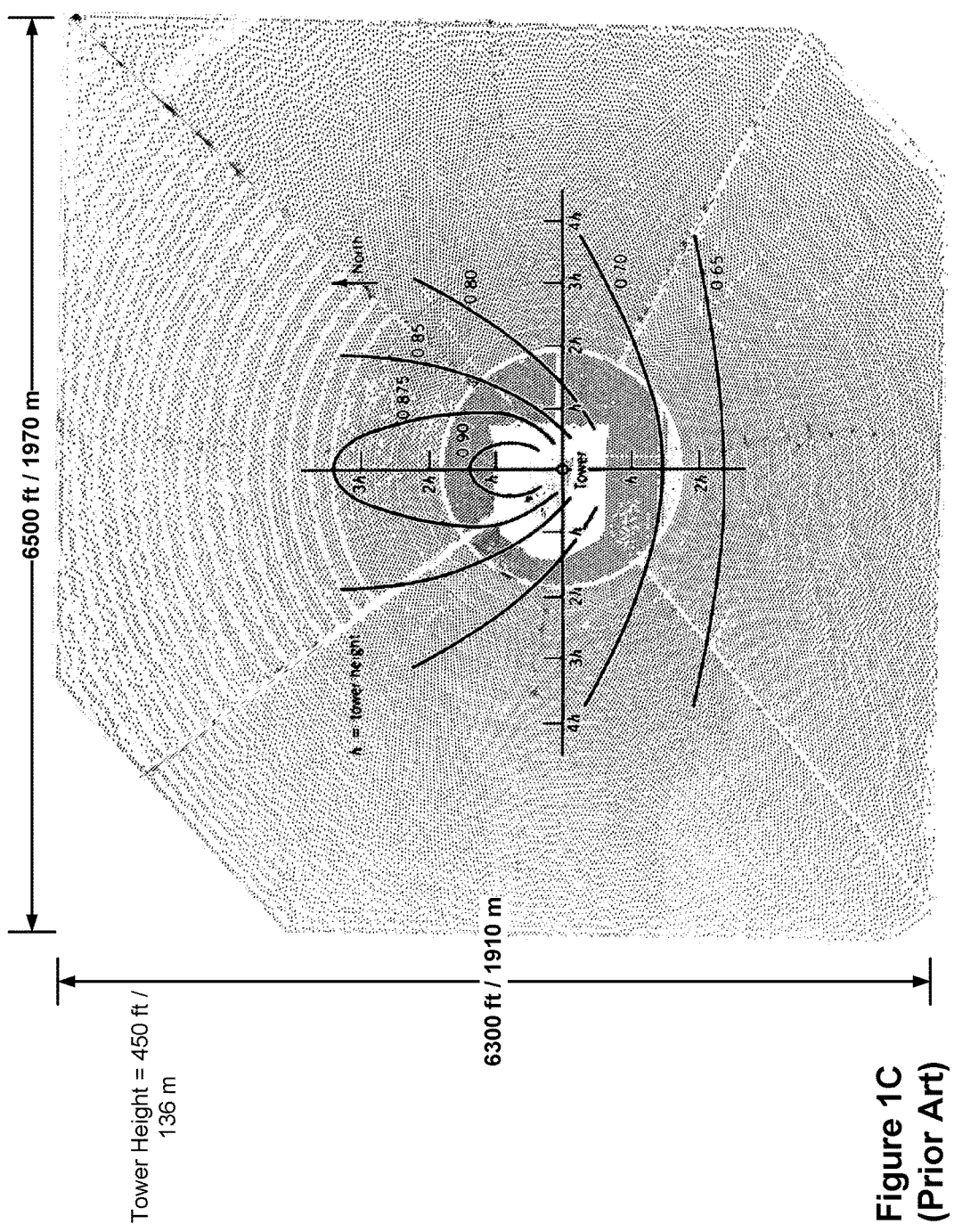
FIG. 1C applies the optical cosine effect plot shown in FIG. 1A to the Ivanpah-1 solar thermal power plant.

As discussed previously, modern or conventional solar thermal tower plant designs have focused on massive fields of sun-tracking, single-reflector (or multi-reflector units with the reflectors for each tracking unit all parallel to one another, i.e., not at different initial angles) that are arrayed in a large area about a single thermal tower receiver. Such modern solar tower designs typically array the reflectors over a large area, especially when compared with the small rectangular area of FIG. 1A. FIG. 1B depicts the cosine effect plot as applied to the Solar One/Solar Two solar thermal plant of Barstow, CA. As can be seen, the reflector field (small black squares) of the Solar One/Solar Two solar thermal plant is relatively evenly distributed across all of a semicircular area that is north of the tower (at the center of the plot) and that is nearly 4h in radius. The Solar One/Solar Two reflector field also extends through most of a similar semicircular area south of the tower. FIG. 1C applies the optical cosine effect plot shown in FIG. 1A to the Ivanpah-1 solar thermal tower plant. In contrast to the Solar One/Solar Two plants (which were originally constructed in 1981 and 1995, respectively and are no longer operational), the Ivanpah-1 solar thermal tower plant is a completely modern system, having been completed in late 2013. As can be seen, Ivanpah-1 uses a much larger heliostat field (nearly 2.5 times wider than Solar One/Two) and, at present, the world's tallest solar thermal tower (50% higher than that of Solar One/Two).

It is to be understood that the term "collector module," as used herein, refers to collector modules having multiple reflectors having a plurality of initial angles, collector modules having a single reflector with a concentration ratio greater than 1, or to collector modules having a total concentration ratio greater than 1.

For a given reflector of a given collector module, (aside from the central reflector of the collector module, which may have a normal unit vector that corresponds with the vector of the plane of the collector module and have x, y coordinates of 0, 0) with an initial angle α, the normal unit vector $\vec{N}_{r0}$ in the collector coordinate system is given by:

$$\vec{N}_{r0}(x, y, 0) = \frac{\vec{I}_{r0}(x, y, 0) + \vec{R}_{r0}(x, y, 0)}{2\cos\gamma} = \left(\frac{-x\sin\alpha}{\sqrt{x^2 + y^2}}, \frac{-y\sin\alpha}{\sqrt{x^2 + y^2}}, \cos\alpha\right) \quad (2)$$

The unit vectors $\vec{I}_{r0}(x, y, 0)$ and $\vec{R}_{r0}(x, y, 0)$ are the beam incident and reflection unit vectors, respectively, for the reflector centered on the provided x and y position in the collector coordinate system. The angle γ is the angle between the unit vectors $\vec{I}_{r0}$ (x, y, 0) and $\vec{R}_{r0}$ (x, y, 0):

$$\vec{I}_{r0}(x,y,0)=(0,0,1)$$

$$\vec{R}_{r0}(x,y,0)=(-x,-y,d)/\sqrt{x^2+y^2+d^2}$$

$$\cos 2\gamma = \vec{I}_{r0}(x,y,0) \cdot \vec{R}_{r0}(x,y,0)=d/\sqrt{x^2+y^2+d^2} \quad (3)$$

Figure 3A:
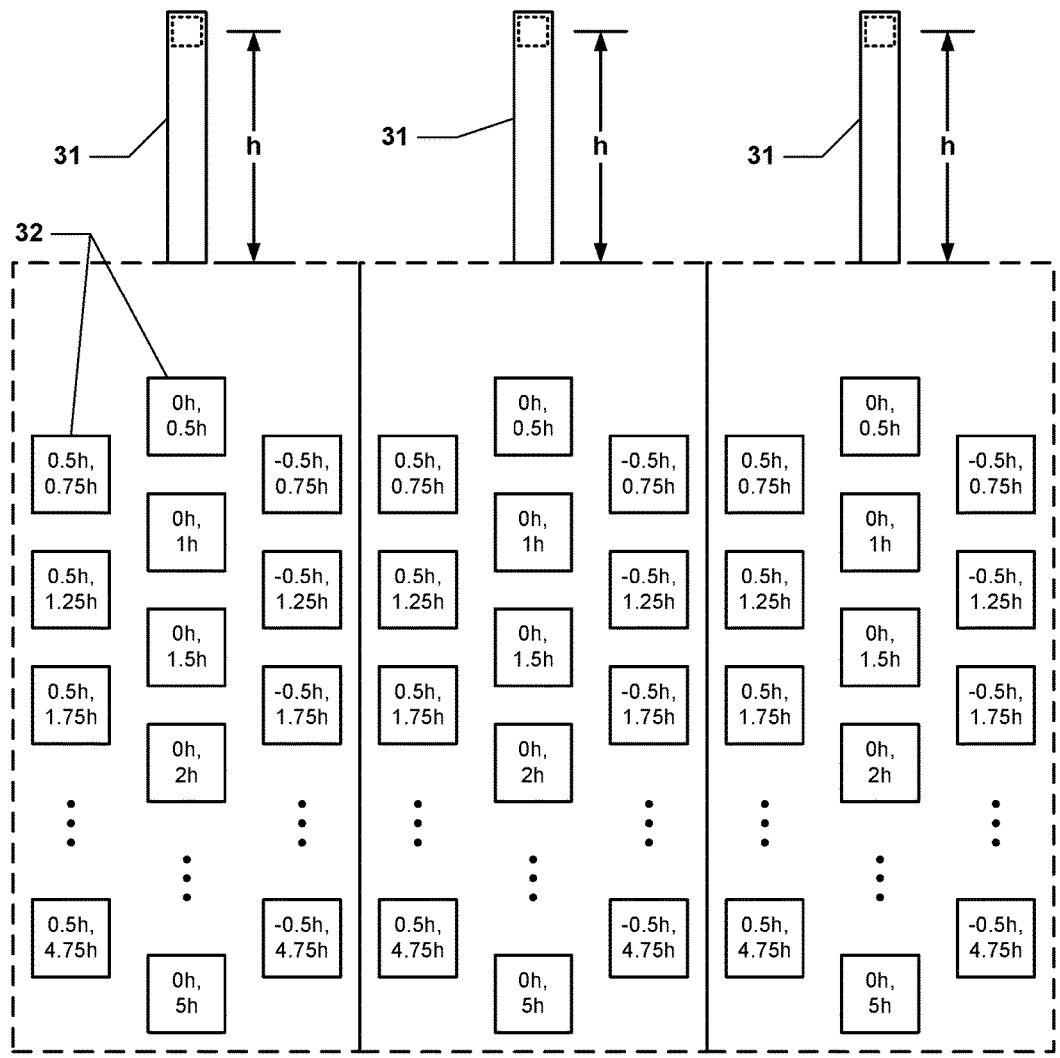
FIG. 3A illustrates an example of a collector module field layout for an example tower solar power plant, consistent with aspects related to the innovations herein.

An example collector module and tower layout for a series of 2-D fixed target solar thermal tower plants is shown in FIG. 3A with towers 31 and collector modules 32 (in FIG. 3A, each collector module is shown as having XY coordinates where the first coordinate indicates the distance (as a function of tower height) of the collector module center from the tower along a generally longitudinal line and the second coordinate indicates the distance (as a function of tower height) between the collector module center and that longitudinal line in a generally latitudinal direction—of course, other patterns may be used as well and the present disclosure is not limited to just the depicted patterns and the indicated coordinates). Each 2-D fixed target solar thermal tower plant may have a peak power that is provided by the number of collector modules. Each collector module may be supported by a sun tracking device and may have a variable individual concentration ratio that depends on the collector module's location relative to the corresponding target position. Each collector module may have a number of smaller reflectors/mirrors that are either flat or curved.

Figure 3B:
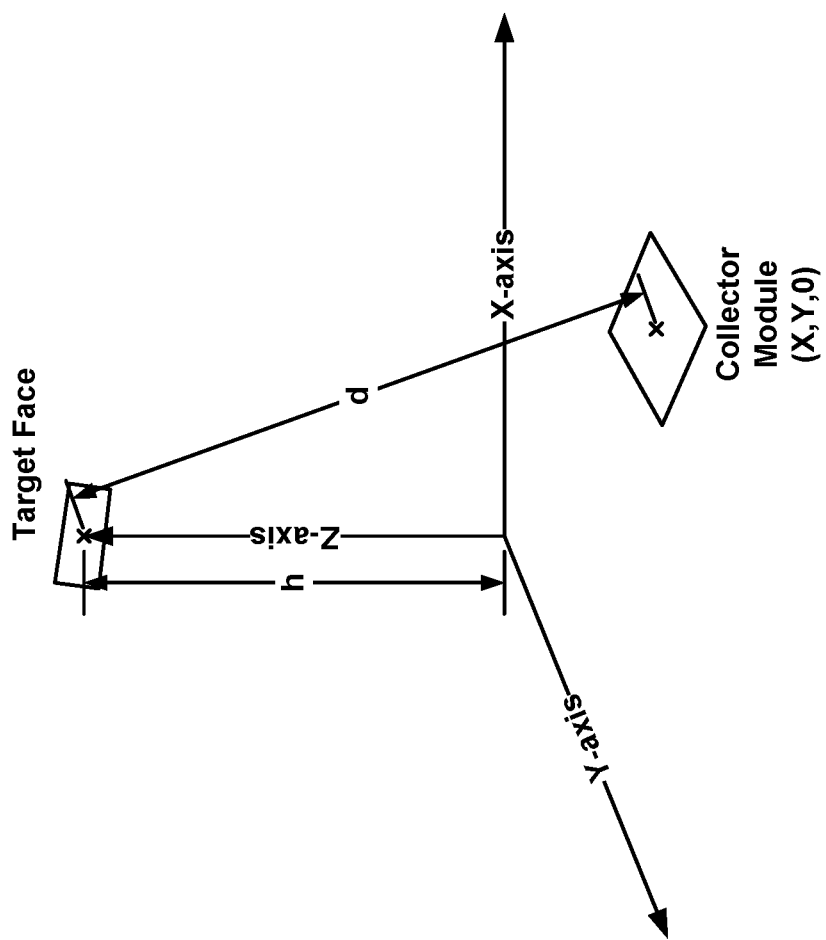
FIG. 3B illustrates the relative position between the tower receiver and an example collector module for an example of a tower solar power plant, consistent with aspects related to the innovations herein.

FIG. 3B illustrates the Earth surface coordinate system for a collector module. The Earth surface coordinate system origin is at the tower receiver face center projected on the Earth plane, i.e., directly beneath the receiver target face center on a plane that is tangent to the nominal surface of the Earth at that location, with the x and y axes pointing to the north and east, respectively, and with the z-axis pointing towards the target face center of the receiver. Height h defines the distance from a plane parallel to the Earth plane and generally coincident with the rotational centers of the collector modules to the target face center and may represent the nominal tower height. Each collector module may be positioned at a location (X, Y, 0) with respect to the Earth surface coordinate system, and the rotational center of the collector module may be a distance d away from the target face center.

Figure 4:
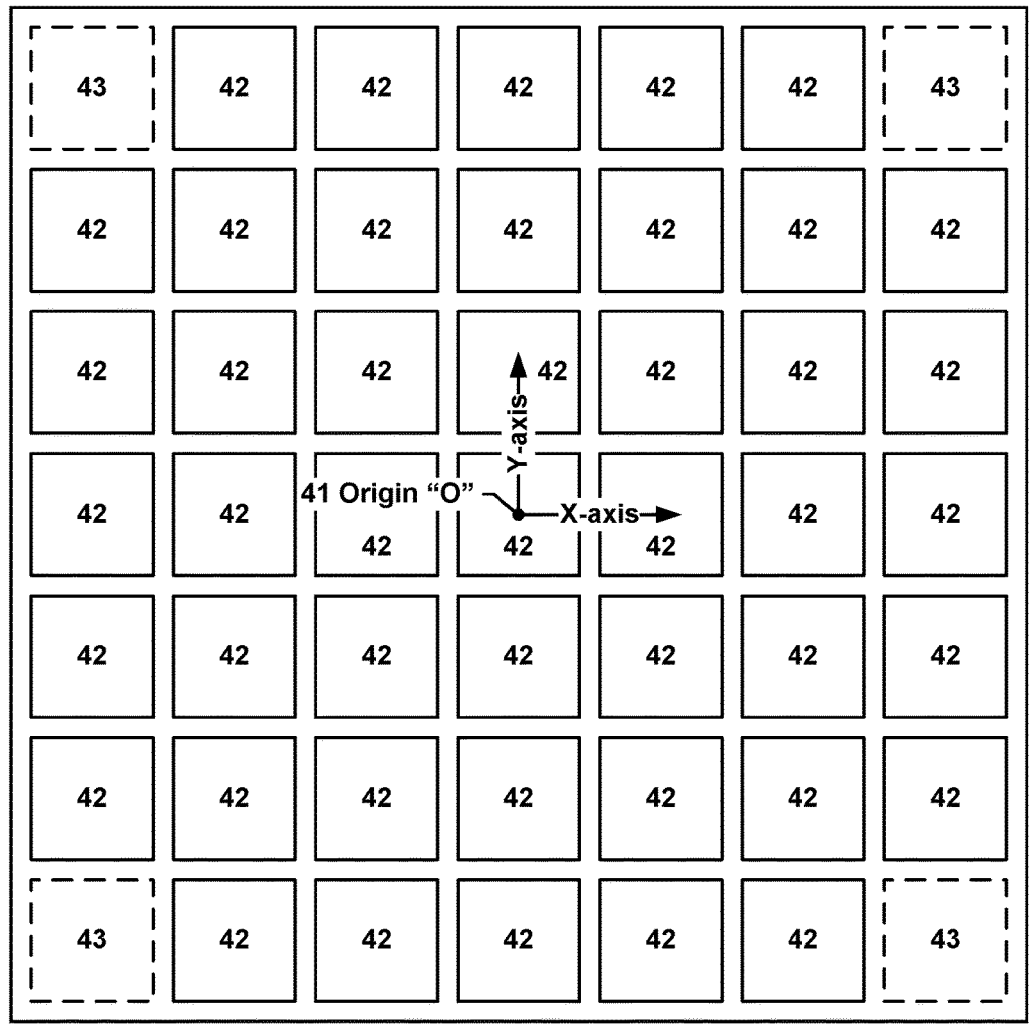
FIG. 4 is a diagram illustrating a layout of an example collector module for an example tower solar power plant, consistent with aspects related to the innovations herein.

The layout of the individual reflectors/mirrors for an example solar collector module is shown in FIG. 4. A Cartesian coordinate system is used with the x and y axes aligned with the module frame and with the origin at the module rotational center 41 (this is the same coordinate system as in FIG. 2).

The following examples describe how to obtain the defocusing effects for a given collector module and how to determine the concentration ratio for each collector module.

The tracking system and the defocusing effects of each module are described with respect to the Earth surface coordinate system with x and y axes aligned with the north and east, respectively, and with the origin at the module rotation center and the z axis pointed zenith-wards.

The tracking system and defocusing effects for a 2-D fixed target solar thermal tower plant with respect to the Earth surface coordinate system are discussed. In the following discussion, the XYZ coordinate system is to be understood to be aligned with the Earth surface coordinate system (x axis pointing to the east, y axis pointing to the north, and z axis pointing upwards).

When the sunbeam, receiver target face center, and the rotational center of a collector module do not line up in a straight line, the beam incident unit vector $\vec{I}_m$ that falls on the center reflector of the collector module may be obtained in the Earth surface coordinate system:

$$\vec{I}_m = \begin{pmatrix} I_{mx} \\ I_{my} \\ I_{mz} \end{pmatrix} = \begin{pmatrix} -\cos\delta\sin\omega \\ \cos\phi\sin\delta - \sin\phi\cos\delta\cos\omega \\ \cos\phi\cos\delta\cos\omega + \sin\phi\sin\delta \end{pmatrix} \quad (4)$$

The δ is the declination angle defined as the angle between the sunbeam and the equatorial plane of the Earth with a value range between −23.5° to +23.5° and given by:

$$\delta = \arcsin\{0.39795 \cos [0.98563(N-173)]\} \quad (5)$$

where, as before, the argument of the cosine in degrees and the day numbering N starts in January 1.

The hour angle ω is defined as the angle that describes the earth's rotational position about its polar axis and that increases by 15 degrees every hour with a value of 0 at solar noon at the location of the solar thermal tower plant. ω is given by:

$$\omega = 15(t_s - 12) \quad (6)$$

where $t_s$ is the solar time in hours.

The unit vector $\vec{N}_m$ of a collector module panel, which is also the vector of the center reflector of the collector module, for a collector module to track the sun at different times during a day may be obtained by:

$$\vec{N}_m = \frac{\vec{I}_m + \vec{R}_m}{2\cos\left[\frac{1}{2}\arccos(\vec{I}_m \cdot \vec{R}_m)\right]} \quad (7)$$

where the reflection unit vector $\vec{R}_m$ of a collector module is given by:

$$\vec{R}_m = (-X, -Y, d)/\sqrt{X^2 + Y^2 + d^2} \quad (8)$$

Figure 5:
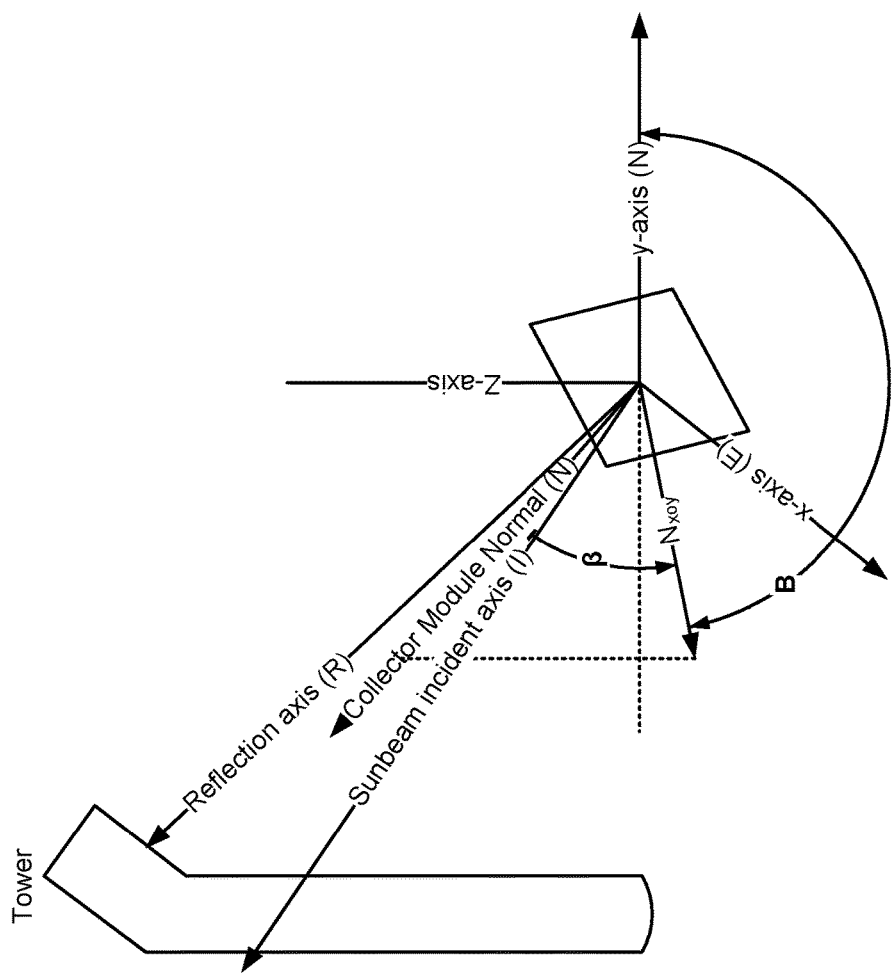
FIG. 5 is a schematic diagram illustrating tracking angles for a reflector on a collector module at different time during a day at the Earth coordinate system, consistent with aspects related to the innovations herein.

The normal unit vector $\vec{N}_m$ of a collector module may also be obtained through a tracking rotation matrix R as follows:

$$R = R_z(B) \cdot R_x\left(\frac{\pi}{2} - \beta\right) \cdot R_z(-B)$$

$$= \begin{pmatrix} \cos B & \sin B & 0 \\ -\sin B & \cos B & 0 \\ 0 & 0 & 1 \end{pmatrix} \cdot \begin{pmatrix} 1 & 0 & 0 \\ 0 & \cos\left(\frac{\pi}{2} - \beta\right) & \sin\left(\frac{\pi}{2} - \beta\right) \\ 0 & \sin\left(\frac{\pi}{2} - \beta\right) & \cos\left(\frac{\pi}{2} - \beta\right) \end{pmatrix} \cdot \begin{pmatrix} \cos B & -\sin B & 0 \\ \sin B & \cos B & 0 \\ 0 & 0 & 1 \end{pmatrix}$$

$$= \begin{pmatrix} \cos B^2 + \sin B^2 \sin\beta & -\cos B \sin B + \cos B \sin B \sin\beta & \sin B \cos\beta \\ -\cos B \sin B + \cos B \sin B \sin\beta & \sin B^2 + \cos B^2 \sin\beta & \cos B \cos\beta \\ -\sin B \cos\beta & -\cos B \cos\beta & \sin\beta \end{pmatrix} \quad (9)$$

where the angle B is measured clockwise from a projection of the unit normal vector $\vec{N}_m$ of a collector module on the x-y plane to the y-pointing coordinate axis and the angle $\beta$ is defined as the angle between the unit normal vector $\vec{N}_m$ of the collector module and the x-y plane of the collector coordinate system. FIG. 5 plots the module tracking angle B and the angle $\beta$. The module tracking angle B and the angle $\beta$ are given by parameters obtained in the equation below:

$$\begin{cases} \cos B = \dfrac{N_{my}}{\sqrt{N_{mx}^2 + N_{my}^2}}, & B = \begin{cases} B(N_{mx} > 0) \\ 360 - B \ (N_{mx} < 0) \end{cases} \\ \cos\beta = \sqrt{N_{mx}^2 + N_{my}^2} \end{cases} \quad (10)$$

Figure 6:
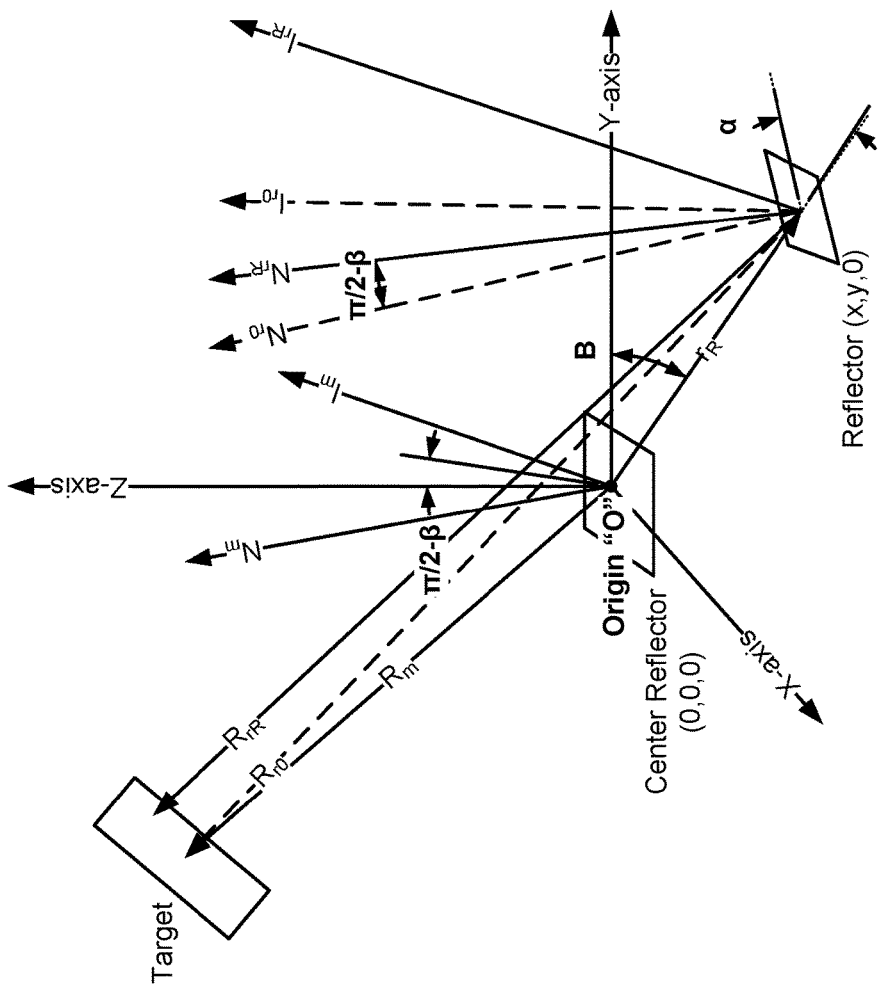
FIG. 6 is a schematic diagram illustrating rotation of a normal unit vector for a reflector on a collector module tracking the sun at different time during a day, with every individual reflector having an initial angle α for 2-D modular tower solar power plant at the Cartesian coordinate system, consistent with aspects related to the innovations herein.

FIG. 6 plots the normal unit vector of a specific reflector for a collector module tracking the sun at a particular time during a day. The normal unit vector $\vec{N}_{rR}$ of a specific reflector of the collector module may be obtained by using the same rotational matrix R discussed earlier in this disclosure. Using the rotational matrix R, the normal unit vector $\vec{N}_{rR}$ of a specific reflector for a collector module is given by:

$$\vec{N}_{rR} = R \vec{N}_{r0}(x,y,0) \quad (11)$$

The vector that points from the collector unit origin, e.g., the center reflector center or the rotational center of the collector module, to the specific reflector center is $\vec{r}(x, y, 0)$ and the deviation from the center of receiver of the reflector position $\vec{r}_R$ after a collector module rotation is given by:

$$\vec{r}_R = \overline{R} r(x,y,0) \quad (12)$$

The beam incident unit vector of a specific reflector $\vec{I}_{rR}$ for a collector module is equivalent to the incident unit vector $\vec{I}_m$ of the collector module when tracking the sun at a given time:

$$\vec{I}_{rR} = \vec{I}_m \quad (13)$$

The reflection unit vector $\vec{R}_{rR}$ of a specific reflector for the collector module when tracking the sun during a day is given by:

$$\vec{R}_{rR} = 2 \cdot \vec{N}_{rR} \cdot \cos(\vec{I}_{rR} \cdot \vec{N}_{rR}) - \vec{I}_{rR} \quad (14)$$

According to the reflection unit vector of a specific reflector for a collector module $\vec{R}_{rR}$ and the position for each reflector after collector module rotation, a line may be obtained by using:

$$\frac{x' - r_{Rx}}{R_{rRx}} = \frac{y' - r_{Ry}}{R_{rRx}} = \frac{z' - r_{Rz}}{R_{rRx}} \quad (15)$$

The formula of the receiver face may thus be given by:

$$A(x' - x_0) + B(y' - y_0) + C(z' - z_0) + D = 0 \quad (16)$$

$$\begin{cases} A = X_0 \\ B = Y_0 \\ C = -h \end{cases}, \quad \begin{cases} x_0 = -X - r_{Rx} \\ y_0 = -Y - r_{Ry} \\ z_0 = h - r_{Rz} \end{cases}$$

where $r_{Rx}$, $r_{Ry}$, $r_{Rz}$ are the x, y and z components of $\vec{r}_R$ and $R_{rRx}$, $R_{rRy}$ and $R_{rRz}$, are the x, y, and z components of $\vec{R}_{rR}$. X and Y are the x and y components for each module position relative to the tower (as shown in FIG. 3B). Similarly, $X_0$ and $Y_0$ are the x and y components for the collector module with the tie line between the module center and the target center perpendicular to the target surface. The h is the relative vertical height of the target face center of the tower to the module center of rotation.

Using vector calculation, we may obtain an example formula for the defocusing effect ($\Delta x$, $\Delta y$, and $\Delta z$). Again, even though module normal unit vector rotation during the tracking may ensure that the collector module reflection vector always point at the receiver face center, the reflection vectors of different reflectors on the collector module may deviate from the receiver face center. These deviations on the receiver face plane $\Delta x$, $\Delta y$, and $\Delta z$ are given by:

$$\begin{cases} \Delta x = x' \\ \Delta y = y' - Y \\ \Delta z = z' \end{cases} \quad (17)$$

Figure 7:
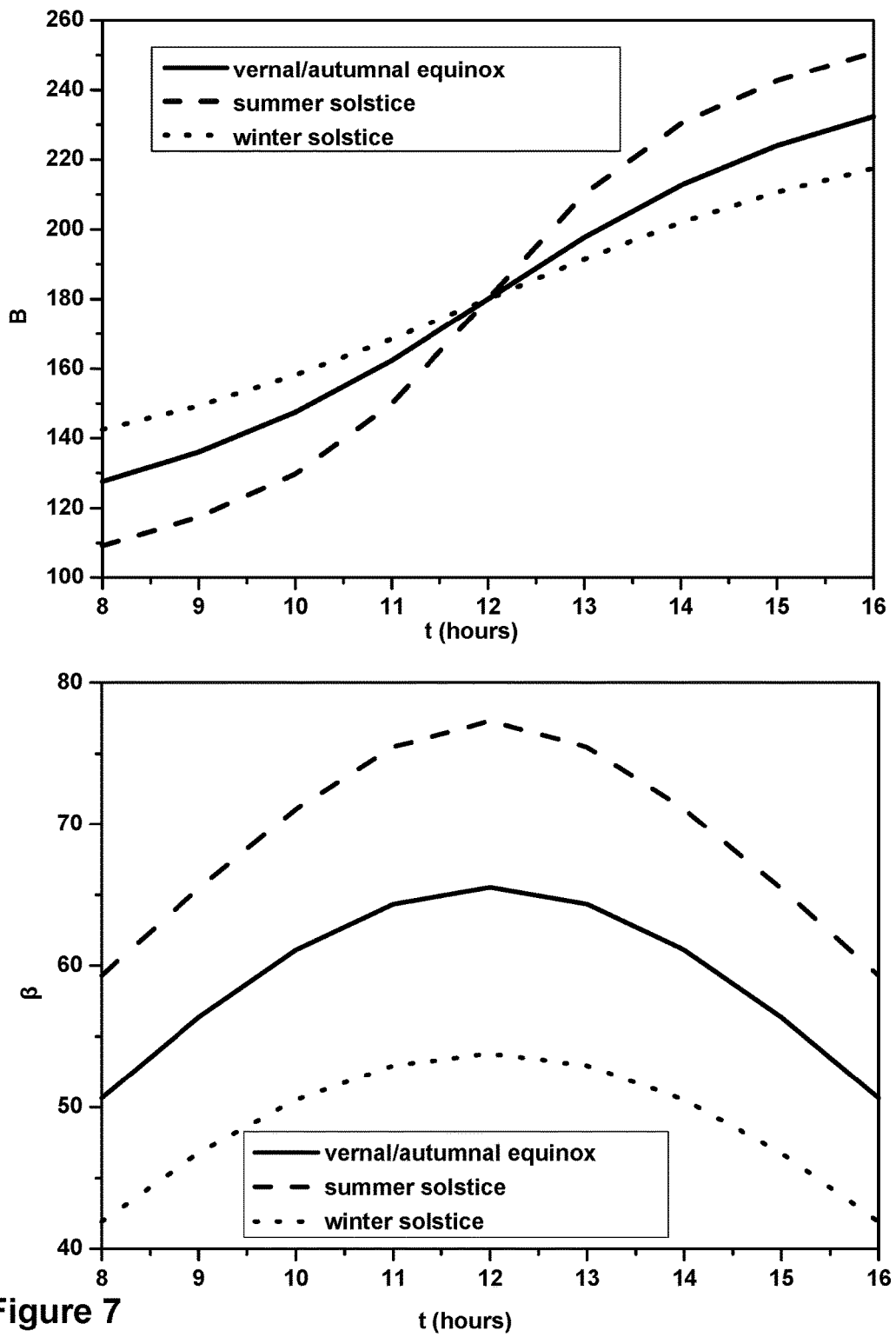
FIG. 7 illustrates the tracking angle of a reflector for 2-D modular fixed thermal target type solar plants as function of time at vernal/autumnal equinox, summer solstice and winter solstice, relatively, consistent with aspects related to the innovations herein.

In the following detailed examples, an example tracking system is described, including defocusing effects and concentration ratios of a given collector module using the Earth surface coordinate system. For the sun position described of FIG. 2, all of the reflectors in a collector module will reflect the incident sunbeam towards the center of the receiver target face. However, when the sun is in any other position, the normal unit vector of the collector module must be rotated away from the position described in FIG. 2 in order to keep the collector module reflection vector on the center of the receiver target face. In this example, the rotational center of the collector module is the center of the center reflector of the collector module. FIG. 7 illustrates the tracking angles B and $\beta$ as function of local 24-hour time at vernal/autumnal equinox, summer solstice, and winter solstice. In the example of FIG. 7, the collector module center is 6 m from the tower receiver target face center (d=6 m) and the location latitude is 18° N. In some embodiments, the tracking angle of a collector module as a function of time during a day (from 8:00 am to 4:00 pm) at the vernal/autumnal equinox, summer solstice, and winter solstice are indicated by the straight line, the dashed line, and the dotted line, respectively. In this way, as shown in FIG. 7, tracking angle at anytime and anywhere can be obtained.

Figure 8:
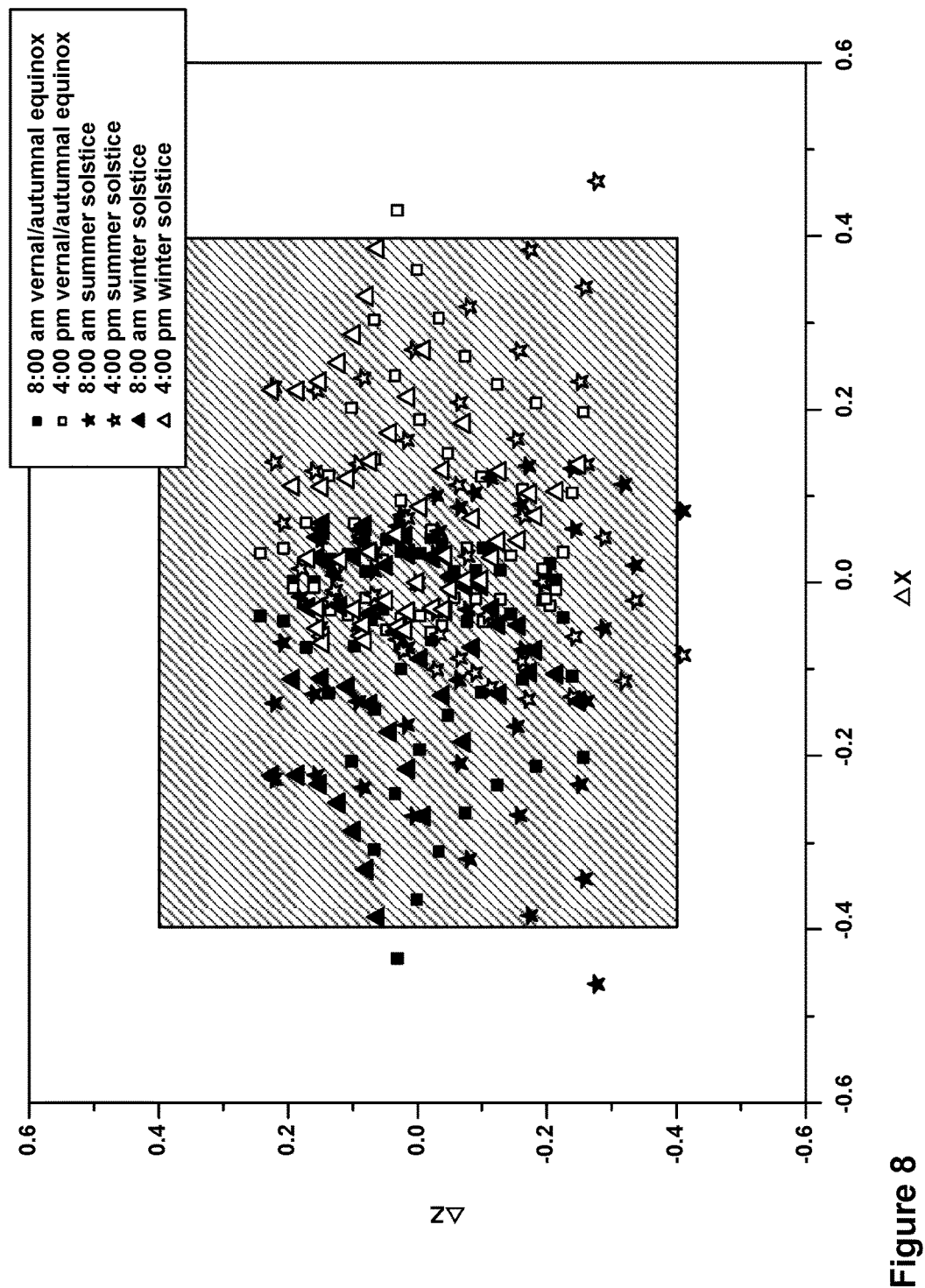
FIG. 8 is a plot illustrating example focusing errors for an example collector module for an example tower solar thermal power plant, consistent with aspects related to the innovations herein.

Since the collector module rotational center is not the center of all reflectors in the collector module (with the exception of the central reflector), collector module rotation may result in the reflection vectors for different reflectors deviating from the center of the receiver target face. FIG. 8 is a diagram showing example focusing errors calculated for the example collector module with d=6 m. The initial angles α of the reflectors for the collector module in this example are obtained with the solar thermal tower plant at latitude of 18°; the collector module in this example has 45 reflectors (a 7×7 array with corner reflectors omitted). FIG. 8 describes the defocusing point coordinates of all of the reflectors for this example collector module at 8:00 am and 4:00 pm on vernal/autumnal equinox, summer solstice, and winter solstice. The focusing errors of the reflectors at 8:00 am and 4:00 pm on the vernal/autumnal equinox are indicated by the black squares and white squares, respectively, the focusing errors of the reflectors at 8:00 am and 4:00 pm on the summer solstice are indicated by the black pentagrams and white pentagrams, respectively, and the focusing errors of the reflectors at 8:00 am and 4:00 pm on the winter solstice are indicated by the black triangles and white triangles, respectively. The layout (leaving out reflectors with larger errors, e.g., the corner reflectors of the 7×7 array of this example) of this example collector module may be obtained by only including reflectors with focusing errors confined within a particular boundary, e.g., focusing errors satisfying $-0.4 \text{ m} \leq \Delta x \leq 0.4 \text{ m}$, $-0.4 \text{ m} \leq \Delta z \leq 0.4 \text{ m}$ as shown in FIG. 8.

In one example configuration, e.g., such as the example collector module of FIG. 4, the collector modules may be designed such that each reflector in the collector modules has nominal dimensions of 40 cm by 40 cm, and the receiver target face has dimensions of 80 cm by 80 cm. Such an example configuration may have a concentration ratio of about 10 provided by the reserved reflectors 42 (the removed reflectors 43 do not contribute to the concentration factor, of course). Similarly, the layouts for other collector modules in the solar tower plant may be obtained in a similar manner, e.g., by calculating the focusing errors of each reflector for each collector module based on each collector module's X, Y, θ position and then omitting the reflectors from array positions in each collector module that have focusing errors that exceed the focusing error envelope, e.g., $-0.4 \text{ m} \leq \Delta x \leq 0.4 \text{ m}$, $-0.4 \text{ m} \leq \Delta z \leq 0.4 \text{ m}$.

In some implementations, the concentration ratios for individual reflectors in a collector module may be different and, in some further or alternative implementations, each collector module may have a variable individual concentration ratio that depends on the location of the collector module relative to the target position in order to maximize the total concentration ratio of the solar thermal tower plant.

Generally speaking, the collector module field layout for a fixed target solar thermal tower plant may be as shown in FIG. 3A with towers 31 and collector modules 32. As discussed, multiple solar thermal tower plants may be ganged together and arrayed to provide an aggregate power production that is higher than any individual solar thermal tower plant (FIG. 3A depicts three solar thermal tower plants arrayed in an E-W line). In some embodiments, each collector module may have an individual concentration ratio that is much larger than the concentration ratio of 3 that is the upper practical limit of conventional thermal solar tower plants. Furthermore, in order to maximize the total concentration ratio, each collector module may have a variable individual concentration ratio that depends on the collector module location relative to the target position. Each collector module may have a number of smaller reflectors that are planar or that have curvature. In this way, a total concentration ratio of more than 200 to 300 purely due to collector modules may be achieved (a concentration ratio that is on the scale of conventional thermal solar tower plants, but using a drastically reduced number of collector modules as compared with the number of tracking reflectors used in a conventional solar thermal tower plant). Due to the smaller sizes of the solar thermal tower plants discussed herein, the blackbody radiation loss may be kept small (as compared with conventional solar thermal tower plants). For the embodiments with collector optical concentration ratios in the range of 10-30, larger power (200 kW-500 kW) towers may be implemented, even without using selective absorption coatings or vacuum insulation by using a larger number of collector modules.

It is to be understood that by limiting the placement of collector modules for a given solar thermal tower to a narrow N-S strip where the cosine efficiency is high, e.g., in the 90% and higher range, the effective use of higher-concentration ratio collector modules, e.g., collector modules with concentration ratios of 10 to 40, may be facilitated. Conventional solar thermal tower plants that include large fields of collector modules spread across areas with much lower cosine efficiencies cannot use such high-concentration ratio collector modules since a) each collector module would need to be custom-built to account for the optical conditions of the location in which it is mounted (and thus be prohibitively expensive), and b) the concentration ratios of such custom-built collector modules would be negatively impacted due to the cosine losses. As a result, conventional solar thermal tower plants typically use just one or two different types of mirrors across the entire field of collector modules; such mirrors provide concentration ratios that are typically less than 1, and never more than 3.

While limiting the placement of high-concentration ratio collector modules to an area with high cosine efficiency may help maximize the amount of solar energy that is directed at the thermal receiver, there may only be a limited number of such collector modules that may fit within such a geographic area, e.g., 5-10, limiting the total solar concentration provided by the collector modules. In such cases where it is undesirable to add further collector modules, e.g., due to cost or placement in lower cosine efficiency areas, the thermal receiver may be equipped, as discussed previously, with some form of vacuum insulation and/or selective absorption coating in order to increase the total concentration ratio.

Figure 9:
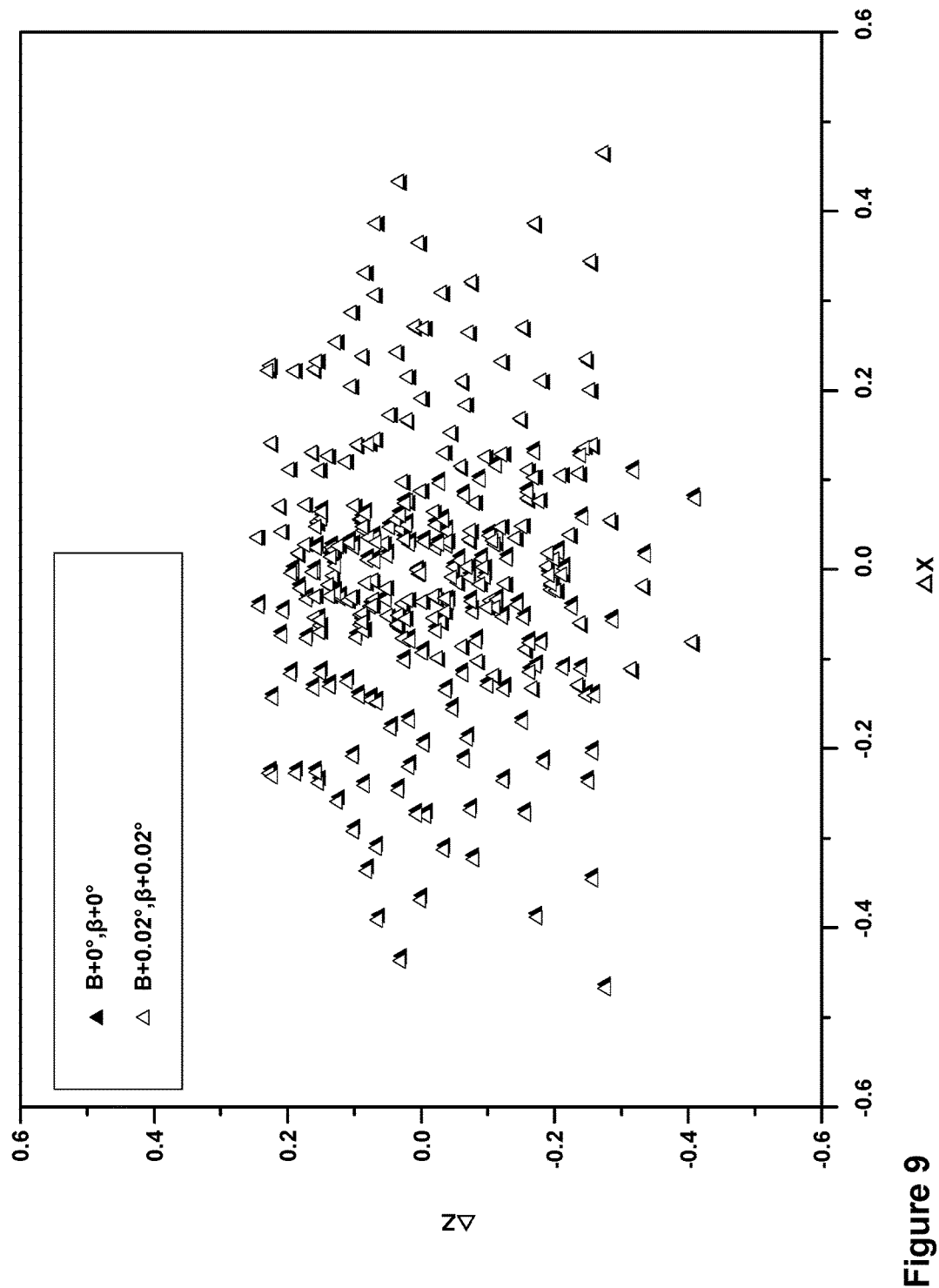
FIG. 9 is a plot illustrating example focusing errors for an example collector module for an example tower solar thermal power plant with and without deviations of tracking angles, consistent with aspects related to the innovations herein.

In addition to the focusing errors discussed above, an additional source of focusing error may be the rotational accuracy of the solar tracking mechanism, e.g., the measurement error of the angular transducers used to determine the rotational movement of each collector module; a common value for such error is ±0.02°. FIG. 9 illustrates the focus errors of FIG. 8 (without differentiating between the vernal/autumnal equinox or winter/summer solstices) as black triangles, and also includes white triangles showing the same data points as modified to account for ±0.02° errors in both B and β. As can be seen, the contribution of tracking system rotational position error may be reduced to a nearly negligible level using currently-available tracking systems.

It should be noted that although the focusing errors due to positioning system inaccuracy are negligible under the conditions described above (at a relatively short distance d=6 m), the focusing error effects may be significant when d is at a higher value. This may limit the tower height and the relative positioning of the collector modules with respect to the tower.

The following further detailed examples describe how to optimize the layout of a modular solar thermal tower system according to the concepts outlined herein at given attitude. The optimal tower height and the positioning of each collector module at given latitude are described.

Figure 10:
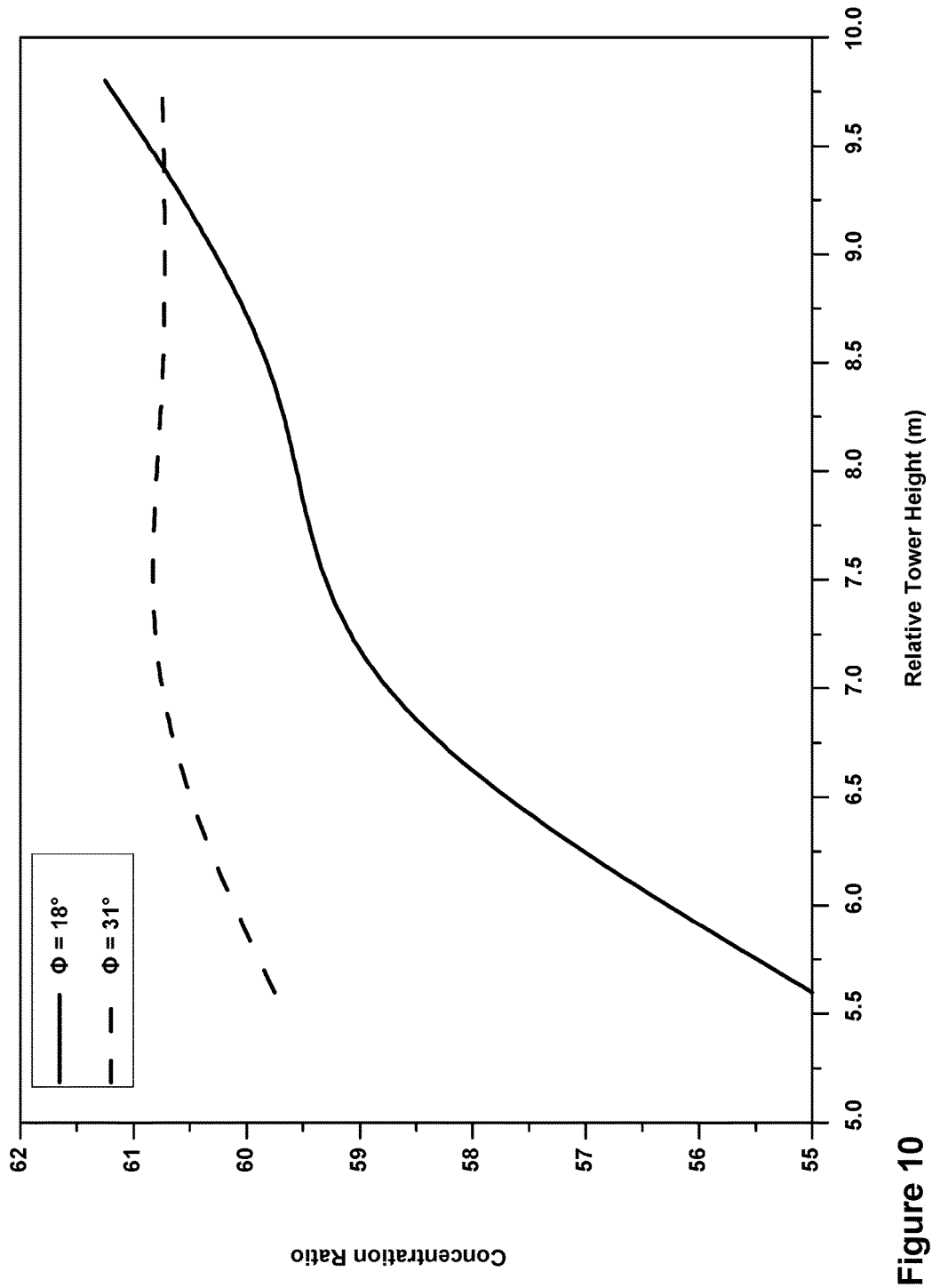
FIG. 10 illustrates concentration ratios for an example fixed thermal target type solar plant as function of tower height, consistent with aspects related to the innovations herein.

FIG. 10 plots the concentration ratios of an example modular solar thermal tower plant at different latitudes (18° and 31°) as a function of tower height h (in meters). In some embodiments, the concentration ratios of a multiple solar thermal tower plant system may include concentration ratios from solar thermal tower plants of different heights. For example, a solar thermal tower plant system may include solar thermal towers each having five collector modules but with different tower heights so as to reduce the potential for shadow blocking of some of the collector modules by adjacent tower units. In some embodiments, the distance between collector modules associated with a tower of a given tower height may be obtained by calculating the shortest distance that allows the sunbeams with the biggest angle of incidence with respect to the collector modules, e.g., sunbeams at the summer solstice or winter solstice, to arrive at each collector module without being blocked by each other. As can be seen, the concentration ratios at different latitudes initially quickly increase with increasing tower height, e.g., 5 m to 7 m and then saturate at higher tower heights, e.g., 7 m+. The higher concentration ratios for tower systems at higher latitudes illustrates that the modular solar thermal tower system has more advantages than the same type of solar thermal plants at lower latitudes (compare, for example, to trough systems, which generally have higher concentration ratios at lower latitudes).

The various collector modules described herein may be implemented using reflectors that may be selected from variety of optics, such as flat mirrors, concave mirrors, reflectors, and other devices capable of reflecting sunlight onto an area that is approximately the same size as the reflective element or of focusing sunlight onto an area smaller than the reflective element. A supporting base or framework of each collector module may include support hardware for supporting each reflector of the collector module at a designed initial angle $\alpha$ with respect to the overall collector module plane. The luminous spot reflected on the receiver target face by each reflector of a collector module will have some variation depending on the positioning of the reflectors as well as the orientation of the sun and the collector module with respect to the tower, and this will affect the concentration ratio of the collector module. Such variation may be compensated for by using curved reflectors for some of the reflectors of a collector module. Curvature radii for reflectors on example collector modules that produce high concentration ratios are discussed below with respect to a particular example implementation.

Figure 11A:
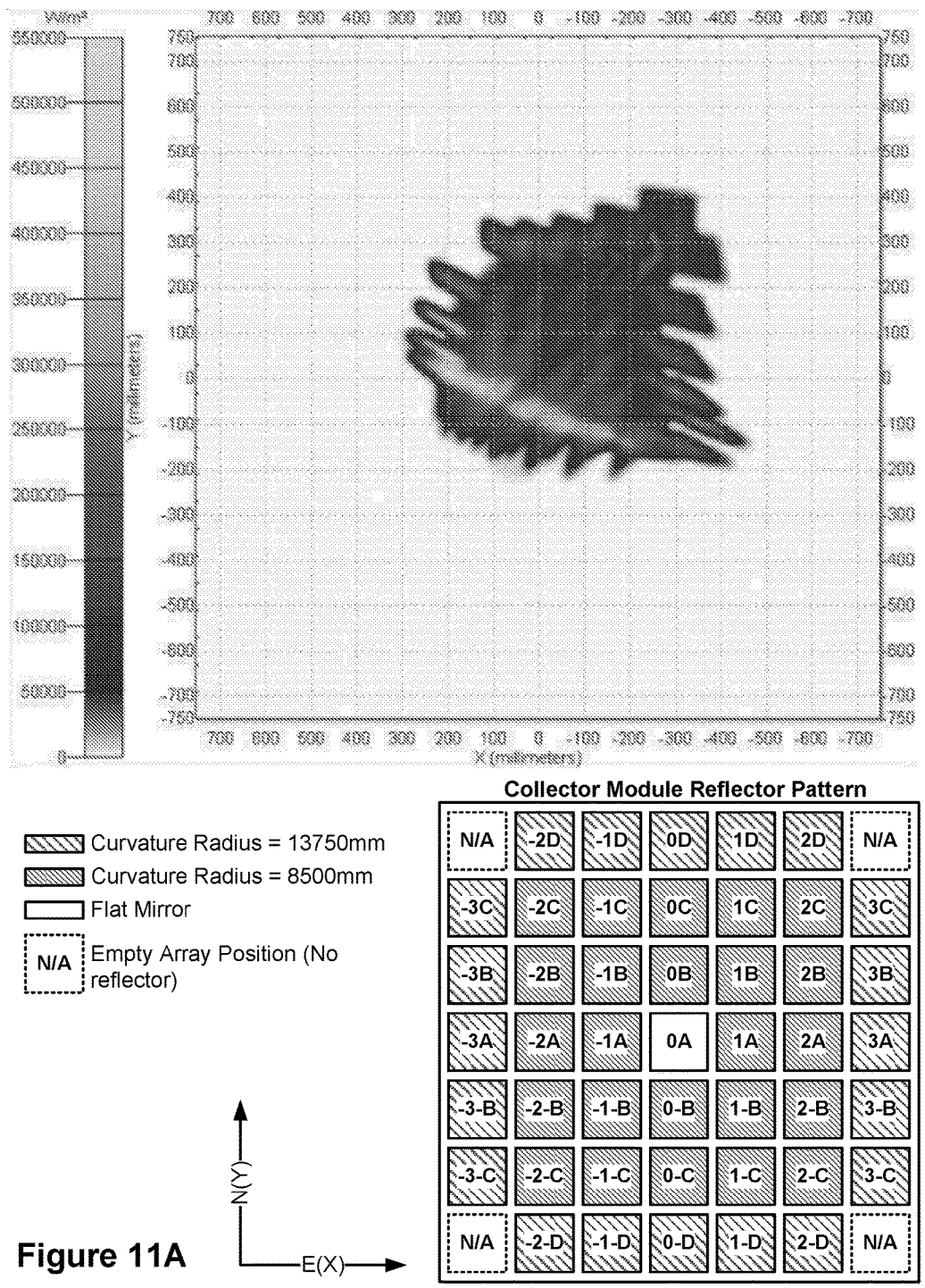
FIGS. 11A, 11C, 11E, 11G, and 11I are schematic diagrams illustrating example focus error (top) and the curvature radius of each reflector for various example collector modules (bottom) for an example tower solar thermal power plant, consistent with aspects related to the innovations herein.
Figure 11B:
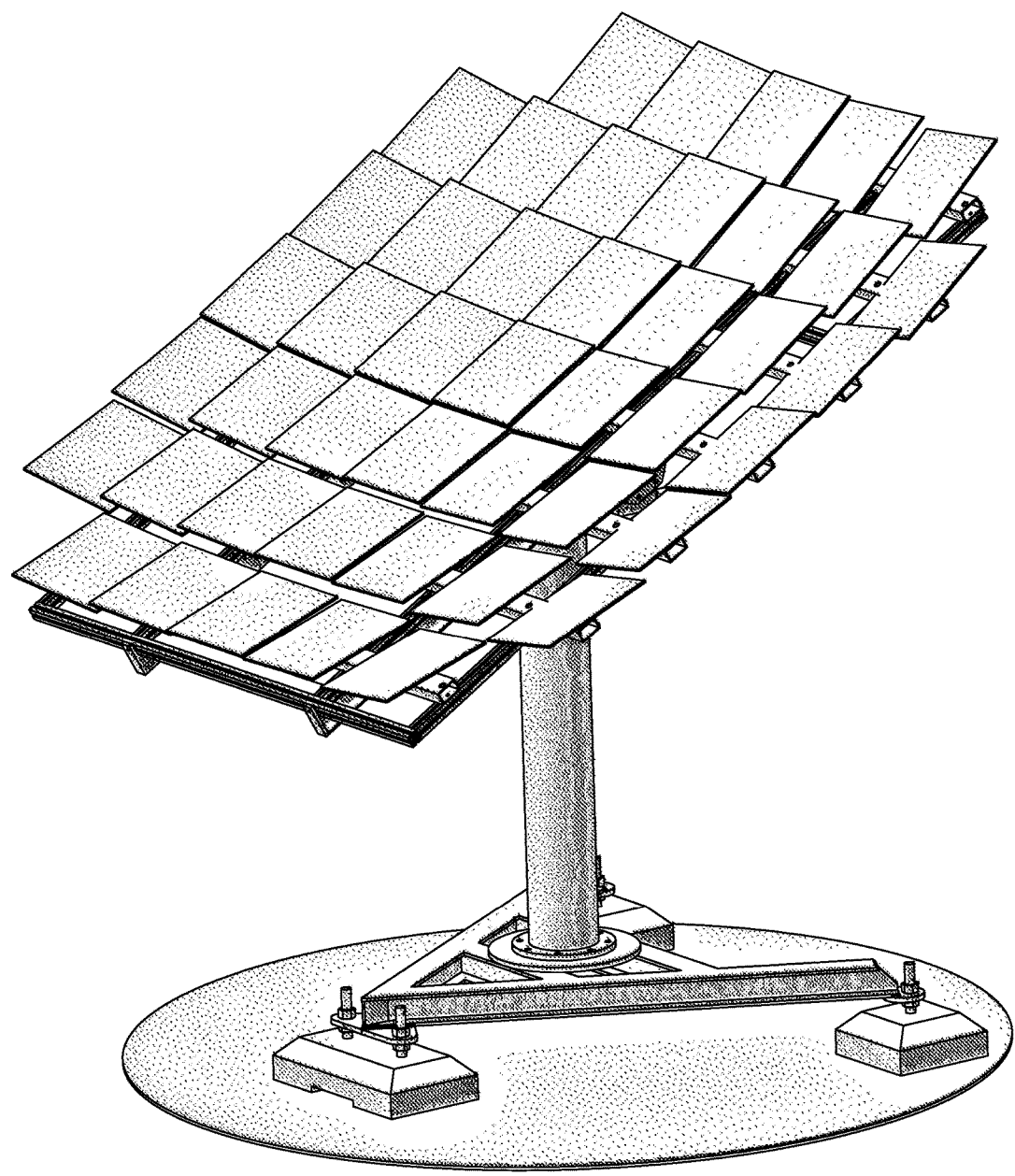
FIGS. 11B, 11D, 11F, 11H, and 11J are drawings of example collector modules corresponding with FIGS. 11A, 11C, 11E, 11G, and 11I, respectively.
Figure 11C:
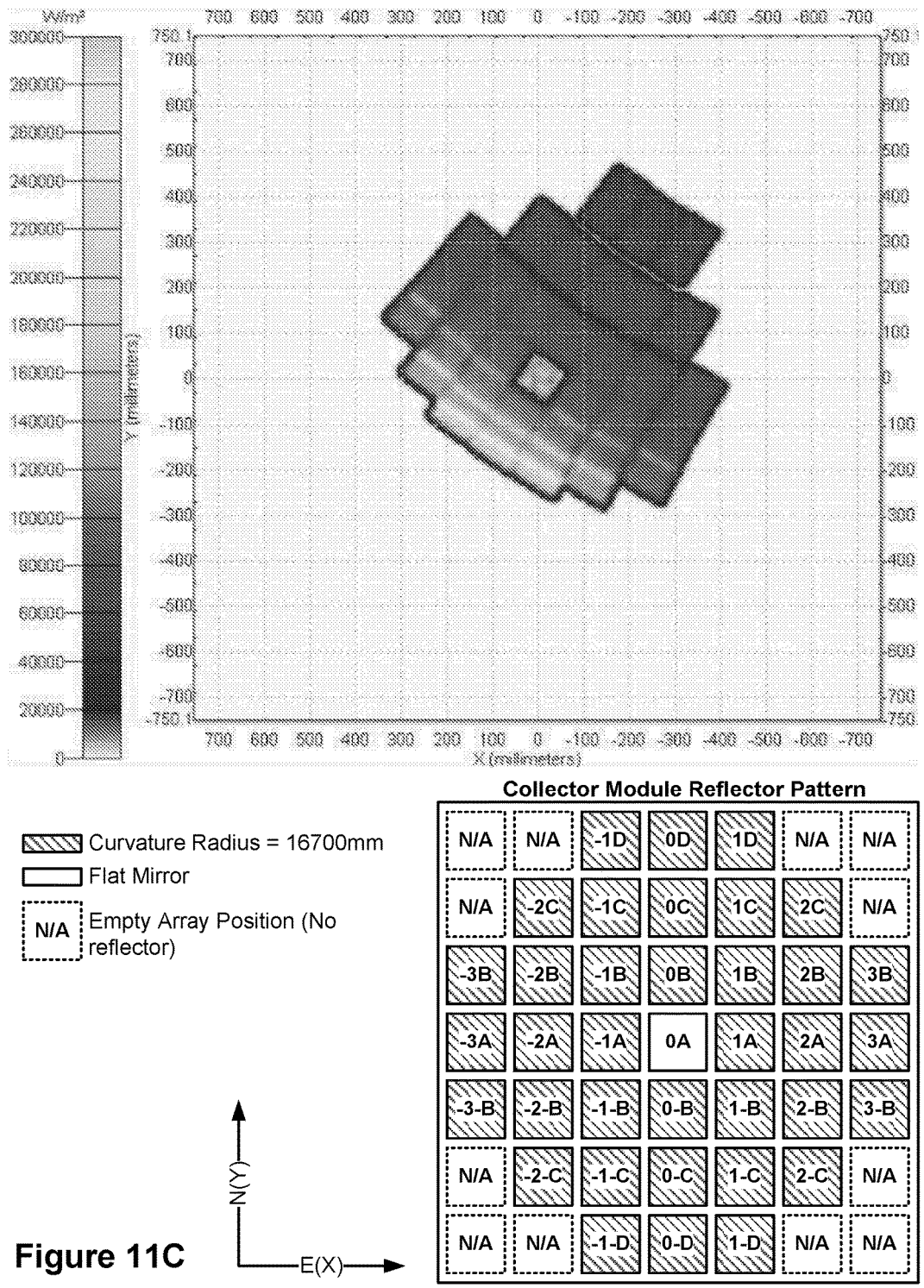
Figure 11D:
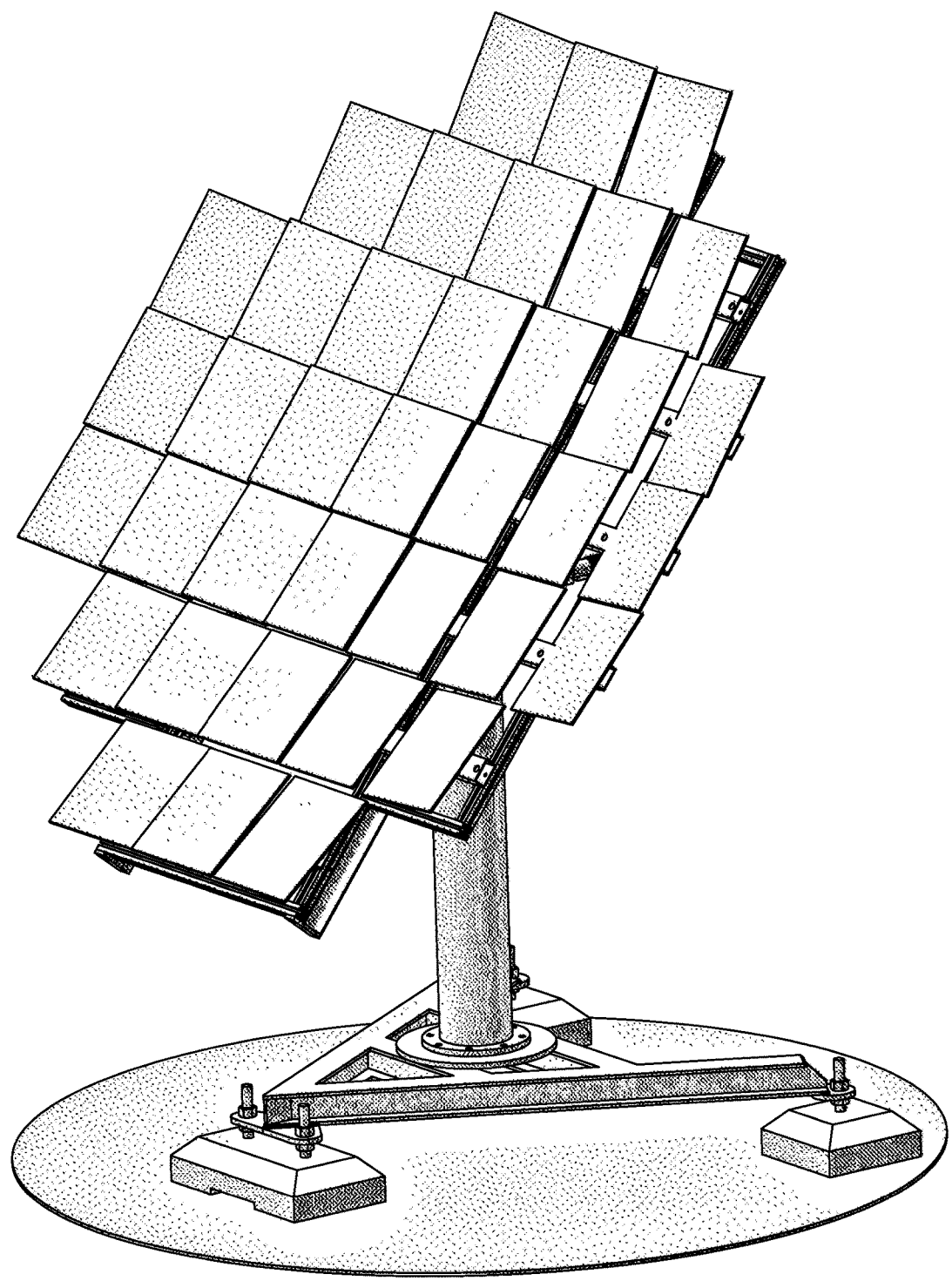
Figure 11E:
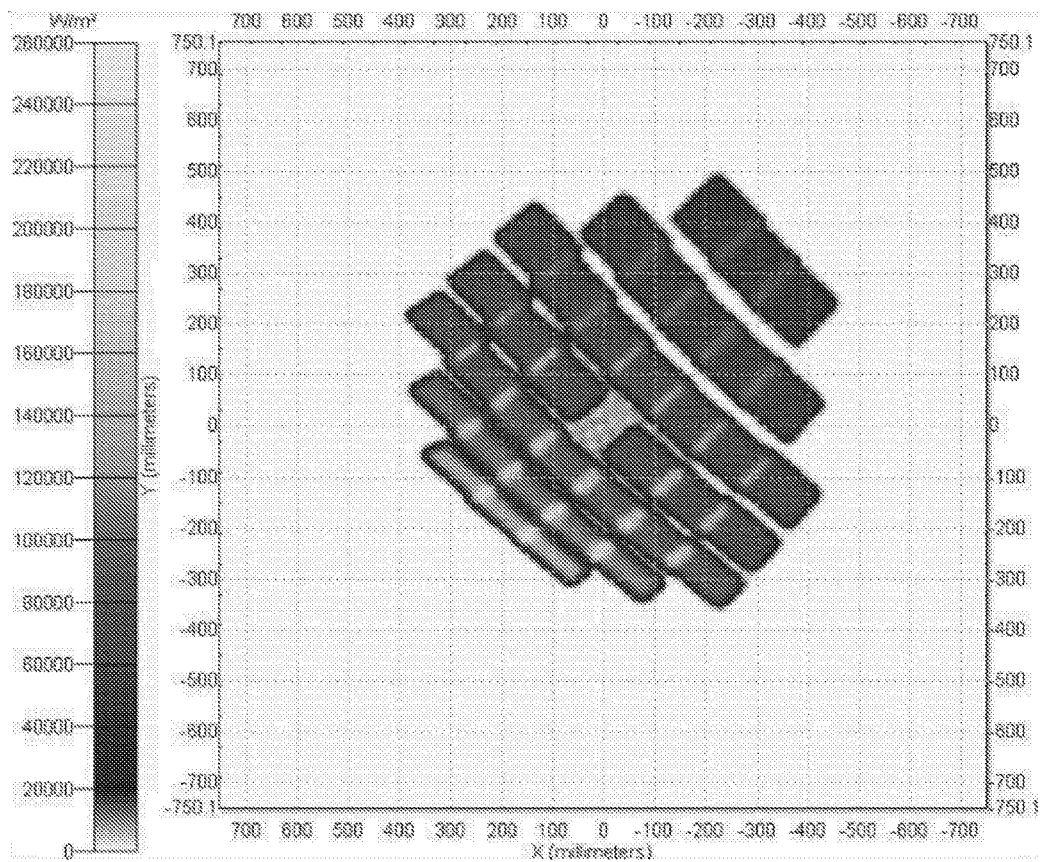
Figure 11F:
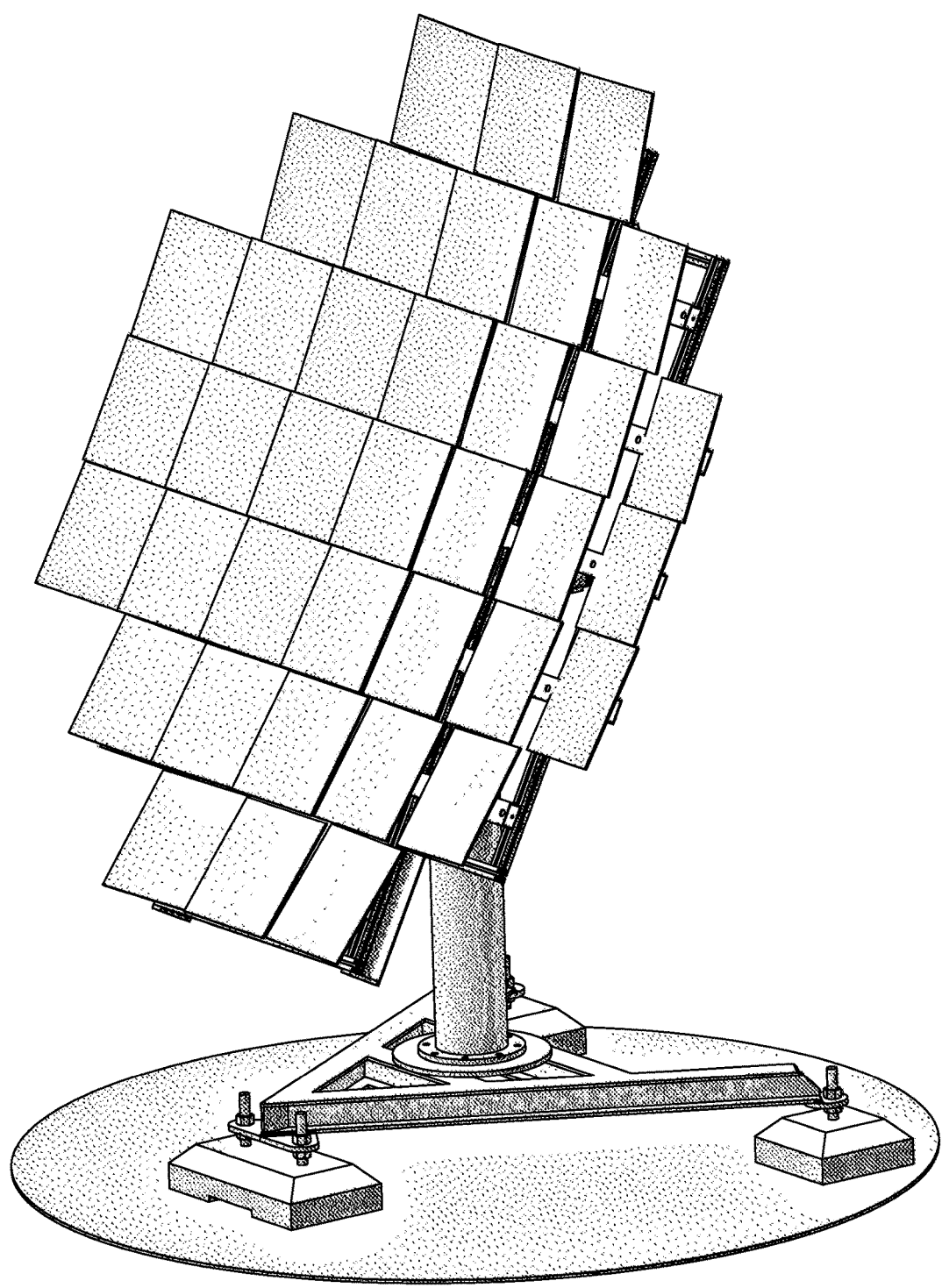
Figure 11G:
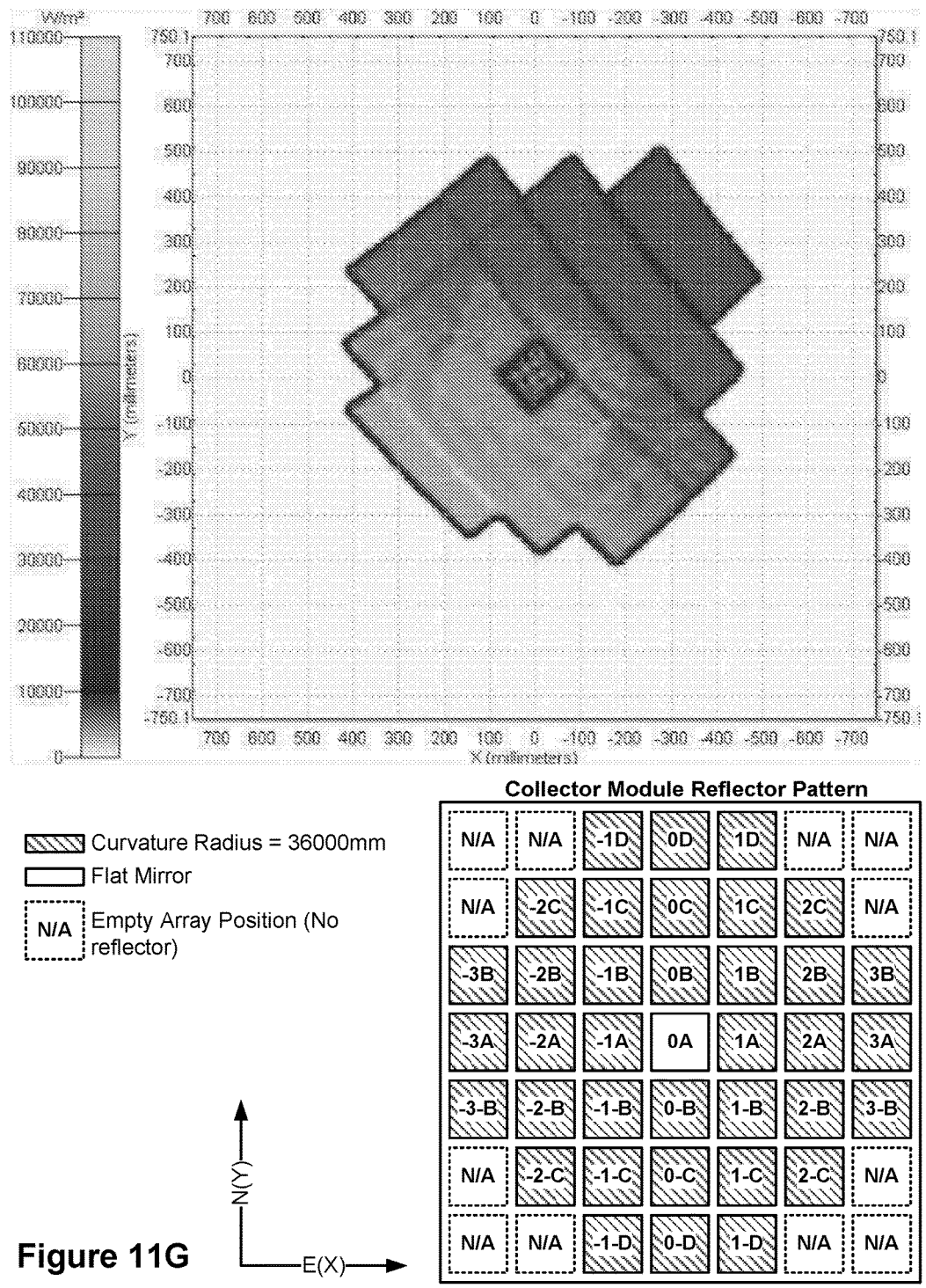
Figure 11H:
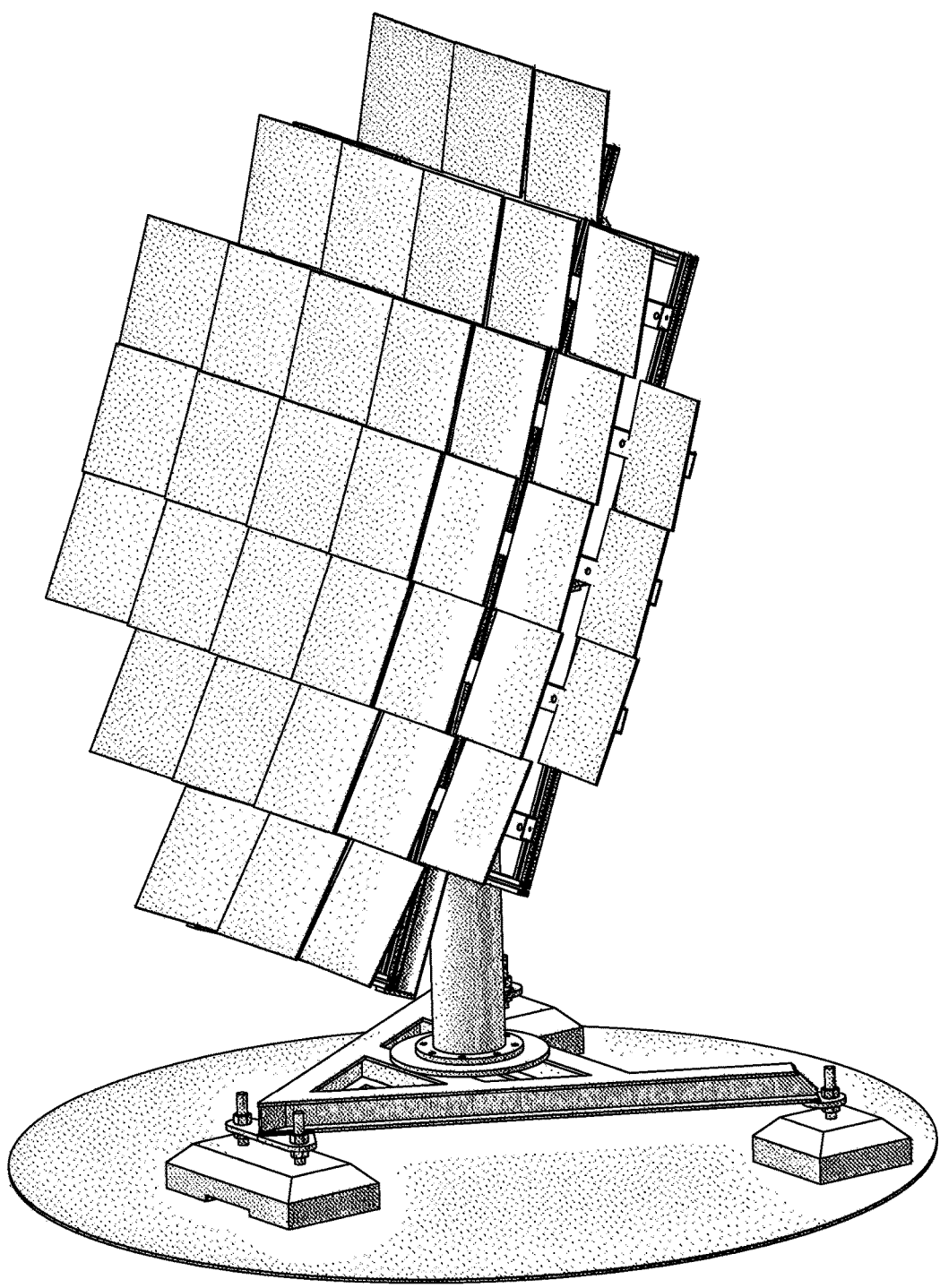
Figure 11I:
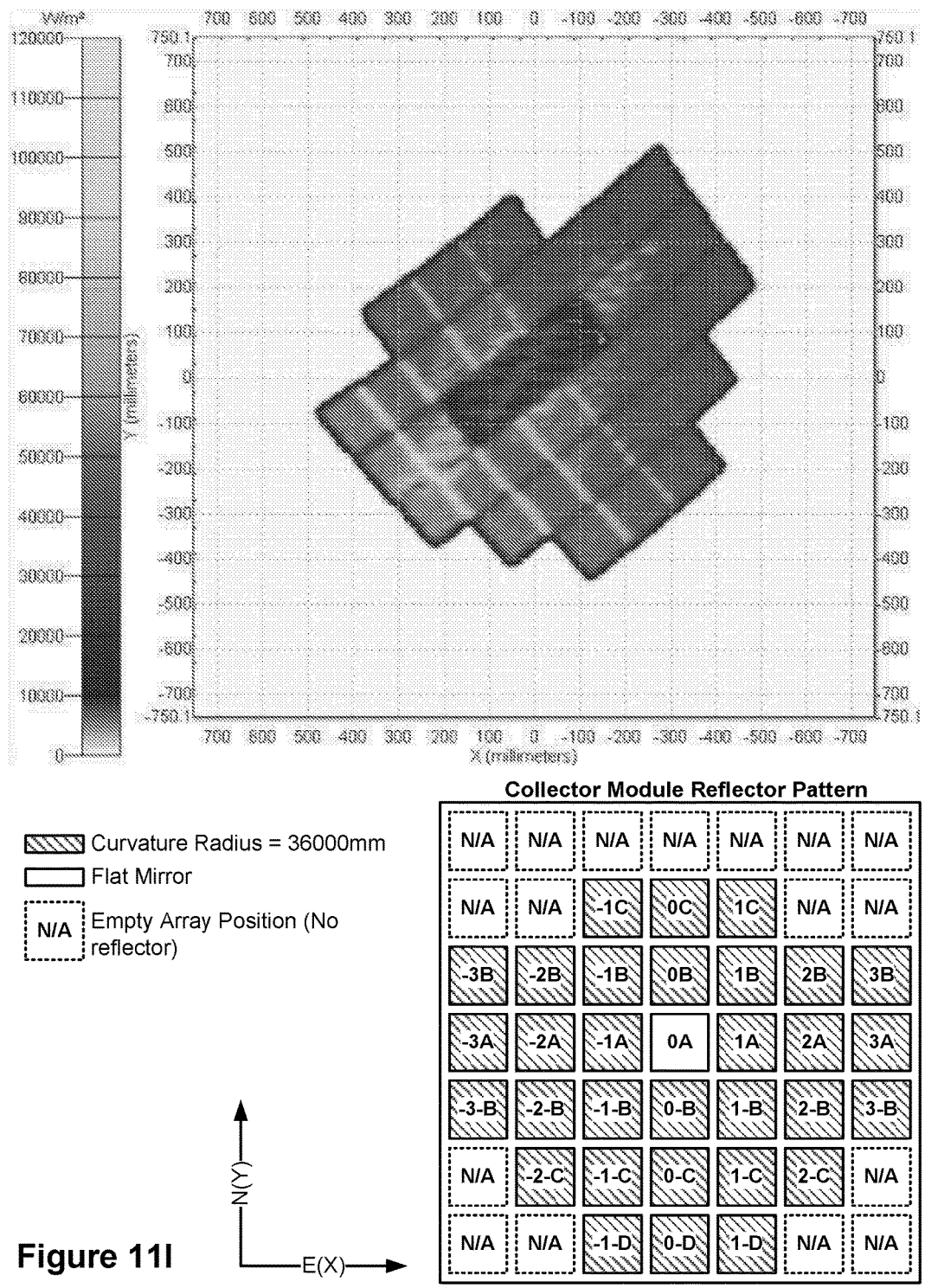
Figure 11J:
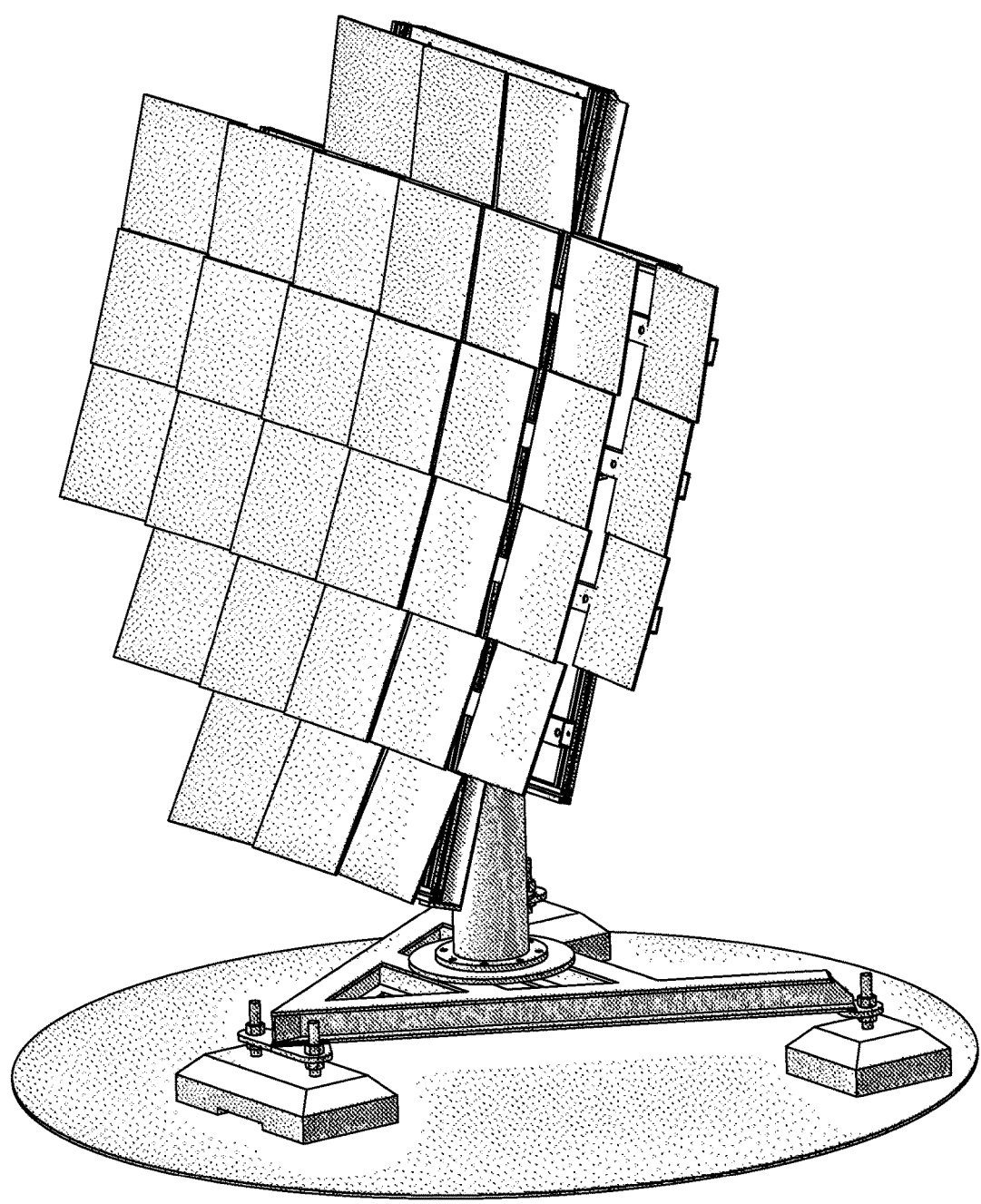

FIG. 11A illustrates example focus errors (top) simulated for a receiver target face with a collector module as pictured (bottom) with d=6 m. The initial angles $\alpha$ of the reflectors for the collector module are obtained with d=6 m and a latitude of 18° N. The reflectors on the collector module shown may have variable individual radii of curvature depending on their location relative to the center reflector. As can be seen, the center 40 cm×40 cm reflector is a planar mirror, whereas the 40 cm×40 cm reflectors in a 5×5 grid centered on the center reflector are concave and have radii of curvature of 8.5 m and the radii of curvature of the 20 peripheral mirrors abutting the 5×5 grid is 13.75 m. FIG. 11B depicts a three-dimensional view of an example collector module corresponding with the collector module of FIG. 11A; the collector module is shown mounted on a base and support column. The plot on the top of FIG. 11A depicts the irradiation intensity (W/m$^2$) on the target face due to sunlight reflected by all of the reflectors of the collector module shown at bottom at 8:00 am on the summer solstice. The layout of the solar collector module shown in FIG. 11A may be obtained by using a boundary with value of −0.4 m≤$\Delta$x≤0.4 m, −0.4 m≤$\Delta$z≤0.4 m, similar to that discussed earlier with respect to FIG. 8. Such an example configuration has a concentration ratio of about 10 with the reserved reflectors 42 and the omitted reflectors 43 (as we can see from FIG. 4). The layout of each collector module and the curvature radius for each reflector on each collector module may be obtained by simulating the focusing errors as described herein. A base array of reflectors that is common to all collector modules for a solar thermal plant may be established, and then decisions may be made as to which array positions in each collector module may be left empty based on which reflectors have focusing errors that fall outside of an established boundary—the reflectors that fall outside of the boundary may be omitted from the array and the pattern of reflectors for each collector module may thus be determined.

Similarly, FIGS. 11C, 11E, 11G, and 11I illustrate example simulated focus errors for similarly-sized collector modules (although having different reflector configurations) with d=8.4 m, d=11.5 m, d=15 m, and d=18.4 m, respectively. Correspondingly, FIGS. 11D, 11F, 11H, and 11J are drawings of example collector modules corresponding with FIGS. 11C, 11E, 11G, and 11I, respectively.

In some embodiments, the focus errors for each collector module may be obtained with every single reflector having its own curvature radius that depends on its location relative to the target position (in the depicted examples, there are only 7 unique reflector curvatures (including curvature of ∞ (flat)) used to reduce the number of unique reflector types that must be manufactured to complete the five collector modules shown, thus reducing overall cost).

Figure 12:
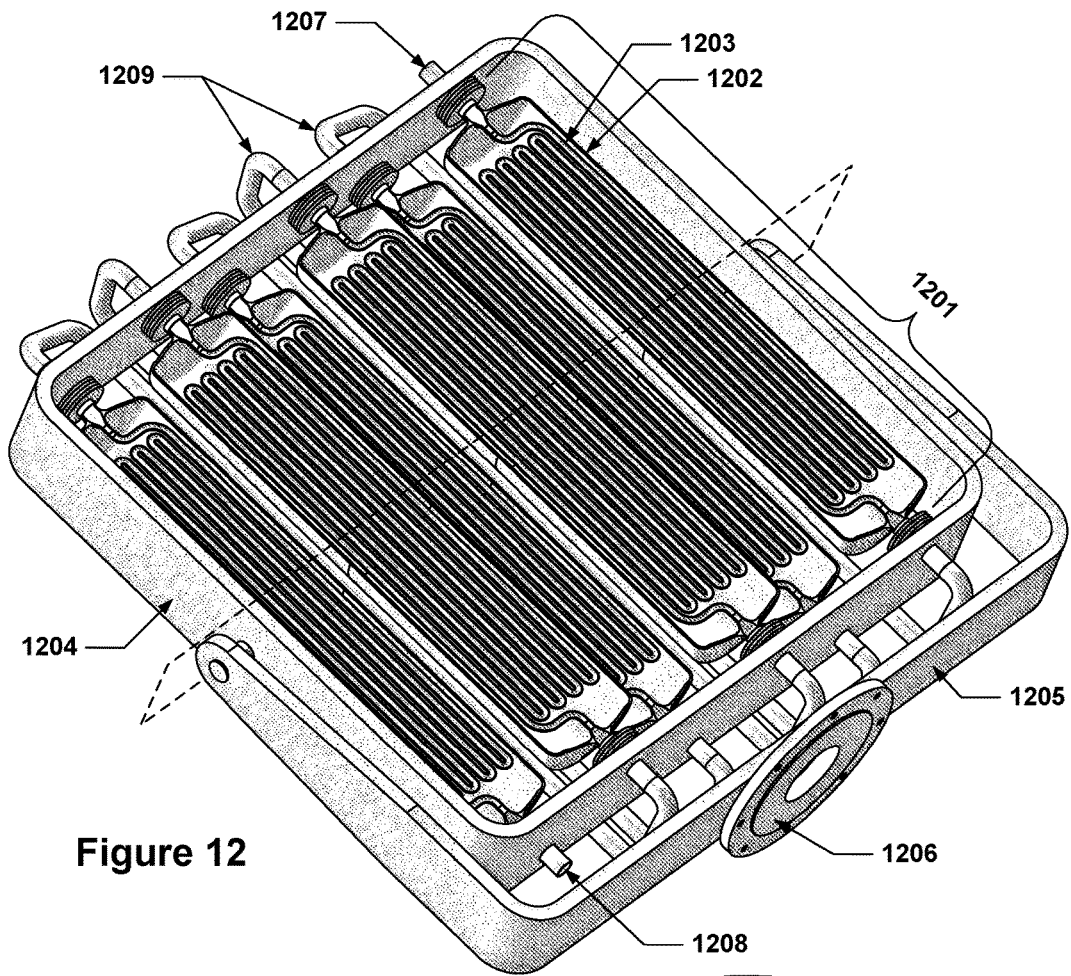
FIG. 12 is a view of an example of a plane geometry receiver for an example tower solar power plant, consistent with aspects related the innovations herein (the receiver includes vacuum chambers that have been sectioned along their long axes to allow internal features to be seen).

FIG. 12 is a view of an example of a plane geometry receiver for an example tower solar power plant, consistent with aspects related to the innovations herein (the receiver includes vacuum chambers that have been sectioned along their long axes to allow internal features to be seen). A receiver module 1200 may feature a plurality, e.g., six in this example, plane geometry receivers 1201. Each plane geometry receiver 1201 may include an array of tube structures 1203 housed within a vacuum chamber 1202. The vacuum chamber 1202 may be made from a transparent material, e.g., quartz, silica, etc., that may allow the tube structures 1203 within to be illuminated by sunlight that is incident on the plane geometry receiver 1201. The tube structures 1203 may be provided, for example, by an array of parallel tubes fed in parallel from a common plenum (not shown) or by a single tube with a series of U-bends forming a linear array of tube segments connected in series (as shown). Each plane geometry receiver 1201 may be mounted in a frame 1204, which may, in turn, be mounted in a rotatable fashion to a support bracket 1205 that may be attached to a riser pole or pylon (not shown) via a mounting bracket 1206. Each plane geometry receiver 1201 may have an inlet and an outlet. The inlets/outlets of the plane geometry receivers 1201 may be connected in parallel (not shown) or in series (shown). In the case of a series connection of the plane geometry receivers 1201, connecting tubes 1209 may connect the inlet of each plane geometry receiver 1201 with the outlet of another plane geometry receiver. This produces a chain of plane geometry receivers that are fluidly connected end-to-end. The outlet 1208 of the last plane geometry receiver 1201 and the inlet 1207 of the first plane geometry receiver 1201 in the chain may be connected to the receiver module outlet and inlet, respectively (not shown).

Figure 13:
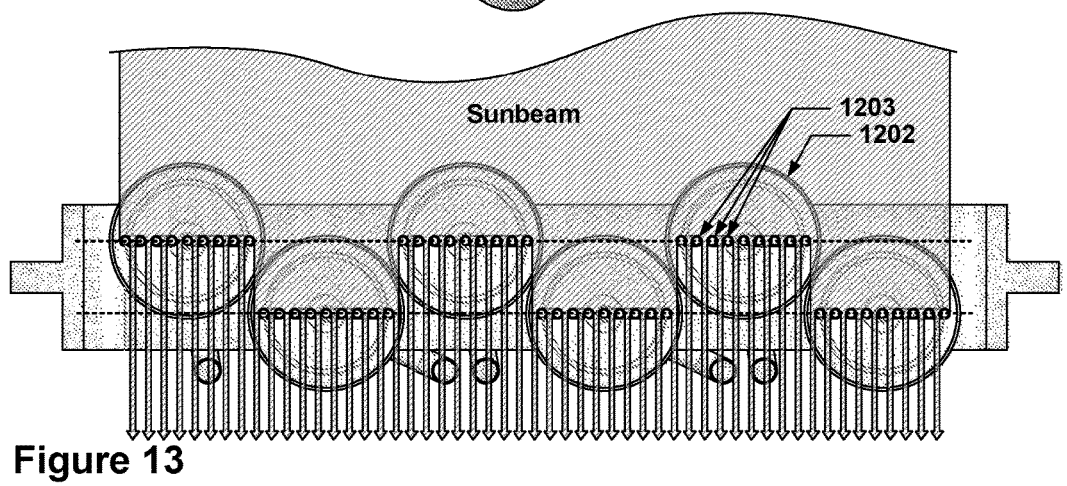
FIG. 13 is a section view of the example plane geometry receiver of FIG. 12 through the plane indicated in FIG. 12.

FIG. 13 is a section view of the example plane geometry receiver 1200 of FIG. 12 through the plane indicated by dashed lines in FIG. 12. As can be seen, the plane geometry receivers 1201 are arranged in a staggered, alternating fashion along two planes (represented by the dotted lines). These two planes define the "plane geometry" of the receiver module 1200; in practice, it may be convenient to represent these two discrete planes as a single plane midway between the two planes for the purposes of system design (such an approximation is used herein). By staggering the plane geometry receivers 1201 across the width of the receiver module 1200, the tube structures 1203 may be arrayed in a regularly-spaced fashion across almost the entire width of the receiver module 1200 when viewed from a direction normal to the receiver plane. As shown by the "sunbeam" that is depicted in FIG. 13, the majority of light that strikes the receiver module 1200 is incident on one of the tube structures 1203 and will heat the fluid inside. While the sunlight that does not strike the tube structures 1203 is shown as travelling through the receiver module 1200, in practice, additional structures may be provided to fill such gaps, e.g., such as those shown in FIG. 16 (see item 162, for example). Sunlight striking such additional structures may cause localized heating of such structures, which may then be conducted into the tube structures 1203. A selective absorption coating (as discussed elsewhere herein) may be applied to the tube structures 1203 (and potential adjacent components) to promote absorption of the incident sunlight.

Figure 14:
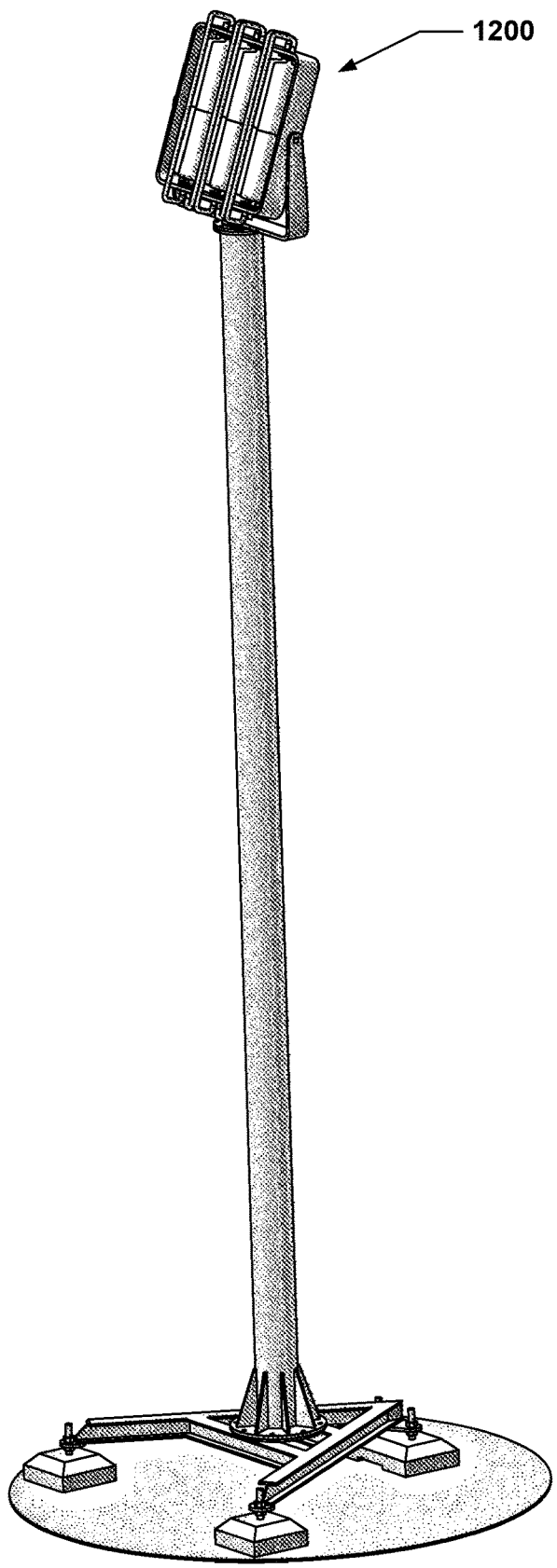
FIG. 14 is a view of the example plane geometry receiver of FIG. 12 mounted on a pole.
Figure 15A:
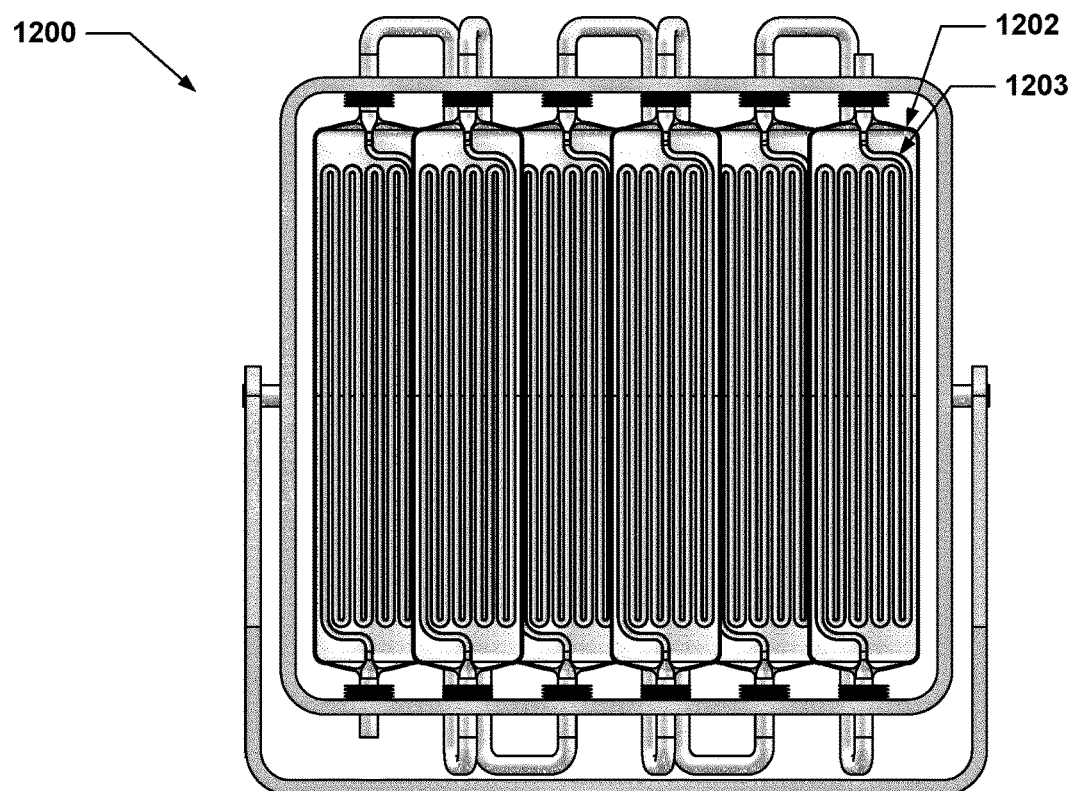
FIGS. 15A and 15B are in-plane views of the example plane geometry receiver of FIG. 12.
Figure 15B:
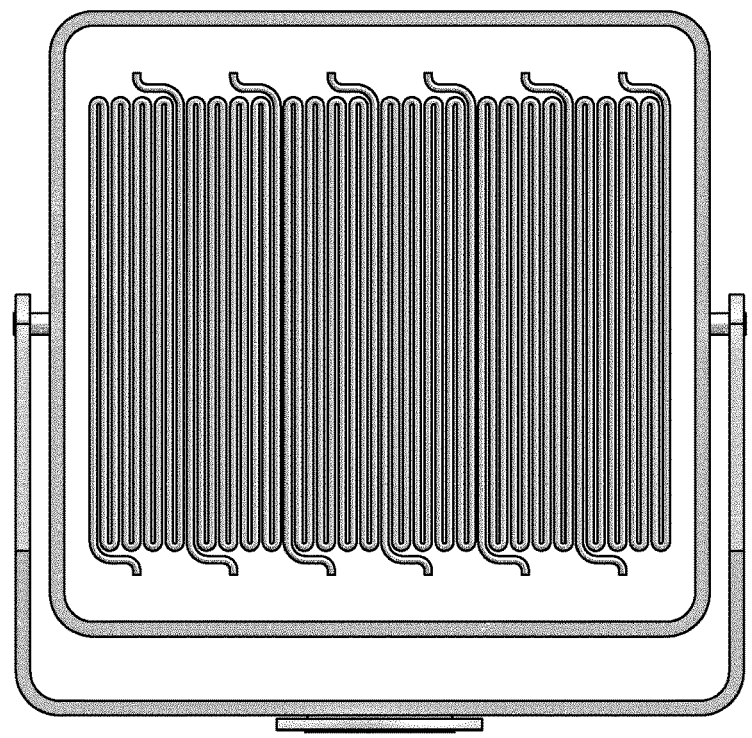

FIG. 14 is a view of the example plane geometry receiver of FIG. 12 mounted on a pole or pylon. FIGS. 15A and 15B are in-plane views of the example plane geometry receiver of FIG. 12. In FIG. 15A, the assembly has been partially sectioned along the long axes of the vacuum chambers to allow internal components to be seen. In FIG. 15B, the vacuum chambers and associated external tubing have been omitted to allow the routing of internal tubing to be seen.

A plane geometry receiver (or multiple such receivers) instead of a large circular or cylindrical geometry receiver may also be used in order to achieve a smaller blackbody radiation loss than that of common parabolic trough receivers.

The thermal receiver of a solar thermal tower plant may include several plane geometry receivers, each, as discussed above, may be sealed within an outer transparent tube to form a vacuum chamber Thermal working fluid may be pumped through the plane geometry receiver. Such a receiver provides several advantages over conventional tube- or circular-geometry receivers, e.g., such as those used in parabolic trough solar thermal plants. For example, plane geometry thermal receivers may have a smaller radiating area compared to tube geometry thermal receivers (for the same size illuminated target area) that are usually used in the case of parabolic trough solar thermal plants. In some embodiments, the radiative area of a tube-geometry thermal receiver may be up to 3.14 times higher than that of a plane geometry receiver supporting the same illumination area (assuming the plane geometry receiver has a reflective coating on a non-illuminated side to help reduce black body radiation loss through that side—without the use of such a coating, the radiative area of the tube geometry thermal receiver may be up to 1.57 times higher than that of the plane geometry receiver). Since thermal radiation decreases with decreasing radiation area, plane geometry thermal receivers may reduce radiation loss considerably over non-plane geometry thermal receivers. In order to further improve the absorption of the plane geometry receiver, and reduce the radiation loss at the same time, a "selective absorption coating" may be applied to the tube structures of the plane geometry receiver. The selective absorption coating may be applied, in some implementations, only on sides of components of the plane geometry receiver that face sunwards; the opposing sides of such components may be coated with a highly reflective coating to further reduce black body radiation loss. The selective absorption coating used in the plane geometry receiver may, in principle, have an effective concentration ratio of about 10 with absorption coefficient of approximately 0.95 and an emission coefficient of approximately 0.1.

Due to the use of multiple plane geometry receivers arranged as shown in FIG. 15A, each plane geometry receiver may be much smaller in size than a single, large receiver. For example, in FIG. 15A, six plane geometry receivers are shown, and each may be housed in a vacuum chamber that has an outer diameter slightly larger than one sixth of the aggregate width of the total span of the plane geometry receivers. As a result, the force that is exerted on the vacuum chamber due to atmospheric pressure when the vacuum chamber is pumped down to a vacuum is significantly lower than would be the case if a single-tube geometry receiver of the same overall width was used. This allows vacuum to be used within the vacuum chamber to help insulate the plane geometry receivers and also to provide an inert environment that is compatible with a selective absorption coating that may be applied to the plane geometry receiver. The use of vacuum in conventional 2-D solar thermal tower plants is not feasible since the receivers of such plants are typically immense, e.g., 5 to 20 meters across, and it is impossible in the current state of the art to manufacture a vacuum chamber of such a size that is still sufficiently transparent enough so as to allow light to reach the receiver housed within and that can withstand the thermal environment generated in the vicinity of the receiver. Accordingly, receivers for conventional solar thermal tower plants cannot isolate their receivers in a vacuum, and this not only increases heat loss, but also generally makes it infeasible to use selective absorption coatings since such coatings may rapidly oxidize in a non-vacuum environment.

For example, with reference to the receiver module 1200, the vacuum chambers 1202 that are depicted may be 150 mm in outer diameter with 3 mm thick walls. The tube structures 1203 that are within each vacuum chamber 1203 may have straight run lengths of approximately 600 mm along the long axis of each plane geometry receiver 1201, and, when arrayed as shown in FIGS. 12 through 15B, may span an area 800 mm wide (thus producing a 600 mm×800 mm receiver area). The tube structures in this example may have an outer diameter of 10 mm with wall thickness of approximately 1 mm. Of course, such dimensions may be tailored according to the particular implementation being designed and this disclosure is to be understood as encompassing such alternative dimensions as well.

Figure 16:
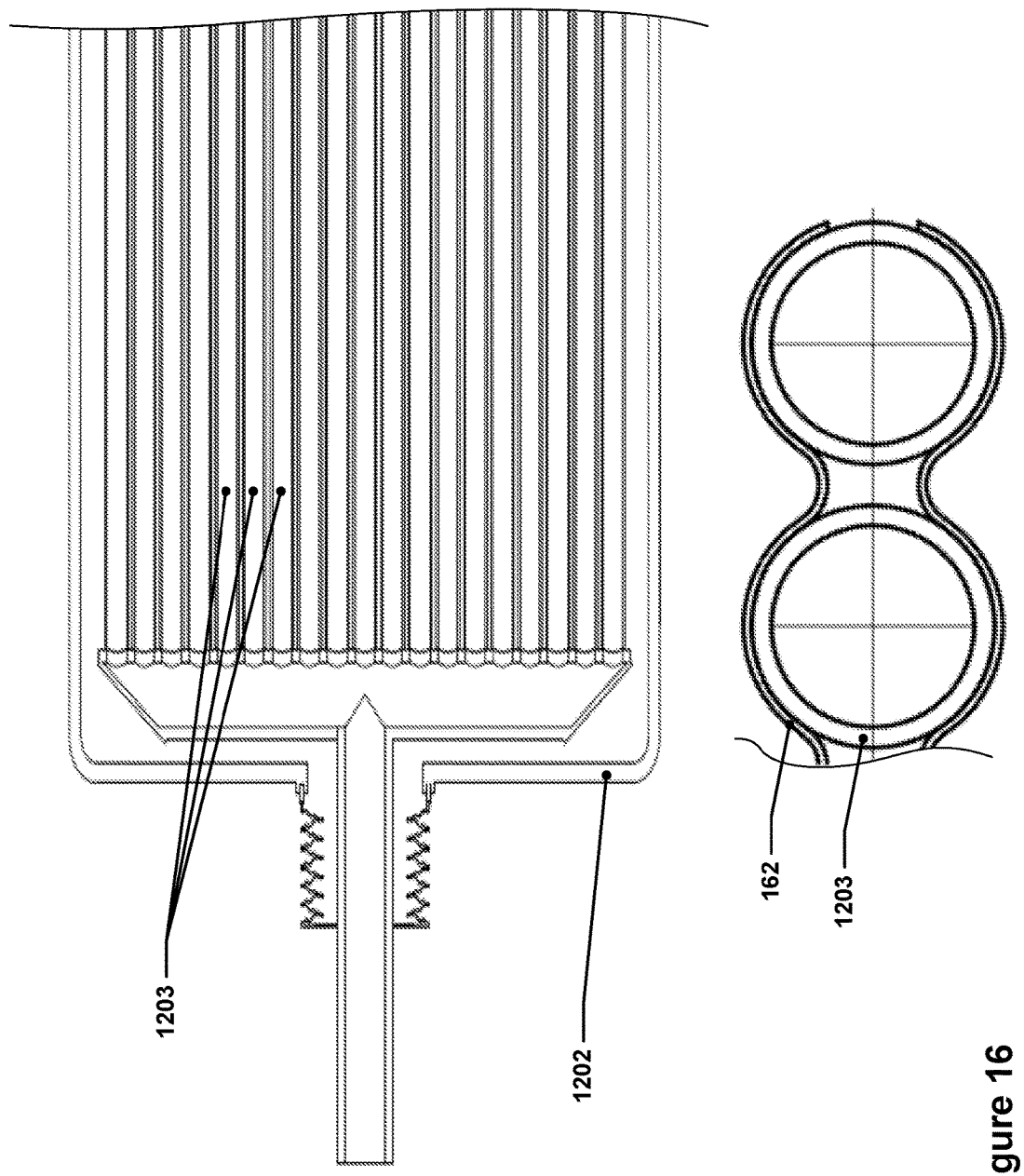
FIG. 16 provides a plan view (top) and a side partial section view (bottom) of an example of a plane geometry receiver, consistent with aspects related to the innovations herein.

FIG. 16 is a schematic diagram illustrating further aspects of a plane geometry receiver. For example, rather than a single tube structure bent into a series of U-bends, a plurality of tube structures 1203 may be connected in parallel to common entrance and exit manifolds/plenums, and may be coated with a selective absorption coating 162 or sandwiched between thin structures coated with a selective absorption coating to improve the thermal exchange coefficient of the plane geometry receiver with a given temperature gradient between a heat transfer or thermal working fluid circulated within the tubes and the tube wall at a given fluid velocity. The tube structures 1203 may thus act as a heat exchanger, and may be viewed as heat exchanger tubes.

Figure 17A:
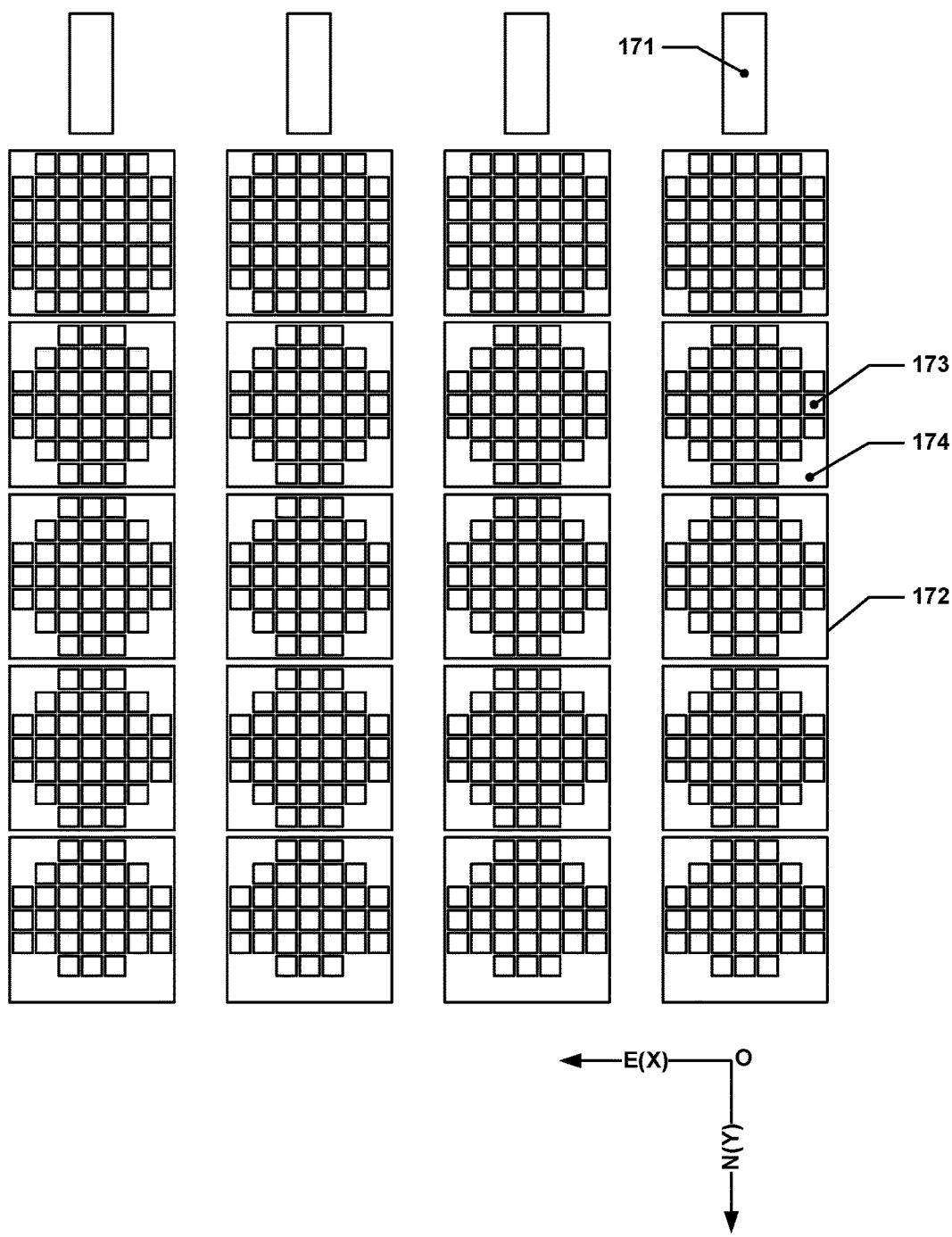
FIG. 17A depicts the tower and collector module layout for an example 4-tower solar power plant, consistent with aspects related to the innovations herein.
Figure 17B:
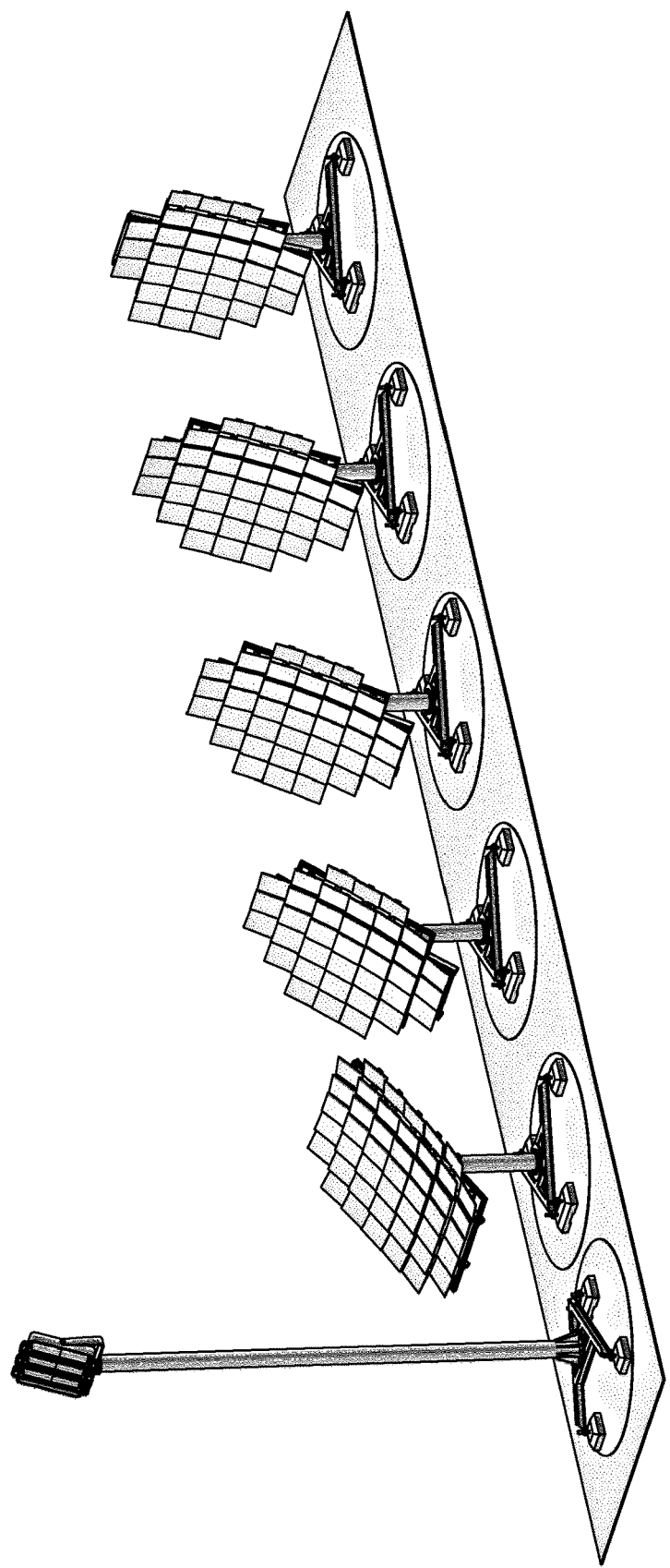
FIG. 17B depicts a three-dimensional view of a single tower solar power plant with five collector modules and a receiver similar to those described with respect to the preceding Figures.

An example solar thermal tower plant system and layout is shown in FIG. 17A with tower 171 and collector modules 172. In some embodiments, such as that shown, each tower may have five collector modules with some collector modules having a different number of reflectors than the others, as well as potentially having reflectors with differing amounts of curvature. Each depicted collector module may have an individual concentration ratio of about 10. As mentioned above, vacuum insulation and "selective absorption coating" may be implemented in the tower receiver to obtain a higher concentration ratio. In this way, a total concentration ratio of more than 250 to 500 may be achieved, as in a conventional tower but with much lower cosine loss and less cost (due to the drastically reduced number of collector modules needed, as well as the smaller scale of each tower). FIG. 17B depicts a three-dimensional view of a single solar thermal tower plant using collector modules and a receiver as described earlier herein. In this particular plant, no optimization has been performed to account for inter-collector module shadowing/occlusion. However, FIG. 17B does provide a relatively compact and detailed view of the general arrangement of an example tower solar thermal power plant. Various further example layouts for tower solar thermal power plants are discussed with respect to the following figures as well.

Figure 17C:
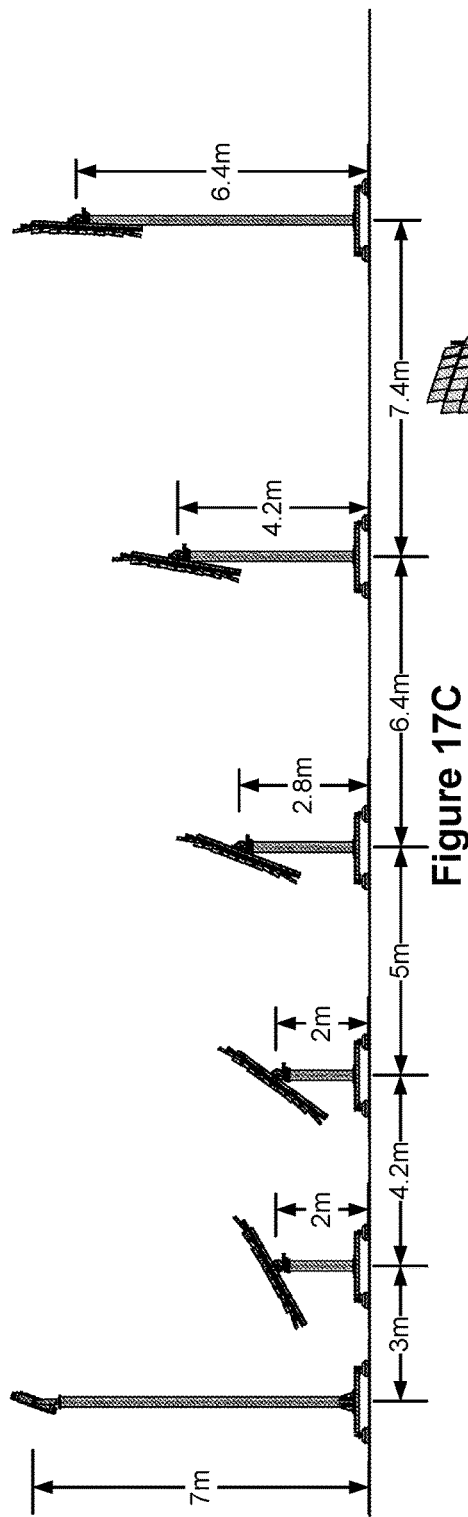
FIG. 17C depicts a side view of an example tower solar thermal power plant with five collector modules at varying heights and linear spacing so as to minimize inter-collector shadowing.
Figure 17D:
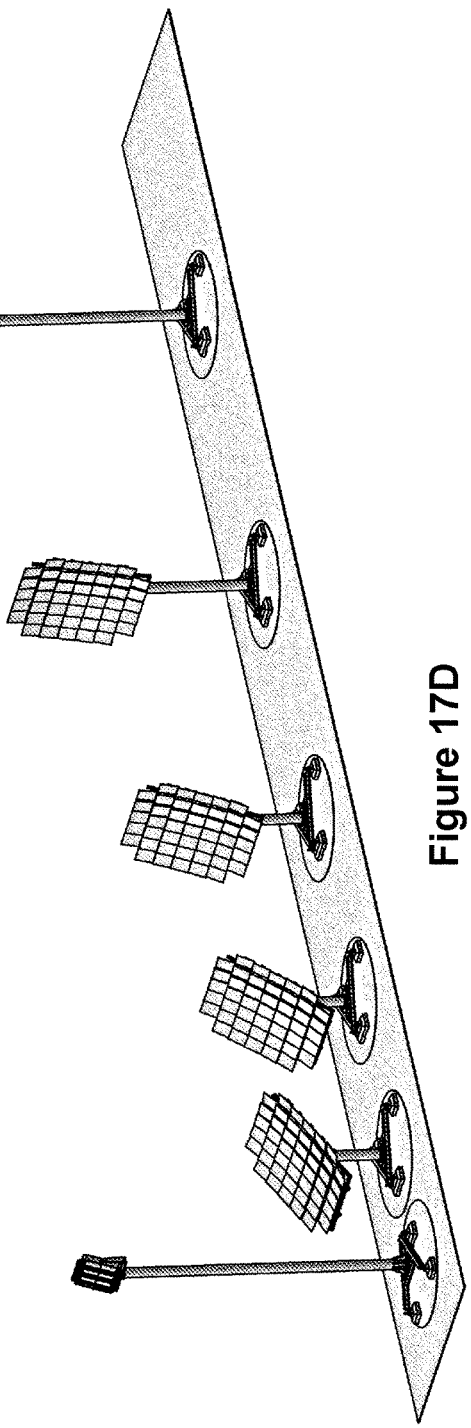
FIG. 17D depicts an off-angle view of the example tower solar thermal power plant of FIG. 17C.

FIG. 17C depicts a side view of an example tower solar thermal power plant with five collector modules at varying heights and linear spacing's so as to minimize inter-collector shadowing. FIG. 17D depicts an off-angle view of the example tower solar thermal power plant of FIG. 17C.

In the example tower solar power plant of FIGS. 17C and 17D, it can be seen that the five collector modules shown (which generally correspond to the five collector modules shown in FIGS. 11A through 11J) are arranged such that their linear spacing and height generally increase with increasing distance from the tower. The dimensions shown are for the depicted example, but other dimensions may be used as well depending on the tower height, collector module size, latitude, and other characteristics of the tower solar thermal tower plant. Due to the increasing height and inter-module spacing of the collector modules, shadowing of the modules further from the tower by the modules closer to the tower may be reduced or minimized. As can be seen, the collector modules are still arranged in a generally linear manner within a substantially rectangular region with a width that is on the order of the tower height. The tower height, in this case, is approximately 5 meters (above the collector module centers/centers of rotation); taking into account the height of the collector module centers, this results in the tower having an overall height of about 7 meters.

Figure 17E:
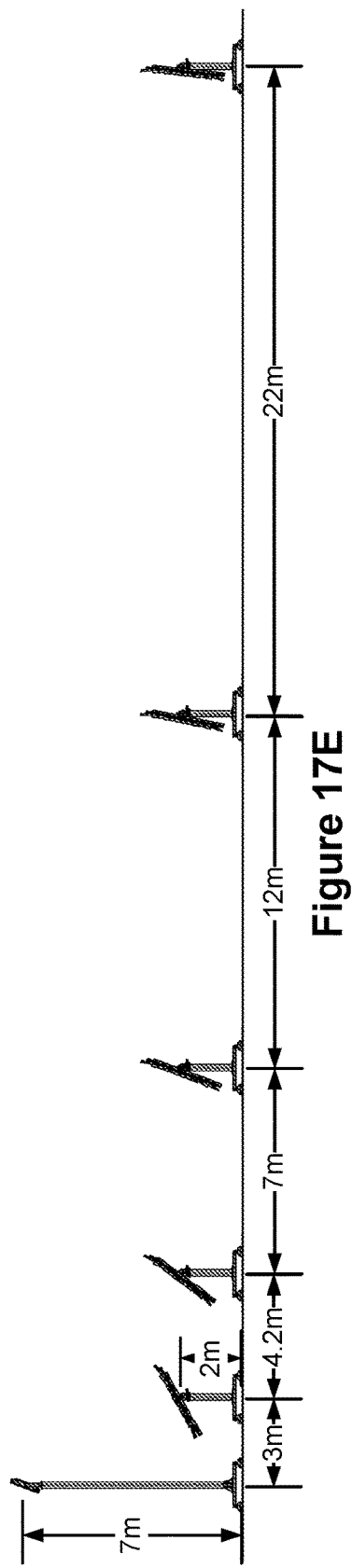
FIG. 17E depicts a side view of an example tower solar thermal power plant with five collector modules at the same height but with variable linear spacing so as to minimize inter-collector shadowing.
Figure 17F:
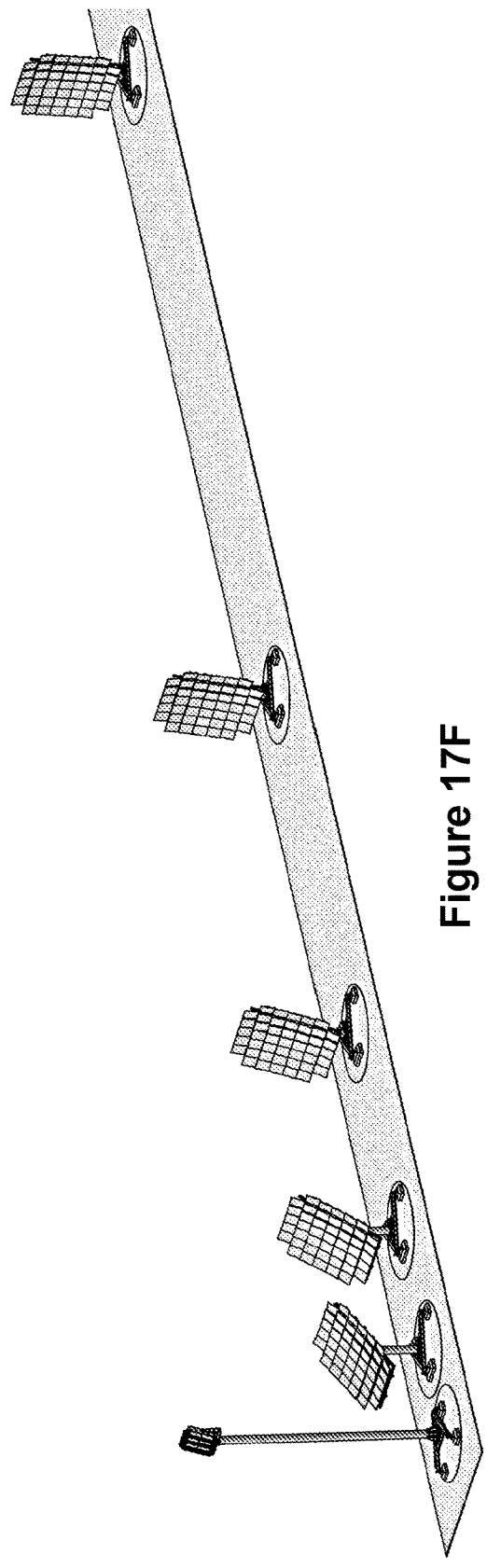
FIG. 17F depicts an off-angle view of the example tower solar thermal power plant of FIG. 17E.

FIG. 17E depicts a side view of an example tower solar thermal power plant with five collector modules at the same height but with variable linear spacing so as to minimize inter-collector shadowing. FIG. 17F depicts an off-angle view of the example tower solar thermal power plant of FIG. 17E. As can be seen, in this example tower solar thermal power plant, the five collector modules (again, generally corresponding with the collector modules of FIGS. 11A through 11J) are located at the same height, but with increasing inter-module spacing as the distance between the tower and the collector modules increases. This arrangement may reduce wind loading and collector module deflection for the collector modules furthest from the tower (as compared with, for example, the example tower solar thermal power plant of FIGS. 17C and 17D). However, such a tower solar thermal power plant may require a larger area footprint, decreasing the number of tower solar thermal power plants that may be ganged together in a given area, i.e., reduce the density of tower solar thermal power plants that may be located in the area. The increased distance between the collector modules furthest from the tower and the tower may also cause the light reflected from those towers to be subject to increased dissipation effects in the local atmosphere.

Figure 17G:
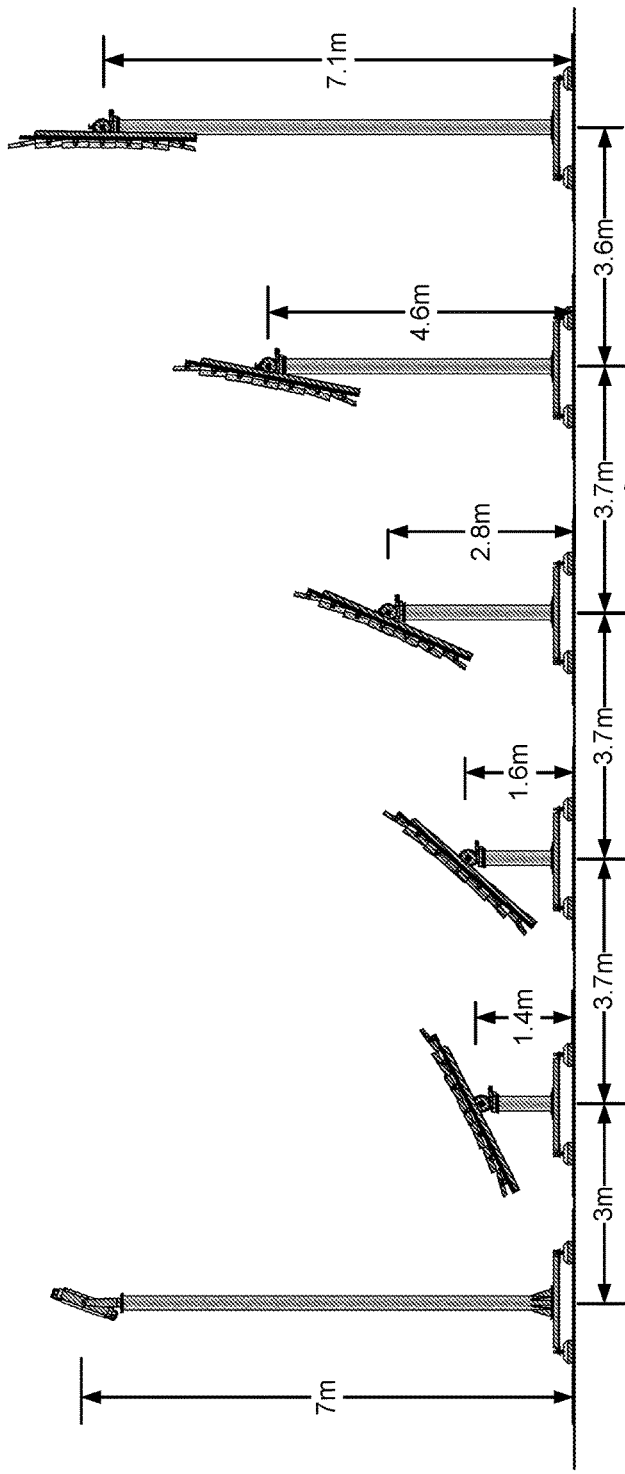
FIG. 17G depicts a side view of an example tower solar thermal power plant with five collector modules at varying heights so as to minimize inter-collector shadowing.
Figure 17H:
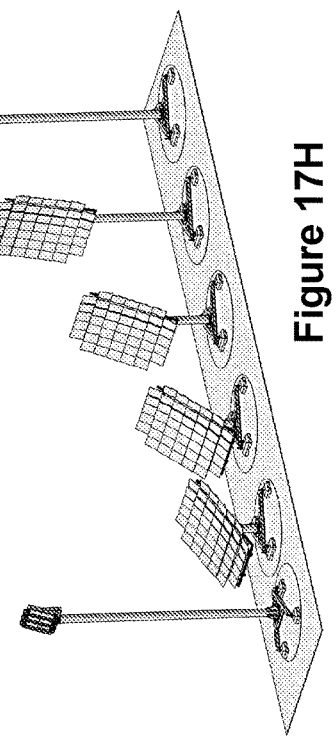
FIG. 17H depicts an off-angle view of the example tower solar thermal power plant of FIG. 17G.

FIG. 17G depicts a side view of an example tower solar thermal power plant with five collector modules at varying heights so as to minimize inter-collector shadowing. FIG. 17H depicts an off-angle view of the example tower solar thermal power plant of FIG. 17G. This example tower solar thermal power plant has generally fixed inter-collector-module spacing (similar, for example, to the spacing depicted in FIG. 17B), but features varying collector module height.

Figure 17I:
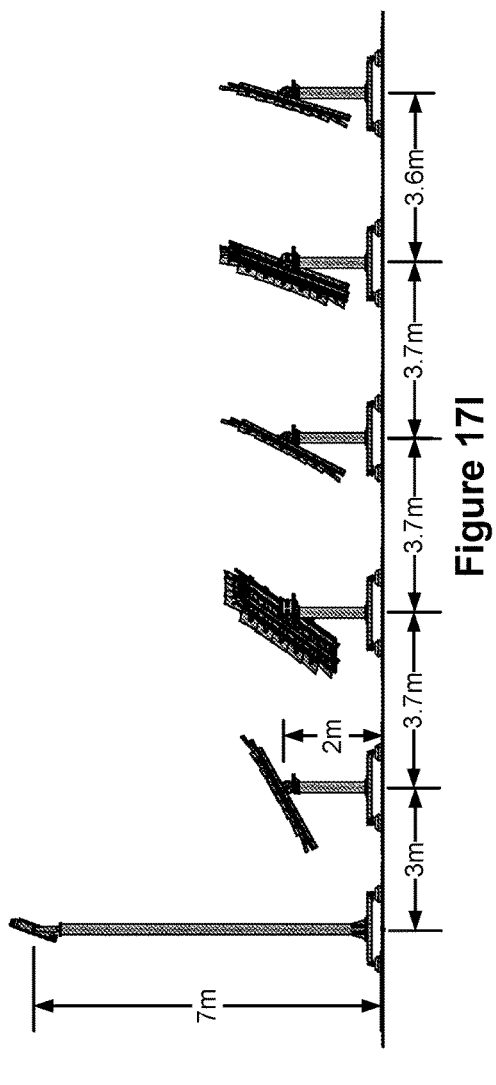
FIG. 17I depicts a side view of an example tower solar thermal power plant with seven collector modules at the same height but spaced in three columns in a checker-board fashion so as to minimize inter-collector shadowing.
Figure 17J:
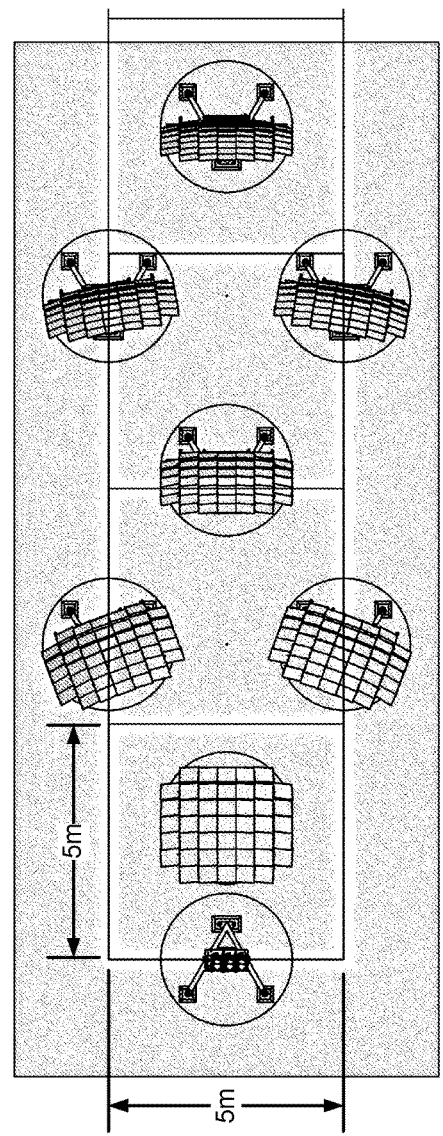
FIG. 17J depicts a plan view of the example tower solar thermal power plant of FIG. 17I.
Figure 17K:
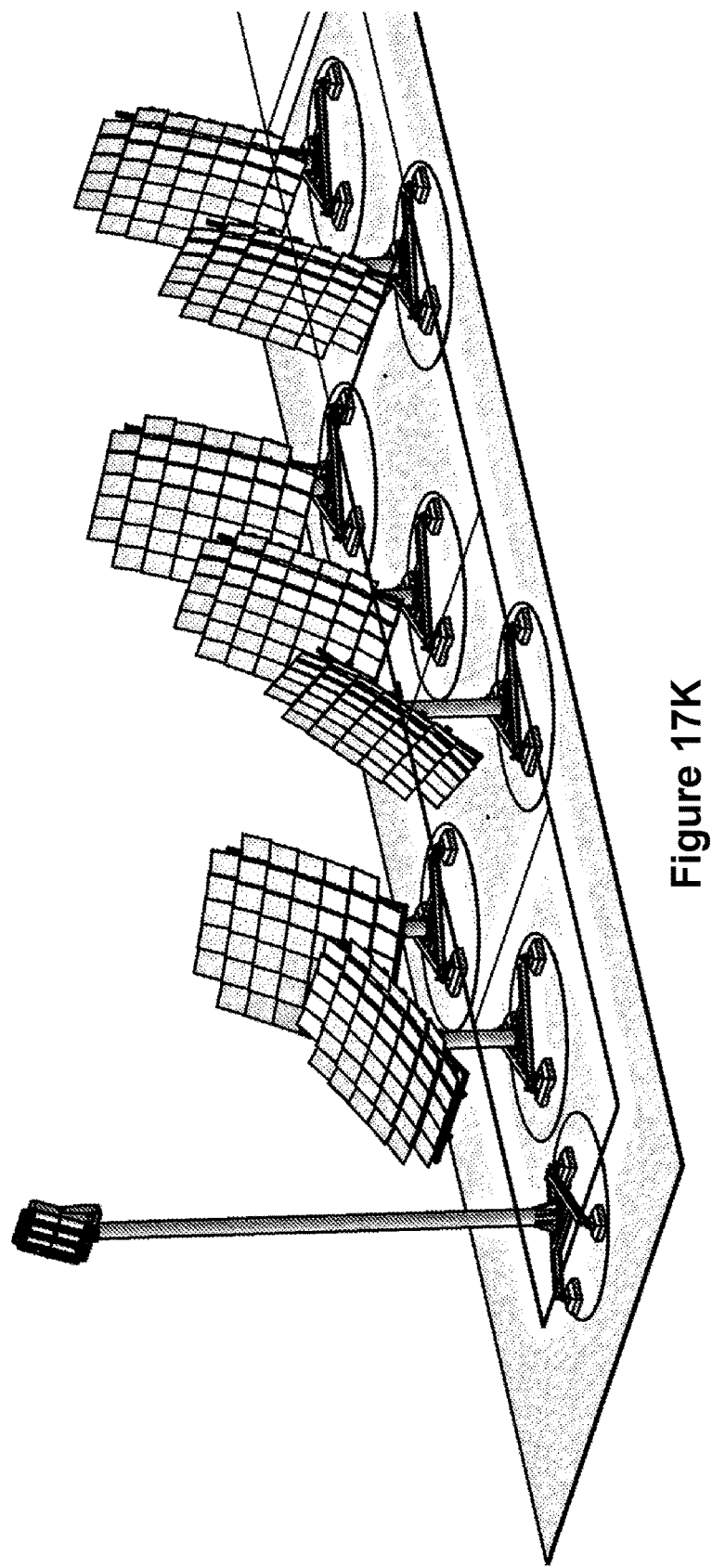
FIG. 17K depicts an off-angle view of the example tower solar thermal power plant of FIG. 17I.

FIG. 17I depicts a side view of an example tower solar thermal power plant with seven collector modules at the same height but spaced in three columns in a checker-board fashion so as to minimize inter-collector shadowing. FIG. 17J depicts a plan view of the example tower solar thermal power plant of FIG. 17I. FIG. 17K depicts an off-angle view of the example tower solar thermal power plant of FIG. 17I. In this example tower solar thermal power plant, there is a three column by five row array of collector modules. The center column of collector modules is centered on the tower, and the outermost columns are each offset one half of the height of the receiver (measured with respect to the approximate collector module center height) from the centermost column. A grid of 5 m×5 m squares is depicted to give some sense of where the collector modules fall with respect to a rectangular region that is as wide as the receiver height. To prevent collector modules from colliding with one another in this configuration and to reduce inter-collector-module shadowing, collector modules are omitted from some array locations. For example, collector modules for the $2^{nd}$ and $4^{th}$ array locations of the middle column are omitted, and collector modules for the $1^{st}$, $3^{rd}$ and $5^{th}$ array locations of the outermost columns are omitted. This is still a relatively compact arrangement that allows the collector module centers to all be located within a rectangular region one tower height in width and four tower heights in length.

Figure 17L:
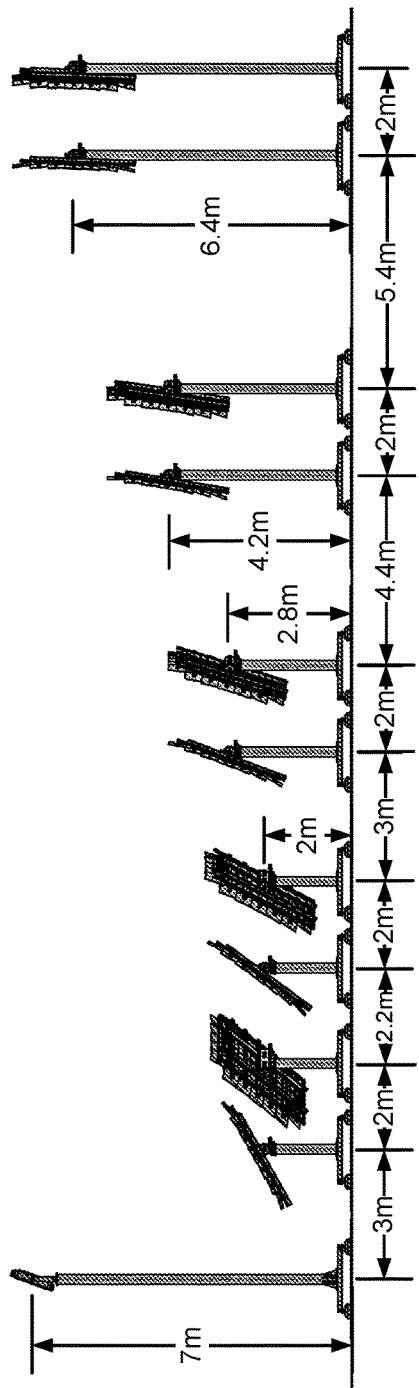
FIG. 17L depicts a side view of an example tower solar thermal power plant with fifteen collector modules at varying heights and linear spacing's arranged in three columns of five collector modules so as to minimize inter-collector shadowing.
Figure 17M:
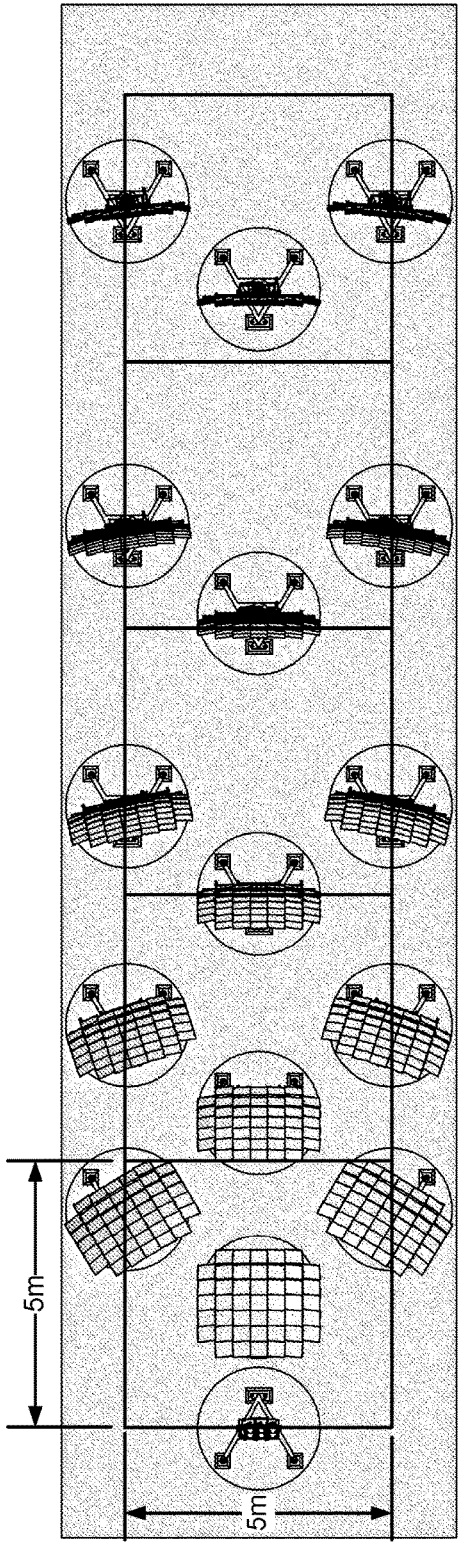
FIG. 17M depicts a plan view of the example tower solar thermal power plant of FIG. 17L.
Figure 17N:
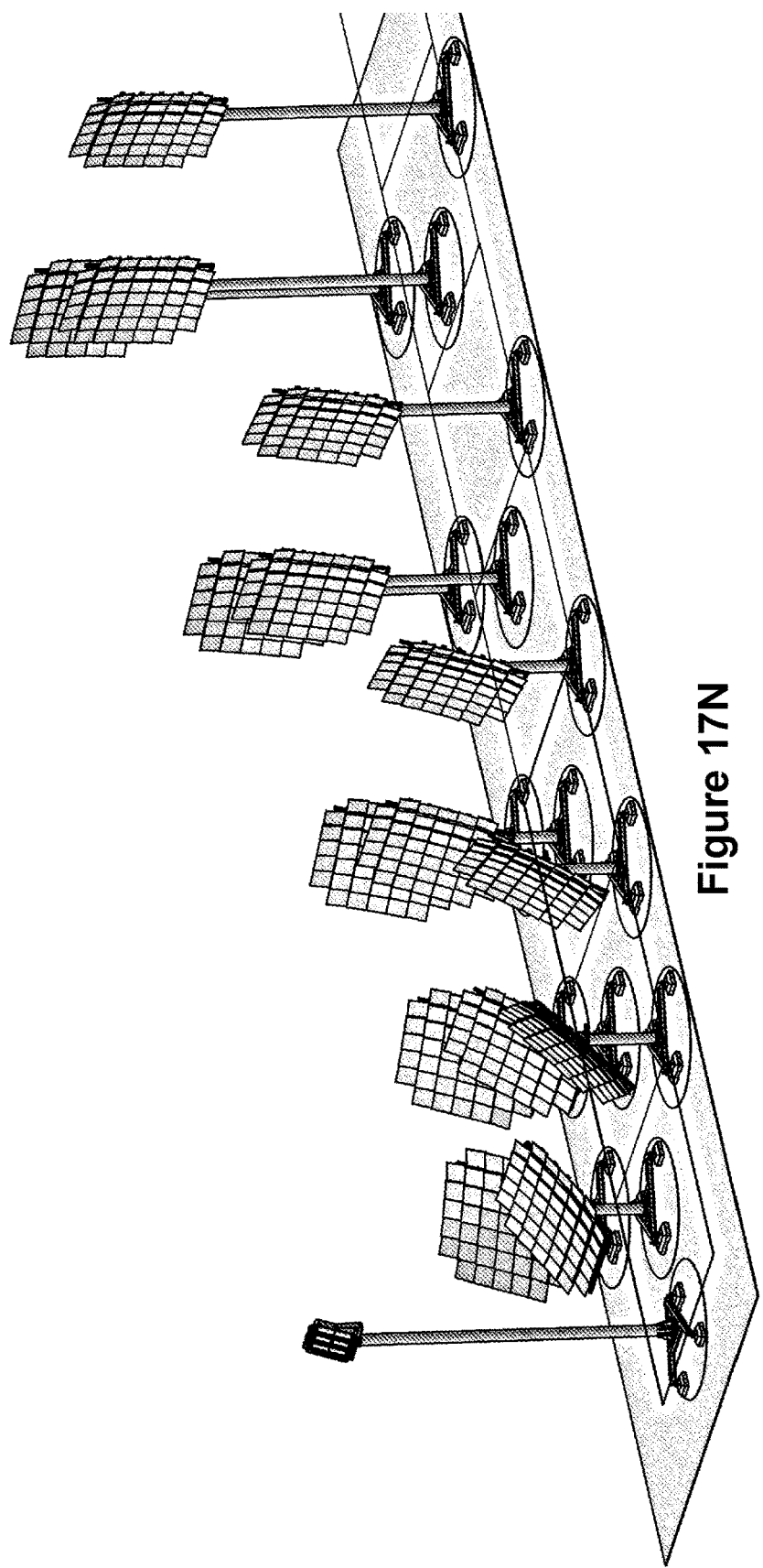
FIG. 17N depicts an off-angle view of the example tower solar thermal power plant of FIG. 17L.

FIG. 17L depicts a side view of an example tower solar thermal power plant with fifteen collector modules at varying heights and linear spacing's arranged in three columns of five collector modules so as to minimize inter-collector shadowing. FIG. 17M depicts a plan view of the example tower solar thermal power plant of FIG. 17L. FIG. 17N depicts an off-angle view of the example tower solar thermal power plant of FIG. 17L. In this example, the collector modules are arranged according to a three column, five row array pattern. The outermost columns are slightly offset along the long axis from the innermost column, although other implementations may have no such offset. In this particular arrangement, no collector modules are omitted from any of the array locations, and the collector modules are generally located in a rectangular region that is one tower height in width by five tower heights in length (as shown by the depicted grid). In this arrangement, the collector modules furthest from the tower are located at higher elevations as compared with the nearer collector modules to reduce inter-collector-module shadowing.

It is to be understood that these are merely representative examples, and other implementations of the tower solar thermal plants described herein may feature different arrangements of collector modules than those depicted. Inter-collector-module shadowing may be reduced or eliminated by change the height, inter-collector-module spacing, or other factors, as illustrated in the above Figures. The various techniques displayed in the above Figures may be combined in various permutations to achieve a desired concentration ratio.

In addition to the 2-D cases described above, collector modules similar to those described above may be used in a 1-D case fixed target power plant. Similarly to the 2-D case, in order to reduce the optical cosine loss, in some embodiments of 1-D fixed target power plants, fewer collector modules and a smaller cross-section field range, i.e., the N-S direction of the collector module field, for each linear receiver with linear line along east-west orientation may be implemented. For each collector module, variable concentration may be implemented to maximize the total concentration ratio, and solar concentrations of 20-40 may be achieved. In some 1-D embodiments, a plane geometry receiver instead of a cylindrical or tubular geometry receiver may be used, as in the 2-D case, to achieve decreased blackbody radiation loss as compared with that of cylindrical or tubular-geometry receivers typically used with parabolic trough solar thermal plants. In some embodiments, each linear collector module may include a number of smaller linear reflectors with or without curvature and with certain installed angles relative to the collector module framework in order to reduce the wind load on the collector module and to reduce cost. In other implementations, however, the collector module may have a one-piece parabolic reflector.

Figure 18:
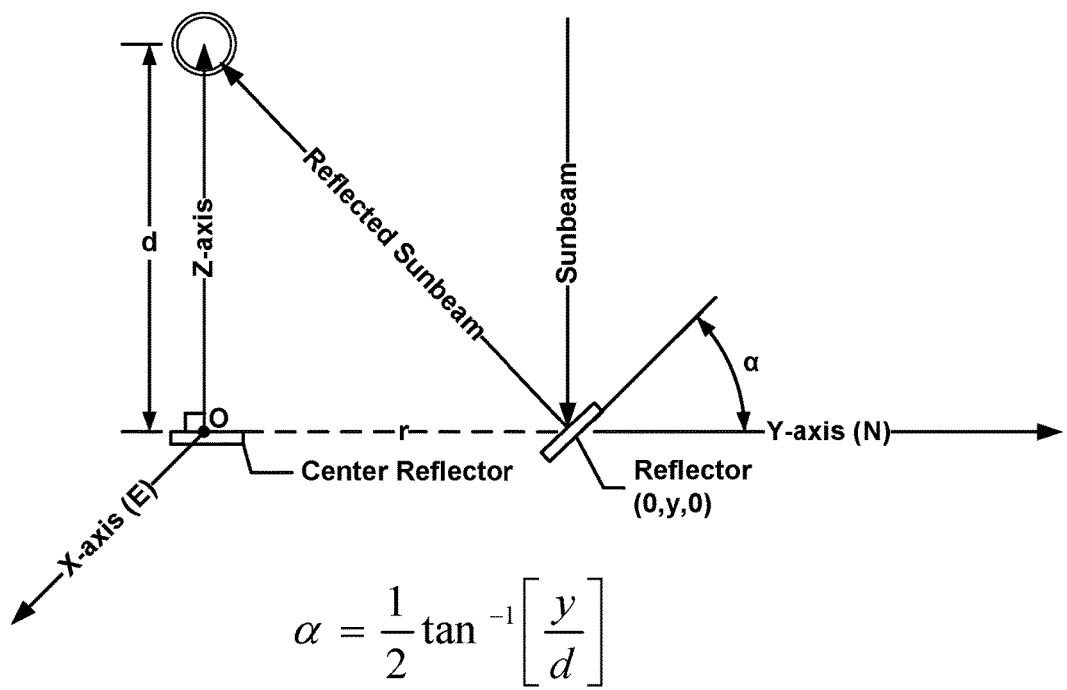
FIG. 18 is a diagram relevant to discussion of the initial angle of an example reflector on an example collector module for a 1-D fixed-target solar thermal power plant, consistent with aspects related to the innovations herein.

The reflectors may be mounted relative to the plane of a 1-D collector module with initial angles α (an initial angle α that is calculated in a different manner than in the 2-D case) that allow the sunlight to approximately focus on the receiver. FIG. 18 is a schematic that helps illustrate the calculation of the initial angle α of a reflector for a 1-D collector module. As with the 2-D case, the optical elements used may include planar or curved mirrors as well as other reflectors. Each optical element may be supported by a supporting base designed to hold the supported optical element at the desired initial angle α for that optical element. The 1-D collector module may be fixed on a shaft with a bearing support to allow the collector module to be rotated to track the sun. Each 1-D collector module may support a plurality of reflectors in a 1-dimensional array (as opposed to the 2-dimensional array used in the 2-D case).

The Cartesian coordinate system of FIG. 18 shows x and y axes aligned with the 1-D collector module frame with the origin at the collector module rotation center (the x and y axes point to the east and north, respectively), and with the z axis pointing towards the sun and the target receiver at solar noon on the vernal or autumnal equinox. The initial angle α is defined in this coordinate system such that the sunbeams that fall on each reflector in the collector module are reflected onto the receiver target face centerline (at solar noon on vernal/autumnal equinox, and when the sunbeam, receiver target face center, and rotational center of the module are all lined up along a common axis/coaxial. In some implementations, the center of the collector module may be approximately at the rotational center of the rotating axis. The initial angle α may be measured between the y axis and the plane of the reflector facing the receiver target face. At each reflector center position of (0, y), the initial angle α of the reflector along the radial direction is given by:

$$\alpha = (1/2)\tan^{-1}(y/d) \quad (18)$$

Initial angles α for individual reflectors for a given collector module may be different, and for a different collector module at a different distance d away from the receiver target face, the initial angles α may also be different for the reflectors with a same y offset from the origin of their respective collector modules. The normal unit vector $\vec{N}_{r0}$ of each reflector in a 1-D collector module is given by:

$$\vec{N}_{r0}(x, y, 0) = \frac{\vec{I}_{r0}(x, y, 0) + \vec{R}_{r0}(x, y, 0)}{2\cos\gamma} = (0, \sin\alpha, \cos\alpha) \quad (19)$$

where the unit vectors $\vec{I}_{r0}(0, y, 0)$ and $\vec{R}_{r0}(0, y, 0)$ are the incident beam and reflection beam unit vectors of the reflector at (0, y, 0), respectively. The angle γ is the included angle between the unit vectors $\vec{I}_{r0}(0, y, 0)$ and $\vec{R}_{r0}(0, y, 0)$:

$$\vec{I}_{r0}(x,y,0) = (0,0,1)$$

$$\vec{R}_{r0}(x,y,0) = (0,-y,d)/\sqrt{y^2+d^2}$$

$$\cos 2\gamma = \vec{I}_{r0}(x,y,0) \cdot \vec{R}_{r0}(x,y,0) \quad (20)$$

The following detailed examples describe how to maximize and determine the concentration ratio and other detailed parameters.

Figure 19A:
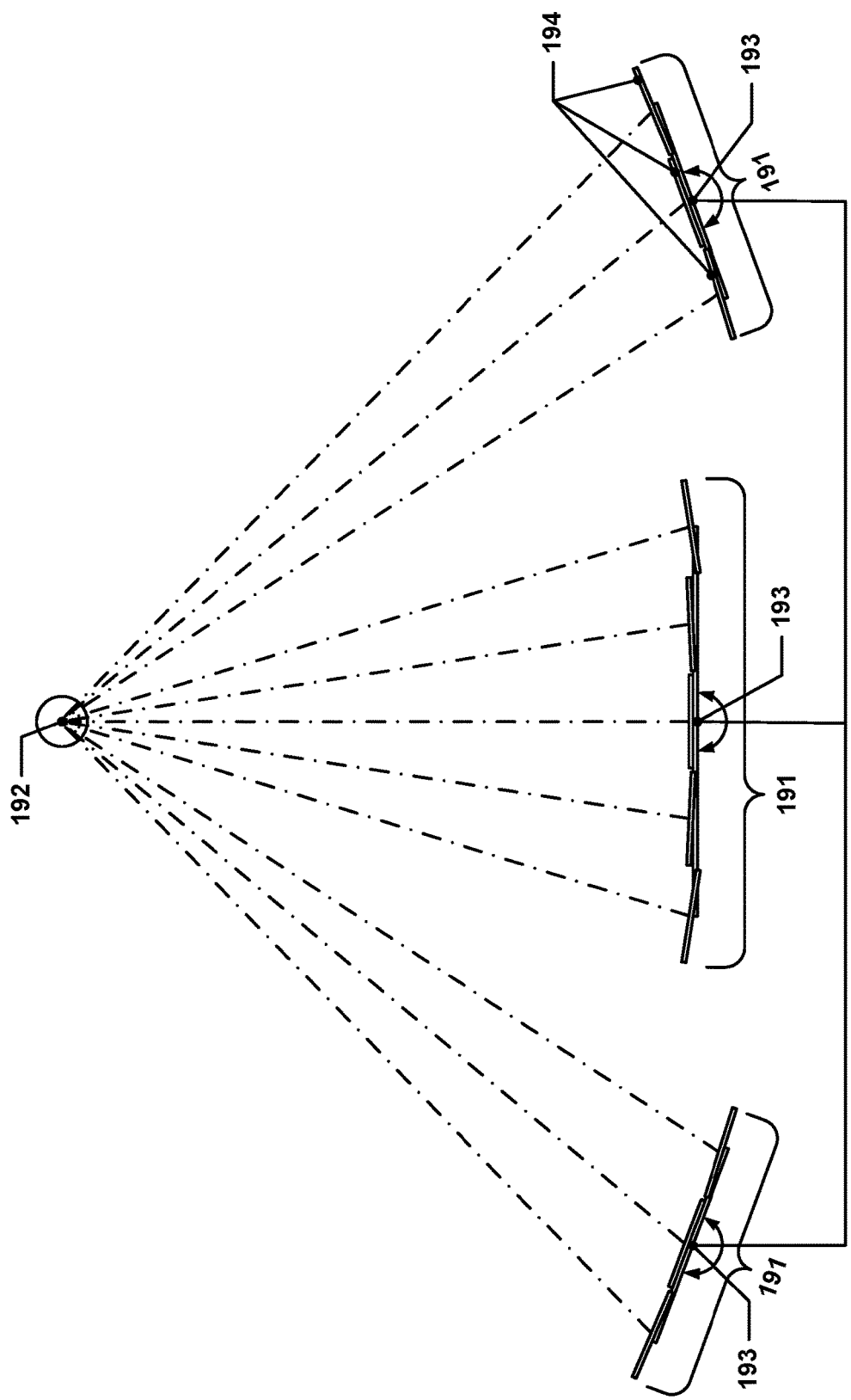
FIG. 19A illustrates the field layout for a 1-D fixed-target solar thermal power plant, consistent with aspects related to the innovations herein.

An example collector module layout for a 1-D fixed target solar thermal concentrator power plant is shown in FIG. 19A. As shown in FIG. 19A, in order to maximize the total concentration ratio, each collector module may have a variable individual concentration ratio that depends on the collector module location relative to the receiver target face position; each collector module may have a number of smaller reflectors (with or without curvature). In some embodiments, collector modules 191 for each linear receiver 192 may extend in a generally linear manner along an east-west orientation. Each collector module may have a different number of small reflectors 194, including a center reflector that lies along the central rotational axis 193.

Figure 19B:
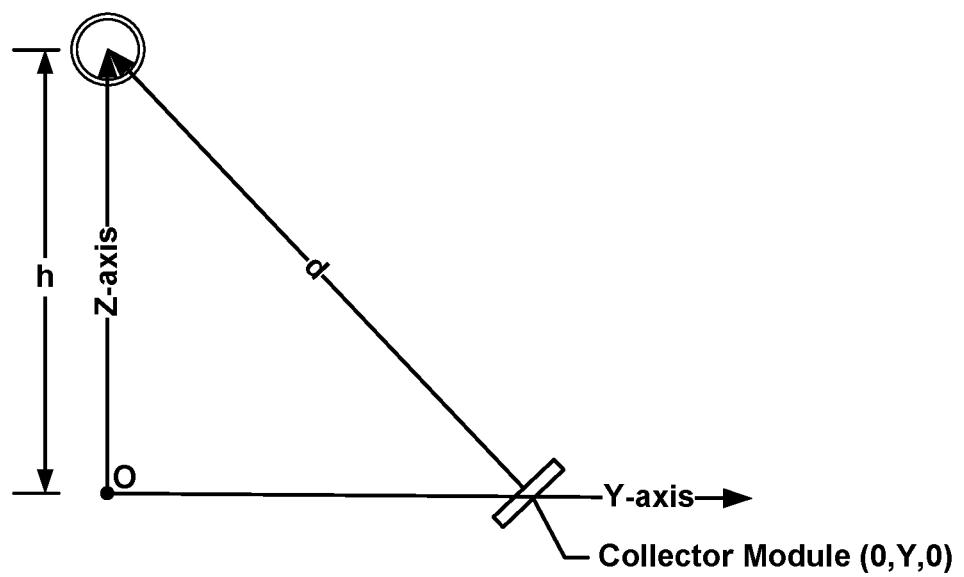
FIG. 19B illustrates the relative position between the receiver and the collector module for an example 1-D fixed-target solar thermal power plant, consistent with aspects related to the innovations herein.

FIG. 19B illustrates the relative position between the receiver center and the center of an example collector module. In some embodiments, the Earth surface coordinate system shows x and y axes pointing to north and east, respectively, with the origin at the receiver center as projected on the Earth's surface, and the z axis points towards the target face center of the receiver. The height h defines the tower height in terms of the vertical distance between the receiver center and the rotational center of the example collector module at (0, Y, 0).

Figure 20:
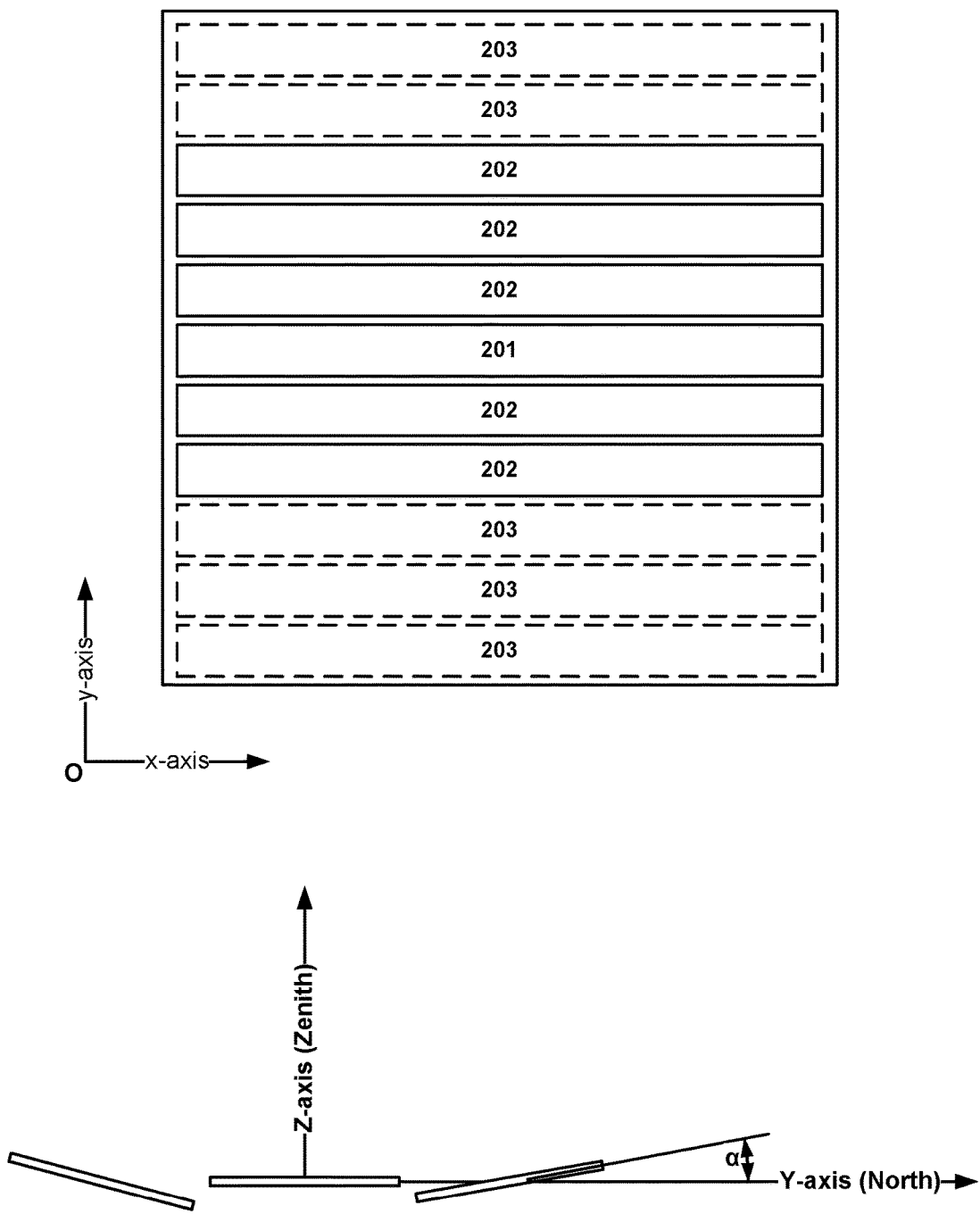
FIG. 20 is a diagram illustrating the layout for an example collector module for an example 1-D fixed-target solar thermal power plant, consistent with aspects related to the innovations herein.

The layout of an example solar collector module for a 1-D modular fixed target solar thermal concentrator power plant is shown in FIG. 20. FIG. 20 uses the same Cartesian coordinate system as in FIG. 18 with the x and y axes aligned with the collector module frame with the origin at the rotational center of the collector module. Each collector module may include a number of smaller reflectors 202 and a center reflector 201 (substantially centered on the rotational axis of the collector module); the reflectors may be with or without curvature may have certain initial angles ($\alpha$ relative to the collector module framework as shown in FIG. 18.

The following detailed examples describe how to obtain the defocusing effects for a given 1-D collector module. The incident beam unit vector $\vec{I}_m$ of the collector module (which is also the incident beam unit vector for the center reflector of the collector module) for the sunbeam at various times during the day may be obtained through the same rotational matrix $R_0$ as may be used in the 2-D case. The collector module incident beam unit vector $\vec{I}_m$ is given by:

$$\vec{I}_m = R_0 \vec{I}_0 \quad (21)$$

The normal unit vector $\vec{N}_m$ of a collector module (which is also the normal vector of the center reflector) tracking the sun during a day is given by:

$$\vec{N}_m = \frac{\vec{I}_m + \vec{R}_m}{2\cos\left[\frac{1}{2}\arccos(\vec{I}_m \cdot \vec{R}_m)\right]} \quad (22)$$

where the reflection beam unit vector $\vec{R}_m$ of module panel (which is also the reflection vector of the center reflector of the collector module) is given by:

$$\vec{R}_m = (0,0,1) \quad (23)$$

Similarly, the normal unit vector $\vec{N}_m$ of a collector module (which is also the normal unit vector of the center reflector) for a collector module tracking the sun during the course of a day may be obtained through a tracking rotational matrix R:

$$R = \begin{pmatrix} 1 & 0 & 0 \\ 0 & \cos[-(\frac{\pi}{2}-\beta)] & \sin[-(\frac{\pi}{2}-\beta)] \\ 0 & \sin[-(\frac{\pi}{2}-\beta)] & \cos[-(\frac{\pi}{2}-\beta)] \end{pmatrix} = \begin{pmatrix} 1 & 0 & 0 \\ 0 & \sin\beta & -\cos\beta \\ 0 & \cos\beta & \sin\beta \end{pmatrix} \quad (24)$$

where the angle $\beta$ is defined as the angle between the normal unit vector $\vec{N}_m$ and the Y axis of the Cartesian coordinate system in FIG. 18. The angle $\beta$ is given by:

$$\sin\beta = N_{mz} \quad (25)$$

Figure 21:
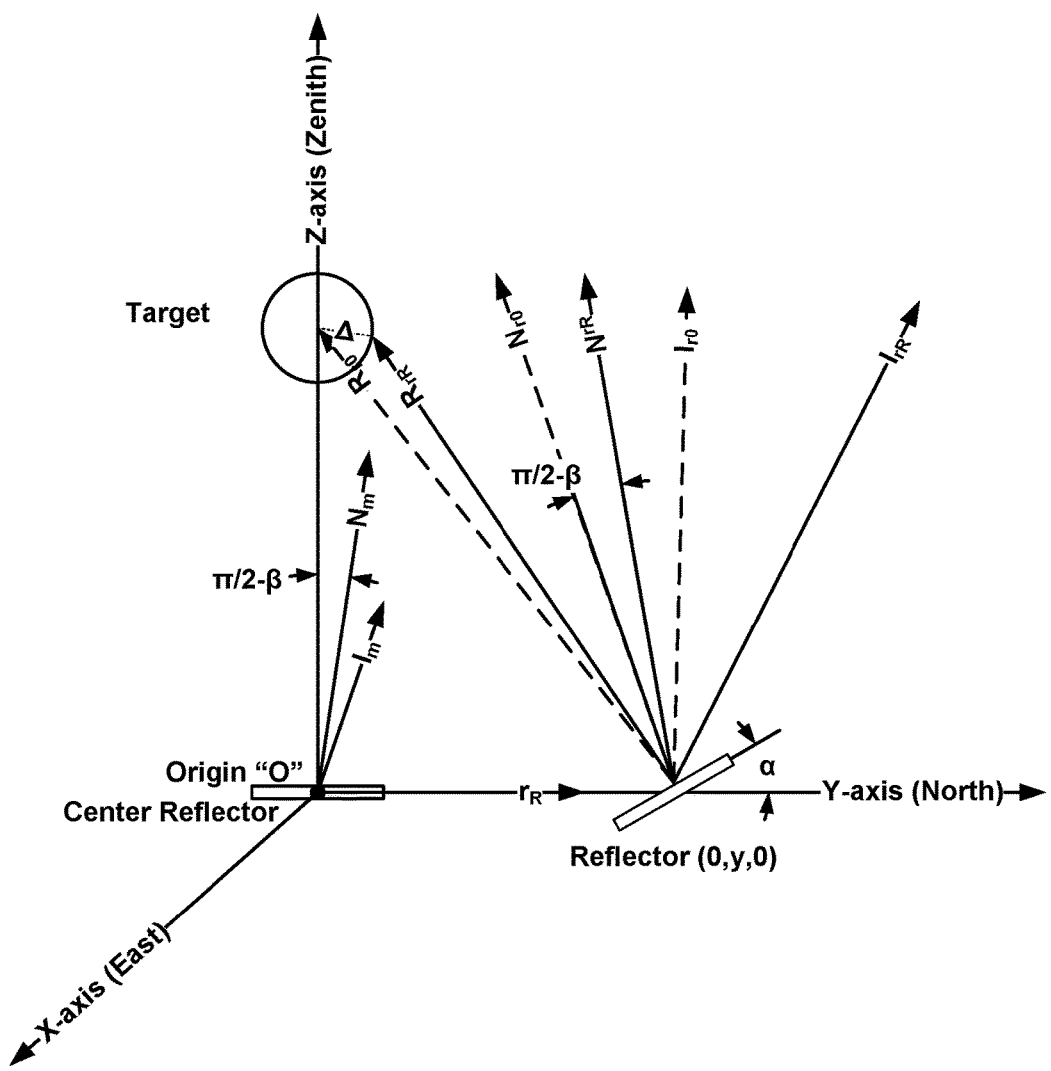
FIG. 21 is a schematic diagram illustrating reference frames relevant to discussion of rotation for a reflector on a collector module when tracking the sun at different times during a day, consistent with aspects related to the innovations herein.

FIG. 21 illustrates the normal unit vector $\vec{N}_{rR}$ for an example reflector of an example collector module tracking the sun during a day and can be obtained by using the same rotational matrix R. Using the tracking rotational matrix R, the normal unit vector $\vec{N}_{rR}$ of a reflector for a collector module is given by:

$$\vec{N}_{rR} = R\vec{N}_{r0}(0,y,0) \quad (26)$$

The vector of deviation for a reflector after rotating $\vec{R}_r$ about the rotational center of the collector module can be given by:

$$\vec{r}_R = R\vec{r}(0,y,0) \quad (27)$$

The incident unit vector $\vec{I}_{rR}$ of a reflector of the collector module is equivalent to the incident unit vector $\vec{I}_m$ of the collector module when tracking the sun at a given time and is given by:

$$\vec{I}_{rR} = \vec{I}_m \quad (28)$$

The reflection unit vector $\vec{R}_{rR}$ of a reflector for the collector module when tracking the sun during a day is given by:

$$\vec{R}_{rR} = 2\cdot\vec{N}_{rR}\cdot\cos(\vec{I}_{rR}\cdot\vec{N}_{rR}) - \vec{I}_{rR} \quad (29)$$

The reflection unit vector $\vec{R}_{rR}$ may be extended to intersect with the receiver target face plane (assuming a plane geometry receiver is used) to form a new vector $\vec{R}'_{rR}$:

$$\vec{R}'_{rR} = \begin{pmatrix} R'_{rRx} \\ R'_{rRy} \\ R'_{rRz} \end{pmatrix} = \begin{pmatrix} R_{rRx} \cdot \frac{d-r_{Rz}}{R_{rRz}} \\ R_{rRy} \cdot \frac{d-r_{Rz}}{R_{rRz}} \\ d-r_{Rz} \end{pmatrix} \quad (30)$$

Using vector calculation, an example formula for the defocusing effect ($\Delta x$, $\Delta y$) may be obtained. For a reflector at a position of (0, y, 0), the focus errors (deviations from the target face center) $\Delta x$ and $\Delta y$ are:

$$\begin{cases} \Delta x = R_{rRx} \cdot \frac{d-r_{Rz}}{R_{rRz}} - r_{Rx} \\ \Delta y = R_{rRy} \cdot \frac{d-r_{Rz}}{R_{rRz}} - r_{Ry} \end{cases} \quad (31)$$

Figure 22:
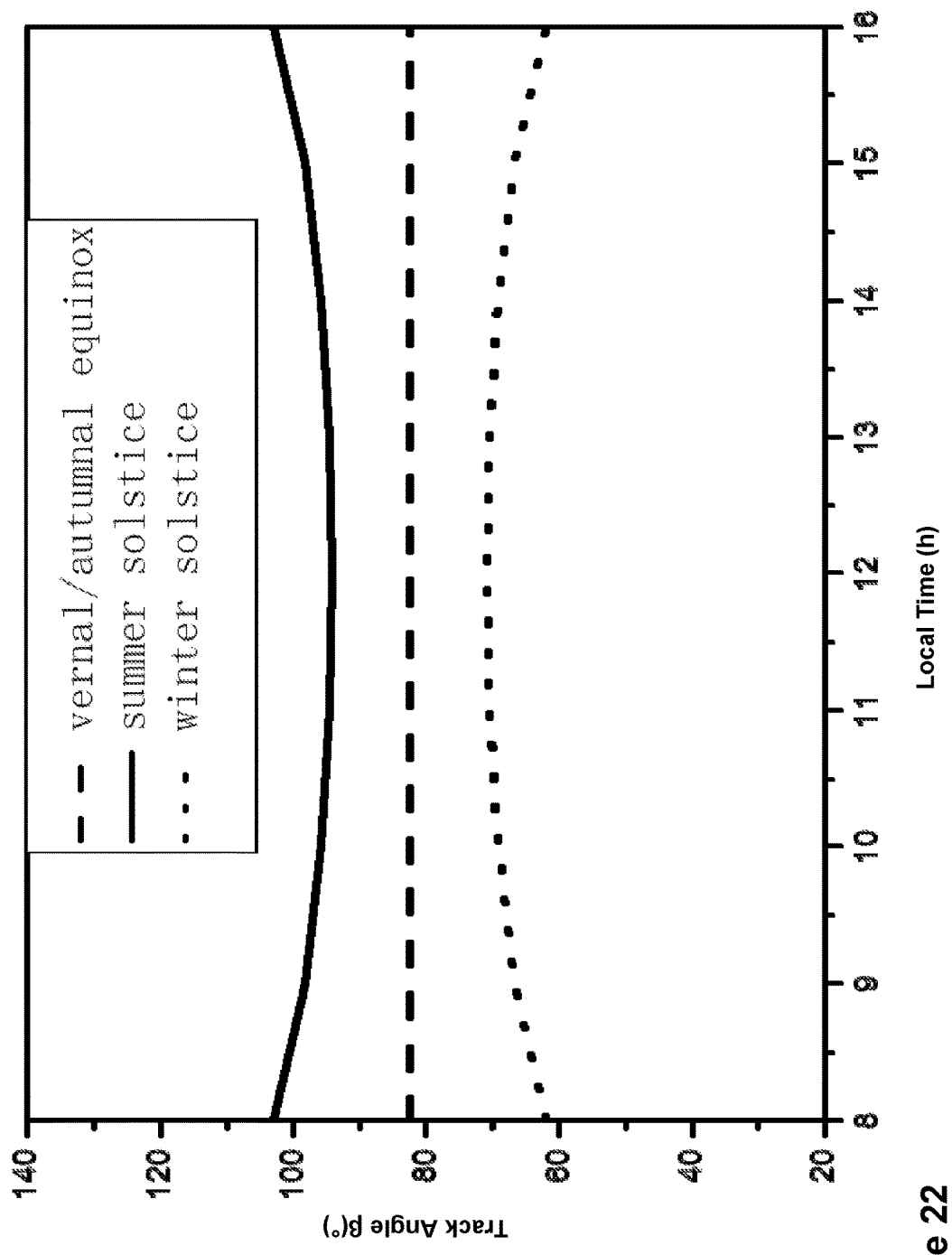
FIG. 22 illustrates the tracking angle of an example reflector for an example 1-D fixed thermal target type solar plant as a function of time at vernal/autumnal equinox, summer solstice and winter solstice, consistent with aspects related to the innovations herein.

FIG. 22 illustrates the tracking angle as a function of time at the vernal/autumnal equinox, summer solstice, and winter solstice. The tracking angle for a collector module right below the receiver from 8:00 am and 4:00 pm at vernal/autumnal equinox, summer solstice, and winter solstice with receiver distance (height) of 3 m from the rotational center of module and location latitude of 15° is provided. In some embodiments, the tracking angle of a collector module the at vernal/autumnal equinox, summer solstice, and winter solstice may be confined to the dashed line, the straight line, and the dotted line, respectively. In this way, as shown in FIG. 22, the tracking angle anytime and anywhere may be obtained.

In one example configuration, the collector module may be designed with several reflectors, each 100 mm wide.

Figure 23:
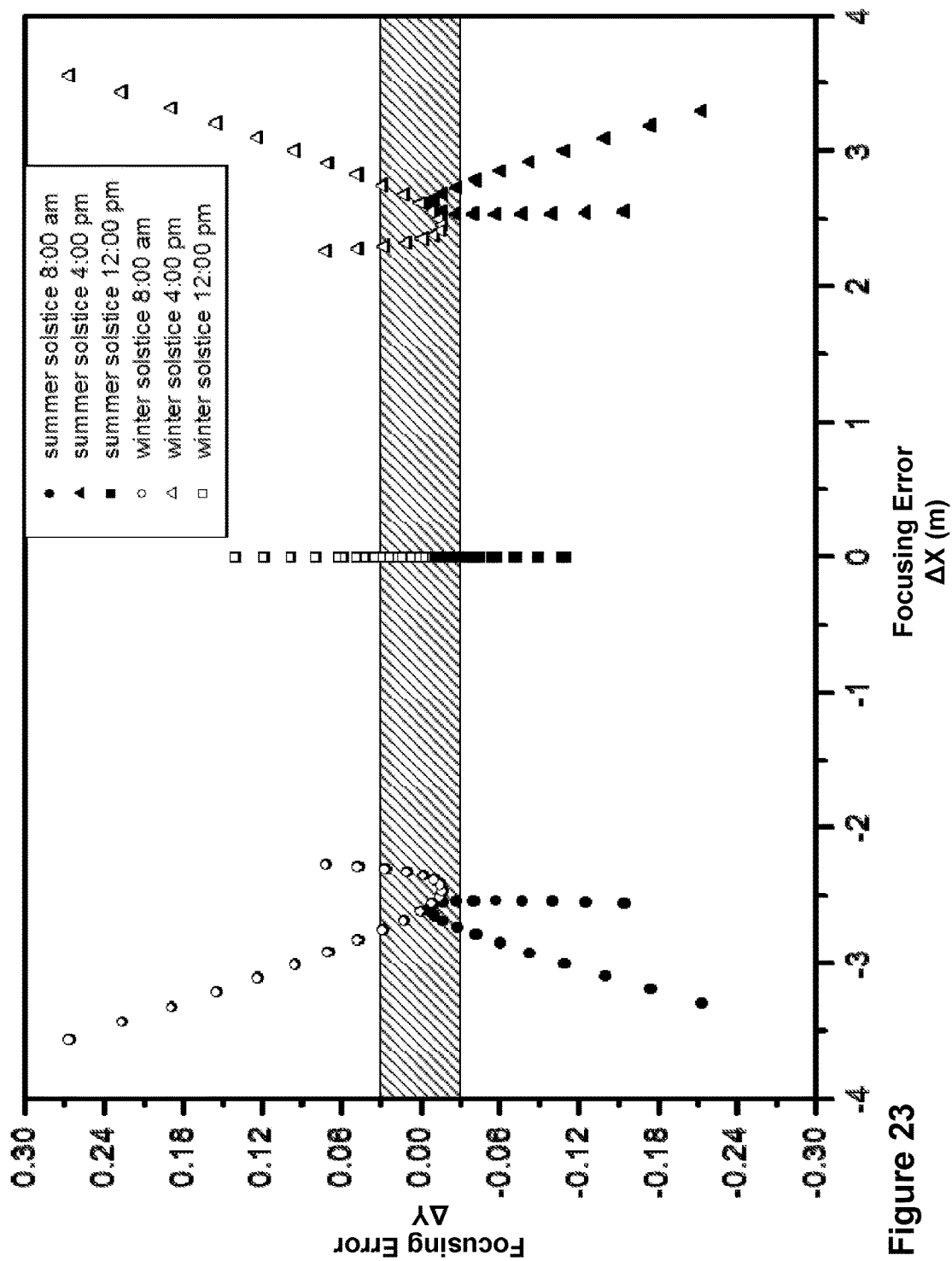
FIG. 23 is a diagram illustrating the example focusing error of an example collector module for an example 1-D modular fixed-target type thermal solar plant at vernal/autumnal equinox, summer solstice and winter solstice, consistent with aspects related to the innovations herein.

FIG. 23 is a diagram showing example focus errors. FIG. 23 describes the defocusing point coordinates of all of the mirrors at 8:00 am, 12:00 am and 4:00 pm at summer solstice and winter solstice, relatively. The focus errors of the reflectors at 8:00 am, 12:00 am, and 4:00 pm are indicated by the black circle, black square, and black triangle, respectively, at summer solstice, and the focus errors of the reflectors at 8:00 am, 12:00 am, and 4:00 pm are indicated by the white circle, white square and white triangle, respectively, at winter solstice.

The layout of the solar collector module directly below the receiver and at a distance of 3 m (from the rotational center of the collector module to the center of the receiver) can be obtained by using, in this example, a boundary with value of $-0.03$ m$\leq \Delta y \leq 0.03$ m as shown in FIG. 23 (see cross-hatched band). Such an example configuration has a concentration ratio of about 6 and has reserved reflectors 202 and the removed/omitted reflectors 203 as shown in FIG. 20. In one implementation, the concentration ratios for individual reflectors may be different. In some embodiments, each collector module may have a variable individual concentration ratio that depends on its location relative to the target face position in order to maximize the total concentration ratio. Similarly, we can obtain the layout of any other collector modules with central reflectors located at a given position, and the layout of the tower plant can be obtained in this way. For each collector module associated with a linear receiver that is aligned in an east-west orientation, a variable concentration may be implemented in order to maximize the total concentration ratio of the 1-D plant, and optical concentration ratios of 20-40 may be achieved by customizing the installed angle relative to the collector module framework for each reflector.

In some respects, the collector modules and reflectors described herein may form a "compound" Fresnel reflector with respect to the solar thermal tower plants discussed herein. In a Fresnel reflector, multiple linear reflectors are generally arrayed on a common plane such that they focus incident light on a single point above the plane when struck by light from a particular direction. Each of the collector modules discussed herein may, due to the arrangement of reflectors in each collector module, be viewed as forming a Fresnel reflector, e.g., a Fresnel spot reflector. Similarly, the solar thermal tower may receive light from, in effect, a Fresnel reflector formed by the plurality of collector modules (each collector module, in this analogy, is viewed as equivalent to a linear reflector, although when viewed in detail, the reflectors making up each collector module may be provided at a variety of initial angles within a single collector module, thus providing a Fresnel reflector within a Fresnel reflector). Since the "Fresnel" reflectors affixed to each collector module are rotated throughout the course of the day with respect to the "Fresnel" reflector formed by the collector modules themselves, the resulting reflector system presents a much more complex (and capable) solar concentration system than systems utilizing non-compound Fresnel lenses.

Various conventions are used throughout this disclosure. However, it is to be understood that implementations that depart from these conventions are also within the scope of this disclosure. For example, in the discussions herein, reference is made to the "rotational center" of a collector module. Some collector modules, depending on the tracking mechanism used, may not have a true "rotational center," e.g., a single point about which all rotation of the collector module occurs, however.

Figure 24:
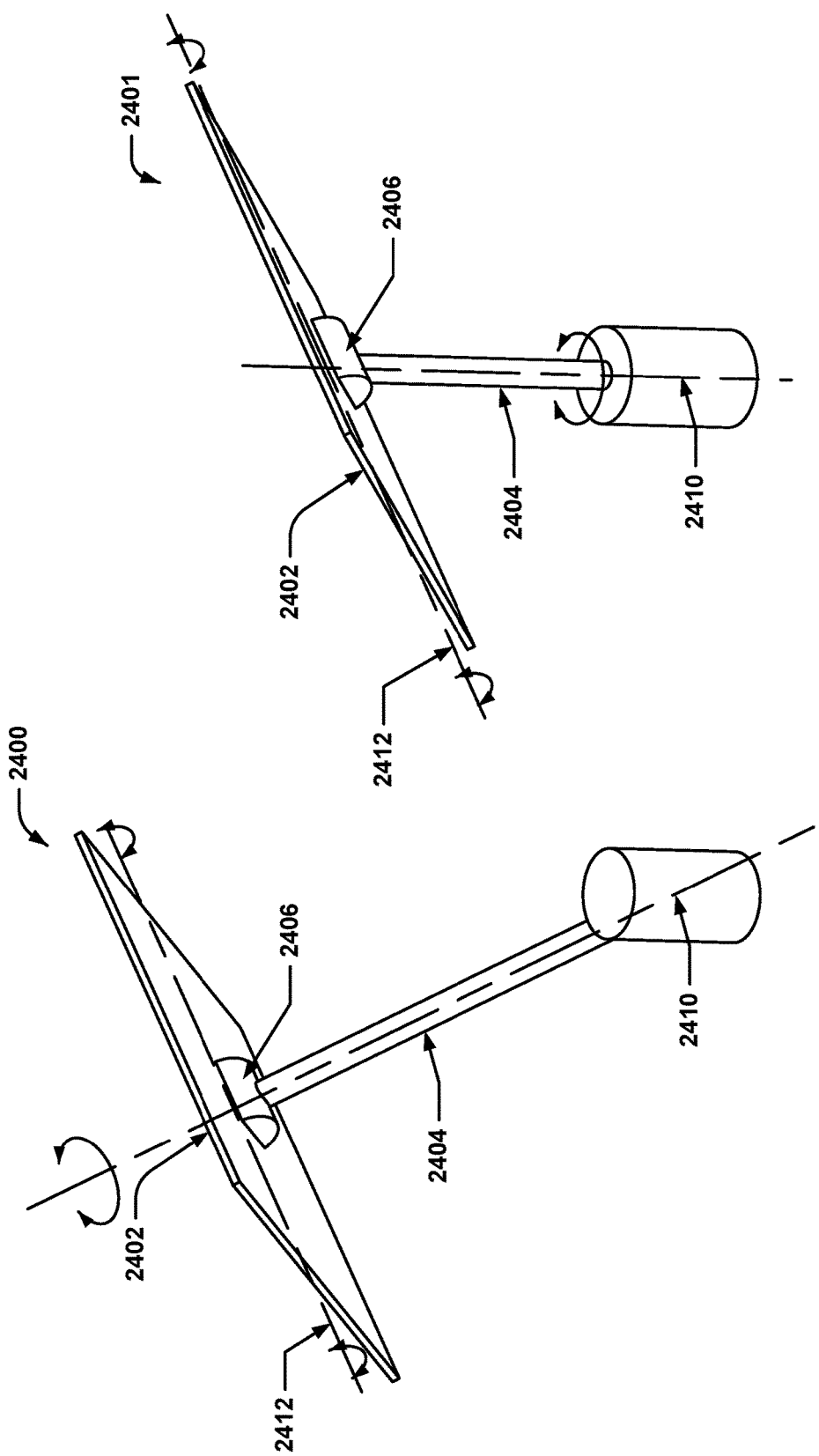
FIG. 24 shows two examples of collector module support systems and rotational axes associated with each of them.

For example, sun tracking mechanisms must generally be capable of providing rotational movement along at least two axes in order to be effective—a pitch axis (which is generally parallel to a line tangent to the Earth's surface at the location of the collector module) and a yaw axis (which is generally perpendicular to a plane tangent to the Earth's surface at the location of the collector module). FIG. 24 depicts two different example, simplified sun-tracking systems. The tilted-pole tracking system 2400 is on the left, and the vertical-pole tracking system 2401 is on the right. In both tracking systems, a collector module 2402 is supported on a pitch/tilt mechanism 2406 that is configured to rotate the collector module 2402 about a pitch axis 2412. In the vertical-pole tracking system 2401, the pitch/tilt mechanism 2406 is supported on a support column 2404 such that the pitch axis 2412 and the yaw axis 2410 intersect each other and the yaw axis is substantially vertical. The rotational center of the collector module 2402 in the vertical-pole tracking system 2401 is located at this intersection point. In contrast, in the tilted-pole tracking system 2402, the pitch/tilt mechanism may be supported on a support column 2404 that is oriented at an angle from the local Earth vertical axis. The yaw axis 2410 and the pitch axis 2412 still intersect and produce a single center of rotation for the collector module 2402 in the tilted-pole tracking system. Both types of tracking mechanisms, however, as well as other tracking mechanisms not shown or discussed here, may be used to implement the solar thermal tower plants discussed herein. The calculations needed to orient the collector modules of these other implementations (and to evaluate the focusing errors of the collector modules) correctly with respect to the sun are within the ability of a person of ordinary skill in the art. With respect to this disclosure, it is to be understood that reference to the "rotational center" of a collector module may refer to the intersection of the collector module's pitch axis with the collector module's yaw axis.

Another convention that is used in this disclosure is the "center reflector." In the examples discussed herein, the reflectors in each collector module are arranged in an array with odd-numbered dimensions. As a result, there is always a single reflector positioned at the center of the collector module; that single reflector forms the center reflector for the module, and is generally parallel to the nominal collector module plane. However, it is also possible to utilize an array with one or more even-numbered dimensions, e.g., an 8×8 array of reflectors. In such a case, there may not be any reflectors at all in the collector module center. However, the four mirrors that are closest to the center of the module may be viewed as forming a theoretical "center reflector" (other methods of approximating the properties of a theoretical center mirror may be used as well). It is to be understood that reference herein to the "center reflector" of a collector module may refer to an actual reflector located at the center of the collector module or it may refer to a theoretical center reflector that has properties that are evaluated at the center of the collector module.

The use of "latitudinal" and "longitudinal" directions is to be understood to refer to the N-S or S-N direction and the E-W or W-E direction, respectively, of the Earth.

Another convention that is used herein is to refer to an "array" of reflectors. In the examples discussed herein, the arrays in question are two-dimensional, rectangular arrays. However, other types of arrays may be used as well, and it is to be understood that the use of the term "array" with respect to the reflectors of a collectors module, without further context, refers to any set of coordinates that define the potential center locations of a group of reflectors mounted on a collector module. In many cases, reflectors may not actually be positioned at all of the array locations, e.g., corner reflectors and other low-concentration ratio reflectors may be omitted, if desired. For convenience, the collector modules discussed herein have all been shown as having the same size of array—even if, as in the collector module of FIG. 14D, one or more rows of the array do not have any reflectors in one or more of the collector modules. Of course, the collector modules of a solar thermal tower plant may have different sizes of reflector arrays—such implementations are also within the scope of this disclosure. Additionally, other array patterns may be used, e.g., hexagonal arrays, as well as non-regular array patterns, e.g., a plurality of reflectors that are not arranged in a regular manner, but that are nonetheless all confined within a particular area, e.g., the collector module boundary.

Some dimensions of an example solar thermal tower system are provided below to give an idea of typical dimensions of an example solar thermal tower system consistent with this disclosure. Such an example solar thermal tower system may, for example, use 5 collector modules that are each approximately 3 m square. Each example collector module may have reflectors occupying array locations in a 7×7 array (such collector modules may be laid out as shown in FIGS. 11A through 11J); the reflectors may each be approximately 0.4 m square. Some of the reflectors may be concave/curved, e.g., such as indicated in FIGS. 11A through 11J. The collector modules of such a solar thermal tower system may be distributed across a rectangular area that lies polewards of, and adjacent to, a tower structure that houses a receiver target onto which the collector modules are configured to reflect sunlight that is incident on the collector modules. The receiver target may, for example, be provided by an array of plane geometry receivers coated with a selective absorption coating and housed within individual vacuum chambers. The total target area of the target receiver may be approximately 0.8 m square, e.g., approximately 4 times larger in area than any of the reflectors used in the collector modules. The center of the receiver target may be supported by the tower approximately 10 m above the collector module rotational center points. The rectangular area in such an implementation may be approximately 30 m long in the N-S direction, and 10 m wide in the E-W direction.

Other implementations of solar thermal tower plants may use collector modules up to as large as 10 m square, although such collector modules may be considerably more expensive. Similarly, the tower may be up to 10 meters, 15 meters, or, in some implementations, 25 meters in height (vertical distance between target face center and the rotational centers of the collector modules). In some such implementations, the tower may be greater than 5 m in height.

In some implementations, the rectangular area in which the collector modules for a given tower are primarily located may be up to 3 h in length in the N-S direction, and up to 0.5h, 0.8h, or h in width in the E-W direction, where h is the vertical distance between the target face center and the rotational centers of the collector modules. In many implementations, all of the collector modules for a given tower may be located within this rectangular area. However, in other locations, many, but not all, of the collector modules for a given tower may be located within the rectangular area. Generally speaking, including additional collector modules outside of the rectangular area will, predictably, cause additional heating of the target receiver face—however, the average cosine efficiency of all of the collector modules for that tower will be negatively impacted. As a result, locating too many collector modules outside of the rectangular area may cause the average cosine efficiency to drop, for example, from 87.5% to 77%. If all of the collector modules are located within a rectangular region as discussed above, then the average cosine efficiency may be 87.5% or higher, e.g., 90%. Accordingly, one metric that may be used to describe solar thermal plants that fall within the scope of this disclosure is the average cosine efficiency of all of the collector modules that are directed at a common tower and receiver—the average cosine efficiencies of such a plant may be 80% or higher, 85% or higher, 87.5% or higher, and so forth.

In some implementations, the reflectors for a collector module may each have a focusing error with respect to the target face center at 8:00 AM and 4:00 PM on the vernal or autumnal equinox of between 0 and X meters in the horizontal direction and between 0 and Y meters in the vertical direction, wherein X is the width of the reflector in the E-W direction and Y is the height of the reflector in the Y direction. For example, for a 0.4 m square reflector, X and Y may both equal 0.4 m (and thus the defocusing error may be +/−0.4 m). In some implementations, 90% or more of the reflectors for a collector module may satisfy such constraints rather than all of the reflectors for the collector module.

In some implementations, the collector modules may be arranged in the rectangular area in one or more columns extending generally along a N-S direction, e.g., one column, two columns, three columns, four columns, five columns, etc. In some cases, the number of columns of collector modules for a given solar thermal tower plant may not exceed 5 columns. In some implementations, each such column of collector modules may have up to 10 rows of collector modules (the number of rows in some columns of a solar thermal tower plant may be different from one another, and the rows may not necessarily have the same spacing or line up between columns).

When multiple solar thermal tower plants are ganged together into a solar thermal tower plant system, as discussed previously, then the result may be a solar thermal tower plant system that has a significantly higher average cosine efficiency over the area in which the collector modules are distributed than a conventional, single-tower design having sun-tracking reflectors distributed across a similar-sized area. As a result, the solar thermal tower plant designs detailed herein may provide a considerably more efficient means of generating solar thermal power.

Figure 25:
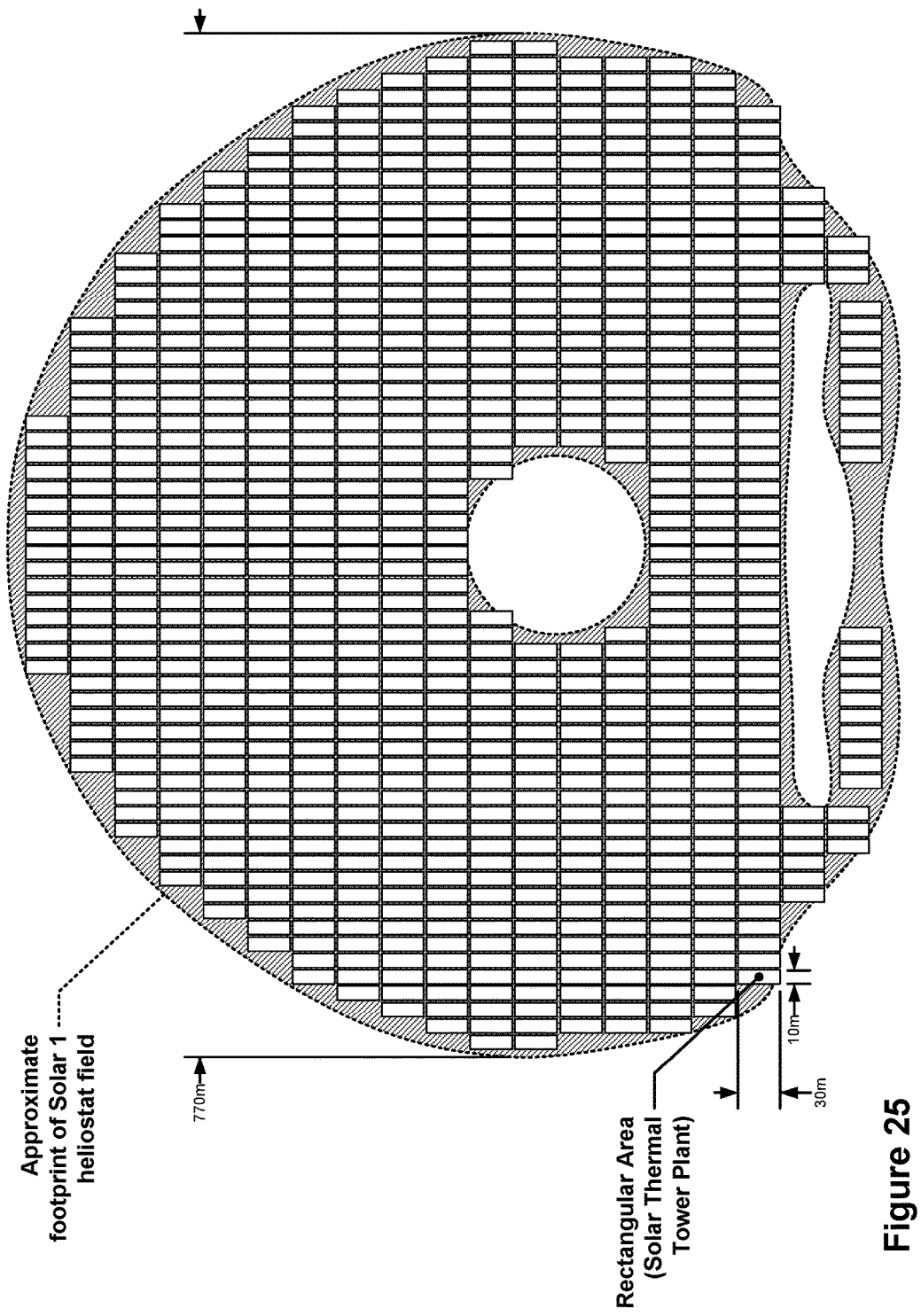
FIG. 25 shows a diagram showing a large array of solar thermal tower plants as described herein occupying the same area as is occupied by the reflector units of a conventional solar thermal power plant.

For example, if one were to utilize the same sun-tracking reflector distribution area as is used in the now-defunct Solar One/Solar Two plant (which distributed sun-tracking reflectors across a somewhat circular area that was approximately 770 meters across at its widest) with a system of smaller solar thermal tower plants as described herein, each having a footprint of approximately 10 m×30 m, it would be possible to fit over 850 such smaller solar thermal tower plants into the same area, as shown in FIG. 25 (the rectangular areas are separated by gaps; if they are directly adjacent to each other, then even more may be added). FIG. 25 shows 858 30 m×10 m rectangular regions arrayed within the envelope within which the Solar One/Solar Two reflectors are arrayed. The envelope is shown as a dotted line with fine cross-hatching; Solar One/Solar Two's reflectors are overlaid on the envelope, and the 858 rectangular areas are overlaid on the envelope and Solar One/Solar Two's reflectors.

Each individual solar thermal tower plant in such a ganged system may have a concentration ratio that is comparable to that of a much larger, conventional single-tower system. However, the amount of energy that is produced by each such individual solar thermal tower plant may be considerably smaller since the receiver target area, and the individual reflector size, of the individual solar thermal tower plant may be considerably smaller as compared with conventional solar thermal tower plants. However, due to the higher efficiency of such ganged solar thermal tower plant systems, a larger amount of solar power may be extracted from the same land area footprint as compared with a conventional solar thermal tower plant.

Figure 26:
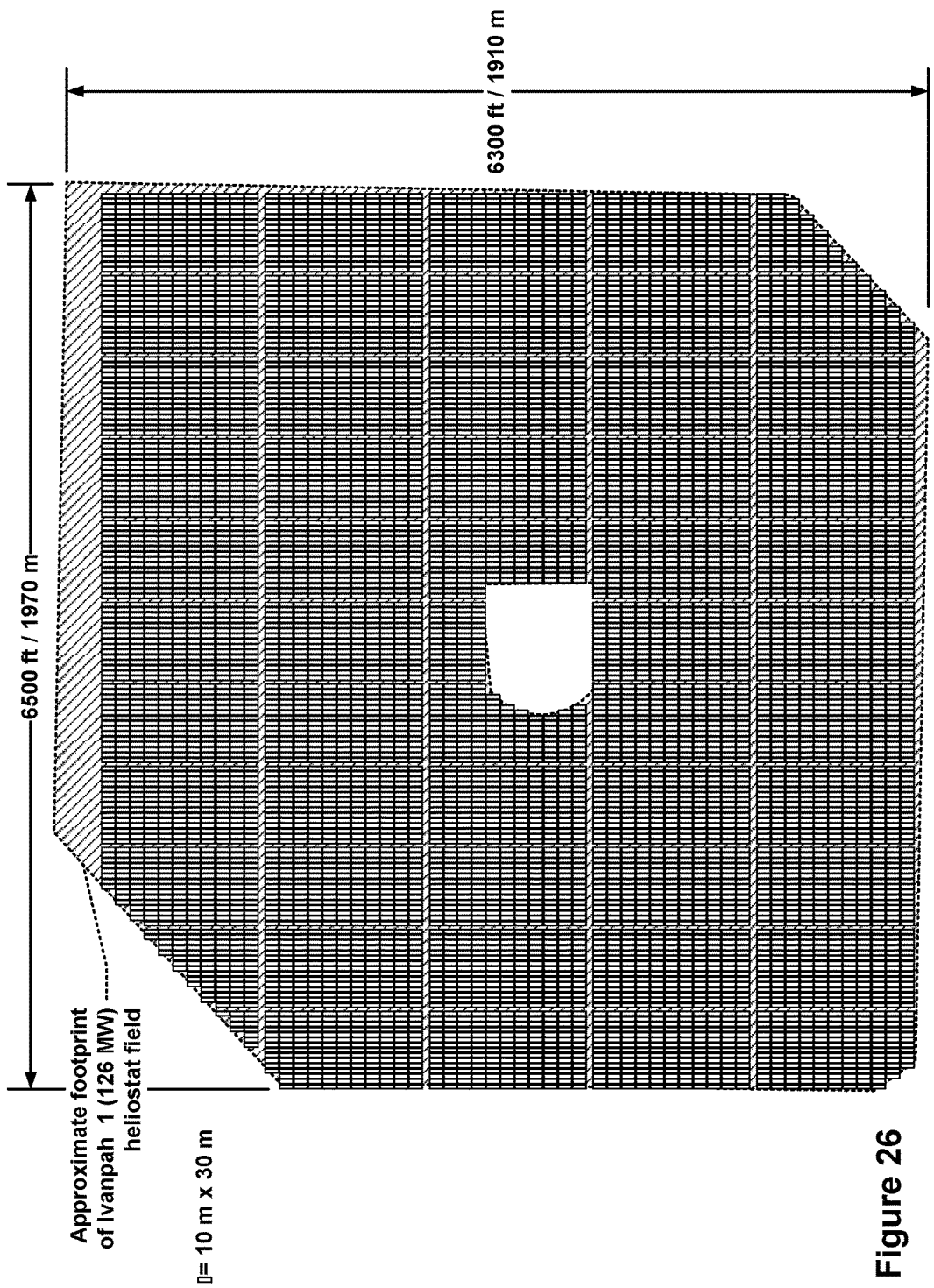
FIG. 26 shows a diagram showing a large array of solar thermal tower plants as described herein occupying the same area as is occupied by the reflector units of another conventional solar thermal power plant.

FIG. 26 depicts a similar diagram as FIG. 25, but demonstrating how solar thermal plant systems as described herein may offer superior power-per-area performance as compared with a completely modern conventional solar thermal tower design. FIG. 26 shows the outline of the heliostat field for the Ivanpah-1 solar thermal tower. Also shown in FIG. 26 is an array of 10 m×30 m footprints for 8550 modular solar thermal tower plants such as those discussed herein. As can be seen, the 8550 modular solar thermal tower plants shown occupy approximately the same area as the heliostat field of the Ivanpah-1 solar thermal tower plant (in fact, further solar thermal tower plant footprints could be accommodated in the upper portion of the depicted region, so this is a conservative estimate). As discussed above, modular solar thermal tower plants such as those disclosed herein may be capable of outputs ranging from 20 kW up to 1 MW (and higher, if desired). If the 8550 modular solar thermal tower plants shown were to perform at the lower end of these performance ranges, then the solar thermal tower plant system that is shown would produce more than 170 MW of power. By comparison, the Ivanpah-1 solar thermal tower plant only produces up to 126 MW of power in the same space.

In contrast, the solar thermal tower plants described herein avoid the use of such large structures and instead rely on much more affordable tower structures that are on the order of low tens of meters in height. These towers may be pre-fabricated and shipped to their destinations and erected (as compared with larger, conventional towers that must be built on site), which allows them to realize the benefits of mass-production in terms of production costs, ready availability of spare parts, and other benefits. Such smaller-scale towers may also be superior to larger-scale conventional towers in several unexpected ways (in addition to the ability to use vacuum insulation, as discussed previously). For example, taller, conventional solar thermal towers require massive foundations to be poured in order to support the tower weight (Ivanpah's towers each support a 2100 ton boiler and are stabilized by 110 ton counterweight (not counting the weight of the tower support structure itself)). Taller, conventional solar thermal towers may also present significant risks to airplanes due to their height (the Ivanpah towers include an additional 10 to 15 feet of height beyond the receiver in order to provide for FAA-mandated lighting), whereas shorter towers such as those described herein, do not. Yet another weakness in larger towers is that much more energy is required to pump the working fluid up into the tower in order to be heated in the receiver; this energy reduces the overall efficiency of conventional solar thermal tower plants. Large tower plants are also more susceptible to wind loading due to the fact that they are higher (thus allowing for more deflection per unit of end loading) and exposed to stronger winds at higher altitudes. The solar thermal tower plants disclosed herein circumvent many, if not all, of these issues due to their much smaller size.

Figure 27:
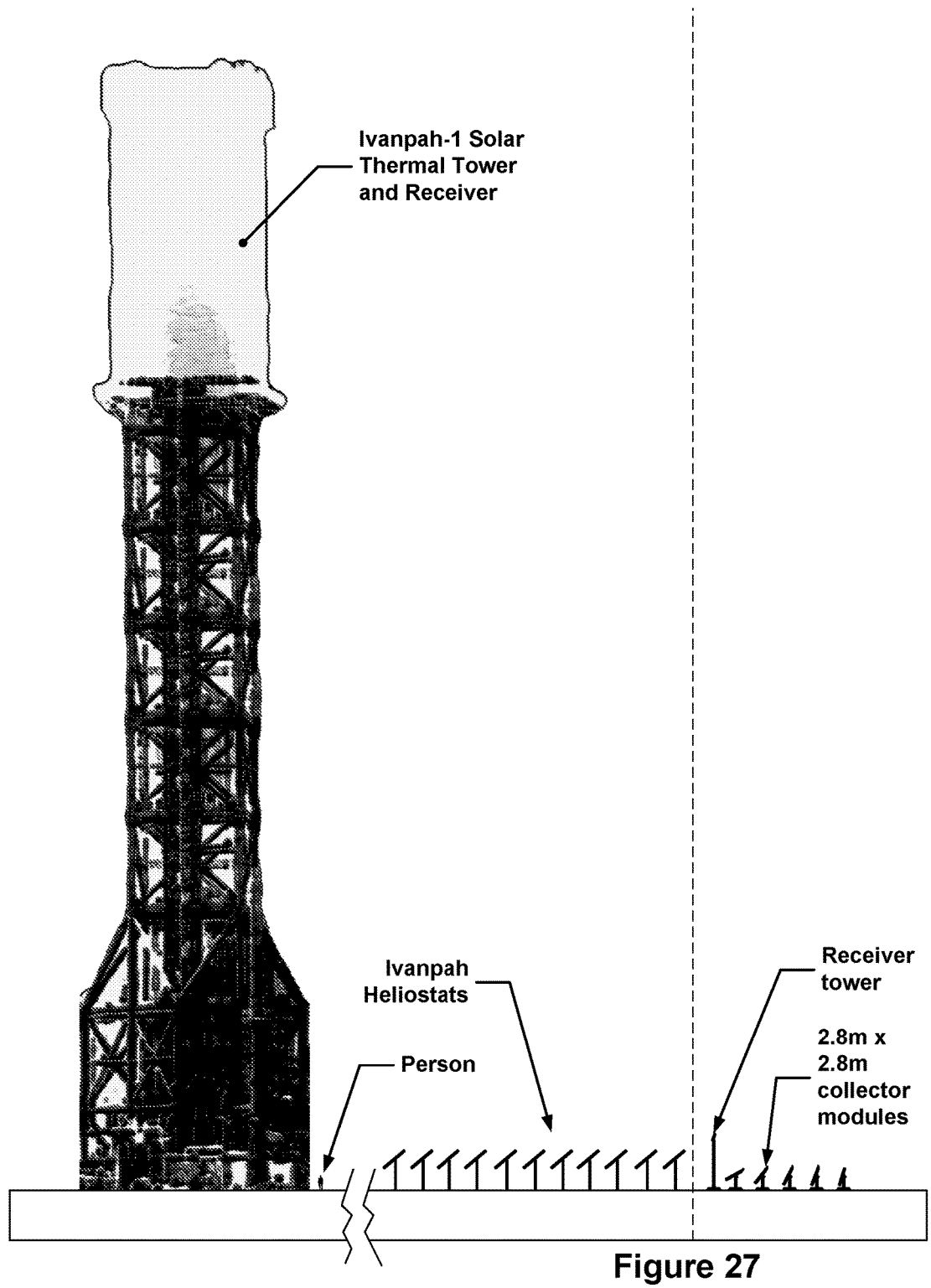
FIG. 27 depicts the Ivanpah-1 solar thermal tower in comparison to an example solar thermal tower as described herein.

By way of demonstration, FIG. 27 depicts the Ivanpah-1 solar thermal tower (136 m high) and some of the Ivanpah-1 heliostats; all are depicted in approximately the same scale. A person is also shown in the same scale just to the right of the Ivanpah tower. In the same Figure, a solar thermal tower according to the concepts outlined herein is shown along with 2.8 m square collector modules (also to the same scale; the receiver in such a tower is approximately 5 meters above the pitch axes of the collector modules shown). Such a tower may be used in some implementations of the solar thermal tower plant systems described herein. As is evident, the difference in scale is massive.

Moreover, in conventional single-tower solar thermal tower systems, there is a single receiver—if the receiver malfunctions or needs to be withdrawn from service, then the entire solar thermal tower plant shuts down. While the same is true with the solar thermal tower plants used in solar thermal tower plant systems described herein, such a shutdown has much less impact than in a conventional solar thermal tower plant. This is, for example, because there are a large number of separate solar thermal tower plants that are used in a ganged solar thermal tower plant system. For example, if 5-10 solar thermal tower plants of the 850+ solar thermal tower plants of FIG. 25 are inactive due to maintenance, failure, or other reasons, this would only decrease the power output by approximately 1-2% (as opposed to 100%). Moreover, since the same receiver may be used on every solar thermal tower plant in the ganged solar thermal tower plant system, a stockpile of replacement receivers may be maintained to allow for rapid repair of any of the solar thermal tower plants in the system.

What is claimed is:

1. A solar power system comprising:
   a solar power plant including:
      a receiver module, the receiver module having a target face configured to collect solar energy that is incident on the target face, the target face having a target face center;
      a group of collector modules, each collector module in the group of collector modules configured to redirect sunlight onto the target face of the receiver module and to be rotatable about a corresponding rotational center, wherein:
         at least 90% of the collector modules are located in a rectangular region that is 10h long in a direction generally aligned with the Earth's longitudinal direction and h wide in a direction generally aligned with the Earth's latitudinal direction, and
         a horizontal average midplane is substantially defined by the rotational centers of all of the collector modules in the group of collector modules; and
      a tower, the tower supporting the receiver module a distance h above the horizontal average midplane.

2. The solar power system of claim 1, wherein the rectangular region starts at the tower and extends away from the Earth's equator in a generally longitudinal direction.

3. The solar power system of claim 1, wherein each collector module comprises:
   a sun-tracking mechanism,
   a frame supported by the sun-tracking mechanism, and
   a plurality of reflectors, wherein:
      the plurality of reflectors includes a center reflector,
      each reflector is supported by the frame, and
      each reflector is configured to reflect light incident on the reflector such that light reflected off of the reflector is centered on the target face center when the light strikes the reflector from a direction parallel to a vector passing through the target face center and the center reflector and the center reflector is perpendicular to the vector.

4. The solar power system of claim 1, wherein the collector module includes an array of reflectors including X rows by Y columns, wherein X is selected from the group consisting of 5, 6, 7, 8, 9, and 10, and Y is selected from the group consisting of 5, 6, 7, 8, 9, and 10.

5. The solar power system of claim 1, wherein the average cosine efficiency across all of the collector modules that are configured to redirect sunlight onto the target face of the receiver module is 0.85 or higher.

6. The solar power system of claim 3, wherein at least one sun-tracking mechanism has two intersecting axes of rotation.

7. The solar power system of claim 1, wherein at least one of the reflectors in at least one of the collector modules is a planar mirror.

8. The solar power system of claim 1, wherein at least one of the reflectors in at least one of the collector modules is a concave mirror.

9. The solar power system of claim 1, wherein h is between 5 and 10 meters.

10. The solar power system of claim 1, wherein h is between 5 and 15 meters.

11. The solar power system of claim 1, wherein h is between 5 and 25 meters.

12. The solar power system of claim 1, wherein the group of collector modules includes between 3 and 30 collector modules.

13. The solar power system of claim 1, wherein the collector modules are arranged in between 1 to 3 substantially longitudinally-oriented columns within the rectangular region.

14. The solar power system of claim 13, wherein the collector modules are further arranged in between 3 to 10 substantially latitudinally-oriented rows of collector modules within each column.

15. The solar power system of claim 1, wherein the solar power system has one column of collector modules and five rows of collector modules.

16. The solar power system of claim 1, wherein at least one of the collector modules includes at least one collector module having a substantially rectangular array of reflectors distributed across the frame.

17. The solar power system of claim 16, wherein the at least one collector module having a substantially rectangular array of reflectors distributed across the frame does not have reflectors at the four outermost corners of the substantially rectangular array.

18. The solar power system of claim 16, wherein the at least one collector module having a substantially rectangular array of reflectors distributed across the frame does not have reflectors in the three array locations closest to each of the four outermost corners of the substantially rectangular array.

19. The solar power system of claim 16, wherein the at least one collector module having a substantially rectangular array of reflectors distributed across the frame has at least an additional horizontal row of reflectors on a first portion of the collector module closest to the Earth's equator and on one side of a pitch axis of rotation of the collector module as compared with the number of rows of reflectors on a second portion of the collector module furthest from the Earth's equator and on the other side of the pitch axis of rotation of the collector module.

20. The solar power system of claim 16, wherein the center reflector of the at least one collector module is a flat mirror and the other reflectors of the at least one collector module are concave reflectors.

21. The solar power system of claim 1, wherein at least 90% of the reflectors for at least one of the collector modules have focus errors with respect to the target face center at 8:00 AM and 4:00 PM on the vernal or autumnal equinox of between 0 and 0.4 meters in the horizontal direction and between 0 and 0.4 meters in the vertical direction.

22. The solar power system of claim 1, wherein each reflector of at least one of the collector modules is approximately 50% of the orthogonal dimensions of the target face and has a reflective area of approximately 25% of the target face surface area.

23. The solar power system of claim 1, further comprising:
one or more additional solar power plants, each having a receiver module, a tower, and a group of collector modules as set forth in claim 1, wherein the one or more additional solar power plants are arranged such that substantially longitudinal edges of the rectangular regions of each additional solar power plant are substantially adjacent to substantially longitudinal edges of the rectangular regions of any neighboring solar power plant.

24. The solar power system of claim 1, wherein the receiver module comprises:
a first vacuum chamber with at least a first transparent portion,
a first inlet to the first vacuum chamber,
a first outlet from the first vacuum chamber, and
a first plurality of first tube segments arranged in a linear array within the first vacuum chamber across a diameter of the first vacuum chamber, wherein:
the first tube segments are arrayed in a plane parallel to the target face,
the first tube segments are illuminable through the first transparent portion of the first vacuum chamber,
the first vacuum chamber is configured to provide a vacuum environment around the first plurality of tube segments, and
the first plurality of tube segments is fluidically connected with the first inlet and with the first outlet.

25. The solar power system of claim 24, further comprising:
a second vacuum chamber with at least a second transparent portion,
a second inlet to the second vacuum chamber,
a second outlet from the second vacuum chamber, and
a second plurality of second tube segments arranged in a linear array within the second vacuum chamber across a diameter of the second vacuum chamber, wherein:
the second tube segments are arrayed in a plane parallel to the target face,
the target face is a plane located between the first plurality of first tube segments and the second plurality of second tube segments,
the second tube segments are illuminable through the second transparent portion of the second vacuum chamber,
the second vacuum chamber is configured to provide a vacuum environment around the second plurality of tube segments, and
the second plurality of tube segments is fluidically connected with the second inlet and with the second outlet.

26. The solar power system of claim 24, wherein portions of the tube segments are coated with a selective absorption coating.

* * * * *